(12) United States Patent
Zhang et al.

(10) Patent No.: US 10,397,673 B2
(45) Date of Patent: Aug. 27, 2019

(54) METHOD AND APPARATUS FOR CONTROLLING OPTICAL SWITCH MATRIX

(71) Applicant: HUAWEI TECHNOLOGIES CO., LTD., Shenzhen, Guangdong (CN)

(72) Inventors: Chunhui Zhang, Wuhan (CN); Peng Zhang, Wuhan (CN); Shengyong Yan, Wuhan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/241,117

(22) Filed: Jan. 7, 2019

(65) Prior Publication Data
US 2019/0158941 A1 May 23, 2019

Related U.S. Application Data

(63) Continuation of application No. PCT/CN2017/078627, filed on Mar. 29, 2017.

(30) Foreign Application Priority Data

Aug. 30, 2016 (CN) .......................... 2016 1 0766804

(51) Int. Cl.
*G02B 6/26* (2006.01)
*H04Q 11/00* (2006.01)

(52) U.S. Cl.
CPC ..... *H04Q 11/0005* (2013.01); *H04Q 11/0003* (2013.01); *H04Q 2011/0041* (2013.01); *H04Q 2011/0058* (2013.01)

(58) Field of Classification Search
CPC .............. H04Q 11/0005; G02B 6/3546; G02B 6/3512; G02B 6/3556; G02B 6/356; G02B 6/26
See application file for complete search history.

(56) References Cited

U.S. PATENT DOCUMENTS

| 6,618,518 B1 | 9/2003 | Mahadevan et al. |
| 7,212,743 B2 | 5/2007 | Hayashi et al. |

(Continued)

FOREIGN PATENT DOCUMENTS

| CN | 1548995 A | 11/2004 |
| CN | 102156330 A | 8/2011 |
| CN | 105409140 A | 3/2016 |

OTHER PUBLICATIONS

International Search Report and Written Opinion issued in International Application No. PCT/CN2017/078627 dated Jun. 30, 2017, 13 pages.

(Continued)

*Primary Examiner* — Jennifer Doan
(74) *Attorney, Agent, or Firm* — Fish & Richardson P.C.

(57) ABSTRACT

This application discloses a method and an apparatus for controlling an optical switch matrix. The method includes: setting row drives corresponding to P input ports to a reset row drive value, and setting column drives corresponding to Q output ports to a reset column drive value, so that optical switches at intersections are in a first state; successively setting, based on time, a row drive corresponding to an $i^{th}$ input port to values in a switching row drive sequence, and successively setting, based on time, a column drive corresponding to a $j^{th}$ output port to values in a switching column drive sequence, so that a target optical switch in the P×Q optical switches remains in the first state, and the other optical switches are switched from the first state to a second state in first time periods.

20 Claims, 22 Drawing Sheets

(56) References Cited

U.S. PATENT DOCUMENTS

| | | | | |
|---|---|---|---|---|
| 7,499,464 B2* | 3/2009 | Ayrapetian | ......... | H04L 49/3036 370/412 |
| 7,933,266 B2* | 4/2011 | Zadikian | ............ | H04J 14/0227 370/350 |
| 2017/0041689 A1 | 2/2017 | Yan et al. | | |

OTHER PUBLICATIONS

Teck Yoong Chai et al. Array interconnection for rearrangeable 2-D MEMS optical switch, Journal of Lightwave Technology (vol. 21, Issue: 5, May 2003), pp. 1134-1140, XP011098687.
Extended European Search Report issued in European Application No. 17844862.7 dated Jun. 3, 2019, 5 pages.

* cited by examiner

METHOD AND APPARATUS FOR CONTROLLING OPTICAL SWITCH MATRIX

CROSS-REFERENCE TO RELATED APPLICATIONS

This application is a continuation of International Application No. PCT/CN2017/078627, filed on Mar. 29, 2017, which claims priority to Chinese Patent Application No. 201610766804.1, filed on Aug. 30, 2016, The disclosures of the aforementioned applications are hereby incorporated by reference in their entireties.

TECHNICAL FIELD

This application relates to the field of optical communications, and more specifically, to a method and an apparatus for controlling an optical switch matrix.

BACKGROUND

The growth of high-bandwidth services such as high-definition online video and cloud computing has posed a huge bandwidth challenge to an optical communications network. The optical communications network mainly includes three parts: a transport network, a switching network, and an access network. Because of technical limitations such as a switching speed and energy consumption, an electrical switch in the switching network cannot meet a demand for a huge switching throughput in a high bandwidth requirement. As an optical signal switching technology with low energy consumption and a high throughput, an all-optical switching technology will replace an electrical switching technology and become a main technology for the switching network in the future.

A core component for implementing the all-optical switching technology is an optical switch matrix. A type of optical switch matrix is based on silicon-based MEMS technology optical switches that have a hysteresis effect. An optical switch matrix of this type has advantages such as a high speed and a low insertion loss, and can meet an increasing data exchange requirement of the switching network. A basic unit of the optical switch matrix of this type is a 2×2 optical switch. The 2×2 optical switch includes cross waveguides and a movable waveguide. When the movable waveguide moves away from the cross waveguides, the optical switch is in an OFF state, and an optical signal keeps propagating directly through the cross waveguides. When the movable waveguide moves close to the cross waveguides, the optical switch is in an ON state, the cross waveguides and the movable waveguide form adiabatic couplers, and an optical signal is coupled from one waveguide to the other waveguide by using the adiabatic couplers.

The optical switch matrix usually has a crossbar topological structure. The crossbar topological structure is an optical switch matrix structure formed by connecting 2×2 optical switches together in a cross-bar manner. For example, for an n×n optical switch matrix, $n^2$ optical switches are connected together in n rows and n columns, left ports of optical switches in a first column serve as input ports of the optical switch matrix, and lower ports of optical switches in an $n^{th}$ row serve as output ports of the optical switch matrix. When the optical switch matrix needs to switch an optical signal on an input port i to an output port j, it is required to switch an optical switch in an $i^{th}$ row and a $j^{th}$ column to the ON state, and switch other optical switches in the $i^{th}$ row and other optical switches in the $j^{th}$ column to the OFF state. For the n×n optical switch matrix of the crossbar topological structure, if n input ports and n output ports are all used, only n optical switches in the optical switch matrix are in the ON state, and the other optical switches are in the OFF state. Each optical switch has two electrodes, and a state of the optical switch is driven by a voltage difference (referred to as a drive voltage) between the two electrodes.

When a size of the optical switch matrix is small, electrodes of each optical switch may be connected to an external drive circuit for separate control. As input ports and output ports of the optical switch matrix increase in quantity, a quantity of optical switches in a crossbar topological structure increases exponentially. If electrodes of the optical switches are all connected to external drive circuits for separate control, there are a large quantity of chip pins, and packaging is highly difficult.

An existing solution is a serial control method, in which one electrode of all optical switches in each row is connected and extruded together in rows and the other electrode of all the optical switches in each row is connected and extruded together in columns. For the n×n optical switch matrix, a total quantity of electrodes extruded to edges of a chip is 2n. With such a connection, a voltage difference between two electrodes of the optical switch in the $i^{th}$ row and the $j^{th}$ column is a difference between a voltage of the $i^{th}$ row and a voltage of the $j^{th}$ column. However, due to the hysteresis effect of the optical switch, optical switches that need to be switched can only be controlled one by one in this solution. When a relatively large quantity of ports need to be switched, many optical switches need to be controlled, and this greatly prolongs a switching time of the optical switch matrix and reduces working efficiency of the optical switch matrix.

SUMMARY

This application provides a method and an apparatus for controlling an optical switch matrix, so that a switching time of the optical switch matrix can be shortened and working efficiency of the optical switch matrix can be increased.

According to a first aspect, a method for controlling an optical switch matrix is provided, where the optical switch matrix is an M×N optical switch matrix of a crossbar structure, the optical switch matrix includes M input ports and N output ports, any optical switch in M×N optical switches of the optical switch matrix includes a first drive and a second drive, first drives of N optical switches in each row of the optical switch matrix are connected together to form a row drive, and second drives of M optical switches in each column of the optical switch matrix are connected together to form a column drive, where M and N are both positive integers, and at least one of M and N is greater than or equal to 2; and the method includes:

setting P row drives corresponding to P to-be-switched input ports in the M input ports to a reset row drive value, and setting Q column drives corresponding to Q to-be-switched output ports in the N output ports to a reset column drive value, so that P×Q optical switches at intersections of the P input ports and the Q output ports are in a first state, where P is less than or equal to M, and Q is less than or equal to N; and simultaneously performing the following operations on the P row drives corresponding to the P input ports and the Q column drives corresponding to the Q output ports: successively setting, based on time, a row drive corresponding to an $i^{th}$ input port in the P input ports to values in a switching row drive sequence, and successively setting, based on time, a column drive corresponding to a $j^{th}$ output port in the Q output ports to values in a switching column drive sequence, where the switching row drive sequence and the switching column drive sequence make a target optical switch in the P×Q optical switches remain in the first state all the time, and the switching row drive sequence and the switching column drive sequence make other optical switches in the P×Q optical switches different from the target optical switch switched from the first state to a second state in first time periods respectively corresponding to the other optical switches, where the target optical switch is at least one optical switch at an intersection of at least one input port in the P input ports and a target output port corresponding to the at least one input port, a value of i is 1, 2, . . . , or P, and a value of j is 1, 2, . . . , or Q.

According to the method for controlling an optical switch matrix in the first aspect, the optical switches at the intersections of the to-be-switched input ports and the to-be-switched output ports are all set to be in the first state, and then the switching row drive sequence and the switching column drive sequence are simultaneously applied to the row drives and the column drives of the optical switches, respectively. In this way, the optical switches are simultaneously controlled instead of being controlled one by one, so that a switching time of the optical switch matrix can be shortened and working efficiency of the optical switch matrix can be increased.

In a possible implementation of the first aspect, the any optical switch in the M×N optical switches of the optical switch matrix in the first aspect may be an optical switch having non-linear drive characteristics. The optical switch may include a first drive and a second drive, and a transmission loss changes non-linearly with a parameter value of the first drive and a parameter value of the second drive of the optical switch, that is, a relationship between the transmission loss and a value obtained after an operation is performed on the parameter value of the first drive and the parameter value of the second drive is a non-linear relationship.

Specifically, the any optical switch in the M×N optical switches of the optical switch matrix may be an optical switch having a hysteresis effect in terms of drive characteristics.

Optionally, the any optical switch in the M×N optical switches of the optical switch matrix can meet the following: when a value obtained after an operation is performed on a parameter value of the first drive and a parameter value of the second drive belongs to a first interval, the any optical switch is in the first state; or when a value obtained after an operation is performed on a parameter value of the first drive and a parameter value of the second drive belongs to a second interval, the any optical switch remains in a current state; or when a value obtained after an operation is performed on a parameter value of the first drive and a parameter value of the second drive belongs to a third interval, the any optical switch is in the second state, where an intersection of any two of the first interval, the second interval, and the third interval is an empty set; the reset row drive value and the reset column drive value meet the following: a value obtained after an operation is performed on the reset row drive value and the reset column drive value belongs to the first interval; and any value in the switching row drive sequence and a corresponding value in the switching column drive sequence meet the following: a value obtained after an operation is performed on the any value in the switching row drive sequence and the corresponding value in the switching column drive sequence belongs to the second interval or belongs to the third interval.

In a possible implementation of the first aspect, the switching row drive sequence is $[X_{i,1}, X_{i,2}, \ldots, X_{i,2t}]$, the switching column drive sequence is $[Y_{j,1}, Y_{j,2}, \ldots, Y_{j,2t}]$, and the successively setting, based on time, a row drive corresponding to an $i^{th}$ input port in the P input ports to values in a switching row drive sequence, and successively setting, based on time, a column drive corresponding to a $j^{th}$ output port in the Q output ports to values in a switching column drive sequence may include: in an $a^{th}$ time unit of 2t time units, setting the row drive corresponding to the $i^{th}$ input port to a switching row drive value $X_{i,a}$, and setting the column drive corresponding to the $j^{th}$ output port to a switching column drive value $Y_{j,a}$, where in the 2t time units, the target optical switch remains in the first state all the time, and the other optical switches in the P×Q optical switches different from the target optical switch are switched from the first state to the second state in first time units respectively corresponding to the other optical switches, where the first time period is the first time unit, and a value of a is 1, 2, . . . , or 2t.

In a possible implementation of the first aspect, the method may further include: determining the P to-be-switched input ports and the Q to-be-switched output ports in the optical switch matrix based on a direction along which an optical signal is to be transmitted.

This possible implementation corresponds to a situation in which only some ports need to be switched and the other ports do not need to be switched. In this case, P is less than M, and Q is less than N. In the method in this possible implementation, the to-be-switched ports are counted, and only optical switches corresponding to the to-be-switched ports are switched, without affecting transmission of optical signals on the other ports.

Optionally, P may not be equal to Q.

In a possible implementation of the first aspect, the switching row drive sequence is a switching row voltage sequence $[U_{i,1}, U_{i,2}, \ldots, U_{i,2t}]$, the switching column drive sequence is a switching column voltage sequence $[V_{j,1}, V_{j,2}, \ldots, V_{j,2t}]$, and the successively setting, based on time, a row drive corresponding to an $i^{th}$ input port in the P input ports to values in a switching row drive sequence, and successively setting, based on time, a column drive corresponding to a $j^{th}$ output port in the Q output ports to values in a switching column drive sequence includes: representing the $i^{th}$ input port in the P input ports as $[C_{i,1}, C_{i,2}, \ldots, C_{i,2t}]$ by using a 2t-digit base-s number, where any two input ports in the P input ports correspond to different 2t-digit base-s numbers; and representing the $j^{th}$ output port in the Q output ports as $[D_{j,1}, D_{j,2}, \ldots, D_{j,2t}]$ by using a 2t-digit base-s number, where any two output ports in the Q output ports correspond to different 2t-digit base-s numbers, a 2t-digit base-s number corresponding to the first target input port and a 2t-digit base-s number corresponding to the first target output port are the same, a set of values available for each digit of the 2t-digit base-s number is [0, 1, . . . , s−1], a switching row drive value set corresponding to the value set [0, 1, . . . , s−1] is $[U_0, U_1, \ldots, U_{s-1}]$, and a switching column drive value set corresponding to the value set [0, 1, . . . , s−1] is $[V_0, V_1, \ldots, V_{s-1}]$; and simultaneously performing the following operations on the P row drives corresponding to the P input ports and the Q column drives corresponding to the Q output ports: in the $a^{th}$ time unit of the 2t time units, setting the row drive corresponding to the $i^{th}$ input port to a switching row drive value $U_{Ci,a}$ corresponding to a value $C_{i,a}$ of an $a^{th}$ digit of the 2t-digit base-s number as which the $i^{th}$ input port is represented, and setting the column drive corresponding to the $j^{th}$ output port to a switching column drive value $V_{Dj,a}$ corresponding to a value $D_{j,a}$ of an $a^{th}$ digit of the 2t-digit base-s number as which the $j^{th}$ output port is represented, where a value of a is 1, 2, . . . , or 2t, where the switching row drive value set $[U_0, U_1, \ldots, U_{s-1}]$ and the switching column drive value set $[V_0, V_1, \ldots, V_{s-1}]$ meet the following: when an $m^{th}$ switching row drive value $U_m$ in the switching row drive value set $[U_0, U_1, \ldots, U_{s-1}]$ is applied to a first row drive, and an $n^{th}$ switching column drive value $V_n$ in the switching drive value set $[V_0, V_1, \ldots, V_{s-1}]$ is applied to a first column drive, an optical switch at an intersection of the first row drive and the first column drive remains in a current state or is switched from the first state to the second state, and the optical switch at the intersection of the first row drive and the first column drive cannot be switched from the second state to the first state.

In this possible implementation, the first drive and the second drive may be electrodes.

Optionally, the switching row drive value set $[U_0, U_1, \ldots, U_{s-1}]$ and the switching column drive value set $[V_0, V_1, \ldots, V_{s-1}]$ can meet the following: when $U_m$ is applied to the first row drive, and $V_n$ is applied to the first column drive, if m≥n, the optical switch at the intersection of the first row drive and the first column drive remains in an original state; or if m<n, the optical switch at the intersection of the first row drive and the first column drive is switched to the second state; and 2t-digit base-s numbers as which the P input ports are respectively represented and 2t-digit base-s numbers as which the Q output ports are respectively represented meet the following: the 2t-digit base-s number corresponding to the $i^{th}$ input port in the P input ports is $[C_{i,1}, C_{i,2}, \ldots, C_{i,2t}]$, $[C_{i,1}, C_{i,2}, \ldots, C_{i,2t}]$ is divided into first t digits and second t digits, the 2t-digit base-s number corresponding to the $j^{th}$ output port in the Q output ports is $[D_{j,1}, D_{j,2}, \ldots, D_{j,2t}]$, and $[D_{j,1}, D_{j,2}, \ldots, D_{j,2t}]$ is divided into third t digits and fourth t digits, where positions of the first t digits in $[C_{i,1}, C_{i,2}, \ldots, C_{i,2t}]$ are the same as those of the third t digits in $[D_{j,1}, D_{j,2}, \ldots, D_{j,2t}]$, and when a value of any digit in the first t digits is $C_u$, and a value of a corresponding digit in the third t digits is $D_u$, if $C_u$ is not equal to $D_u$, $[C_{i,1}, C_{i,2}, \ldots, C_{i,2t}]$ and $[D_{j,1}, D_{j,2}, \ldots, D_{j,2t}]$ include at least one pair of values that meet $C_v < D_v$.

Optionally, the switching row drive value set $[U_0, U_1, \ldots, U_{s-1}]$ and the switching column drive value set $[V_0, V_1, \ldots, V_{s-1}]$ can meet the following: when $U_m$ is applied to the first row drive, and $V_n$ is applied to the first column drive, if m≤n, the optical switch at the intersection of the first row drive and the first column drive remains in an original state; or if m>n, the optical switch at the intersection of the first row drive and the first column drive is switched to the second state; and 2t-digit base-s numbers as which the P input ports are respectively represented and 2t-digit base-s numbers as which the Q output ports are respectively represented meet the following: the 2t-digit base-s number corresponding to the $i^{th}$ input port in the P input ports is $[C_{i,1}, C_{i,2}, \ldots, C_{i,2t}]$, $[C_{i,1}, C_{i,2}, \ldots, C_{i,2t}]$ is divided into first t digits and second t digits, the 2t-digit base-s number corresponding to the $j^{th}$ output port in the Q output ports is $[D_{j,1}, D_{j,2}, \ldots, D_{j,2t}]$, and $[D_{j,1}, D_{j,2}, \ldots, D_{j,2t}]$ is divided into third t digits and fourth t digits, where positions of the first t digits in $[C_{i,1}, C_{i,2}, \ldots, C_{i,2t}]$ are the same as those of the third t digits in $[D_{j,1}, D_{j,2}, \ldots, D_{j,2t}]$, and when a value of any digit in the first t digits is $C_u$, and a value of a corresponding digit in the third t digits is $D_u$, if $C_u$ is not equal to $D_u$, $[C_{i,1}, C_{i,2}, \ldots, C_{i,2t}]$ and $[D_{j,1}, D_{j,2}, \ldots, D_{j,2t}]$ include at least one pair of values that meet $C_v > D_v$.

A sum of a value of one digit in the second t digits and a value of a corresponding digit in the first t digits of the 2t-digit base-s number $[C_{i,1}, C_{i,2}, \ldots, C_{i,2t}]$ corresponding to the $i^{th}$ input port is s−1, and a sum of a value of one digit in the fourth t digits and a value of a corresponding digit in the third t digits of the 2t-digit base-s number $[D_{j,1}, D_{j,2}, \ldots, D_{j,2t}]$ corresponding to the $j^{th}$ output port is s−1.

It should be understood that s and t may be determined based on a maximum value between P and Q.

In a possible implementation of the first aspect, the any optical switch in the M×N optical switches of the optical switch matrix can meet the following: when the value obtained after the operation is performed on the parameter value of the first drive and the parameter value of the second drive belongs to the first interval, the any optical switch is in the first state; or when the value obtained after the operation is performed on the parameter value of the first drive and the parameter value of the second drive belongs to the second interval, the any optical switch remains in the current state; or when the value obtained after the operation is performed on the parameter value of the first drive and the parameter value of the second drive belongs to the third interval, the any optical switch is in the second state, where the intersection of any two of the first interval, the second interval, and the third interval is the empty set; and that the value obtained after the operation is performed on the parameter value of the first drive and the parameter value of the second drive belongs to the first interval means that an absolute value of a difference between the parameter value of the first drive and the parameter value of the second drive is greater than a first threshold, that the value obtained after the operation is performed on the parameter value of the first drive and the parameter value of the second drive belongs to the second interval means that the absolute value of the difference between the parameter value of the first drive and the parameter value of the second drive is less than the first threshold and greater than a second threshold, and that the value obtained after the operation is performed on the parameter value of the first drive and the parameter value of the second drive belongs to the third interval means that the absolute value of the difference between the parameter value of the first drive and the parameter value of the second drive is less than the second threshold; and the switching row drive value set $[U_0, U_1, \ldots, U_{s-1}]$ and the switching column drive value set $[V_0, V_1, \ldots, V_{s-1}]$ are determined by using the following method: determining 2s−1 arithmetic progression values $\Delta U_1, \Delta U_2, \Delta U_3, \ldots,$ and $\Delta U_{2s-1}$ based on the first threshold and the second threshold, where $\Delta U_1, \Delta U_2, \ldots,$ and $\Delta U_{s-1}$ are less than the second threshold, and $\Delta U_s, \Delta U_{s+1}, \ldots,$ and $\Delta U_{2s-1}$ are greater than the second threshold and less than the first threshold; determining the switching column drive value set $[V_0, V_1, \ldots, V_{s-1}]$, where a common difference of $V_0, V_1, \ldots,$ and $V_{s-1}$ is $\Delta U_2 - \Delta U_1$; and adding $\Delta U_s$ to any switching column drive value in the switching column drive value set $[V_0, V_1, \ldots, V_{s-1}]$, to obtain a corresponding switching row drive value, so that switching row drive values form the switching row drive value set $[U_0, U_1, \ldots, U_{s-1}]$.

In another possible implementation of the first aspect, the switching row drive sequence is a switching row current sequence $[H_{i,1}, H_{i,2}, \ldots, H_{i,2t}]$, the switching column drive sequence is a switching column current sequence $[I_{j,1}, I_{j,2}, \ldots, I_{j,2t}]$, and the successively setting, based on time, a row drive corresponding to an $i^{th}$ input port in the P input ports to values in a switching row drive sequence, and successively setting, based on time, a column drive corresponding to a $j^{th}$ output port in the Q output ports to values in a switching column drive sequence includes: representing the $i^{th}$ input port in the P input ports as $[C_{i,1}, C_{i,2}, \ldots, C_{i,2t}]$ by using a 2t-digit base-s number, where any two input ports in the P input ports correspond to different 2t-digit base-s numbers; and representing the $j^{th}$ output port in the Q output ports as $[D_{j,1}, D_{j,2}, \ldots, D_{j,2t}]$ by using a 2t-digit base-s number, where any two output ports in the Q output ports correspond to different 2t-digit base-s numbers, a sum of a value of one digit of a 2t-digit base-s number corresponding to the first target input port and a value of a corresponding digit of a 2t-digit base-s number corresponding to the first target output port is s−1, a set of values available for each digit of the 2t-digit base-s number is [0, 1, . . . , s−1], a switching row drive value set corresponding to the value set [0, 1, . . . , s−1] is $[H_0, H_1, \ldots, H_{s-1}]$, and a switching column drive value set corresponding to the value set [0, 1, . . . , s−1] is $[I_0, I_1, \ldots, I_{s-1}]$; and simultaneously performing the following operations on the P row drives corresponding to the P input ports and the Q column drives corresponding to the Q output ports: in the $a^{th}$ time unit of the 2t time units, setting the row drive corresponding to the $i^{th}$ input port to a switching row drive value $H_{C_{i,a}}$ corresponding to a value $C_{i,a}$ of an $a^{th}$ digit of the 2t-digit base-s number as which the $i^{th}$ input port is represented, and setting the column drive corresponding to the $j^{th}$ output port to a switching column drive value $I_{D_{j,a}}$ corresponding to a value $D_{j,a}$ of an $a^{th}$ digit of the 2t-digit base-s number as which the $j^{th}$ output port is represented, where a value of a is 1, 2, . . . , or 2t, where the switching row drive value set $[H_0, H_1, \ldots, H_{s-1}]$ and the switching column drive value set $[I_0, I_1, \ldots, I_{s-1}]$ meet the following: when an $m^{th}$ switching row drive value $H_m$ in the switching row drive value set $[H_0, H_1, \ldots, H_{s-1}]$ is applied to a first row drive, and an $n^{th}$ switching column drive value $I_n$ in the switching drive value set $[I_0, I_1, \ldots, I_{s-1}]$ is applied to a first column drive, an optical switch at an intersection of the first row drive and the first column drive remains in a current state or is switched from the first state to the second state, and the optical switch at the intersection of the first row drive and the first column drive cannot be switched from the second state to the first state.

In this possible implementation, the first drive and the second drive may be carrier injection actuators.

Optionally, the any optical switch in the M×N optical switches of the optical switch matrix can meet the following: when the value obtained after the operation is performed on the parameter value of the first drive and the parameter value of the second drive belongs to the first interval, the any optical switch is in the first state; or when the value obtained after the operation is performed on the parameter value of the first drive and the parameter value of the second drive belongs to the second interval, the any optical switch remains in the current state; or when the value obtained after the operation is performed on the parameter value of the first drive and the parameter value of the second drive belongs to the third interval, the any optical switch is in the second state, where the intersection of any two of the first interval, the second interval, and the third interval is the empty set; and that the value obtained after the operation is performed on the parameter value of the first drive and the parameter value of the second drive belongs to the first interval means that a sum of the parameter value of the first drive and the parameter value of the second drive belongs to the first interval, that the value obtained after the operation is performed on the parameter value of the first drive and the parameter value of the second drive belongs to the second interval means that the sum of the parameter value of the first drive and the parameter value of the second drive belongs to the second interval, and that the value obtained after the operation is performed on the parameter value of the first drive and the parameter value of the second drive belongs to the third interval means that the sum of the parameter value of the first drive and the parameter value of the second drive belongs to the third interval.

In a possible implementation of the first aspect, the method may further include: setting the P row drives corresponding to the P to-be-switched input ports in the M input ports to a hold row drive value, and setting the Q column drives corresponding to the Q to-be-switched output ports in the N output ports to a hold column drive value, where a value obtained after an operation is performed on the hold row drive value and the hold column drive value makes the P×Q optical switches at the intersections of the P input ports and the Q output ports remain in a current state.

In the method in this possible implementation, after the optical switches corresponding to the to-be-switched ports are switched, the P row drives are set to the hold row drive value, and the Q column drives are set to the hold column drive value, so that the corresponding optical switches remain in a switched state.

In a possible implementation of the first aspect, the method may further include: determining the P to-be-switched input ports and the Q to-be-switched output ports in the optical switch matrix based on switching requirements collected by an asynchronous switching system in a second time period.

According to the method for controlling an optical switch matrix provided in this application, in a switching process, states of ports that do not need to be switched are not affected, and optical signals transmitted on the ports are not interrupted. This solution is applicable especially to an asynchronous switching system.

According to a second aspect, an apparatus for controlling an optical switch matrix is provided, where the apparatus includes a reset module and an establishment module, and is configured to implement the method for controlling an optical switch matrix in the first aspect. A function of the apparatus for controlling an optical switch matrix may be implemented by hardware, or implemented by executing corresponding software by hardware. The hardware or software includes one or more modules that correspond to the foregoing function. The apparatus for controlling an optical switch matrix may further include a determining module and/or a maintaining module, to implement corresponding possible implementations in the first aspect.

The apparatus for controlling an optical switch matrix may be a processor, a control circuit, or a chip.

DESCRIPTION OF EMBODIMENTS

The following describes the technical solutions in this application with reference to the accompanying drawings.

Figure 1:
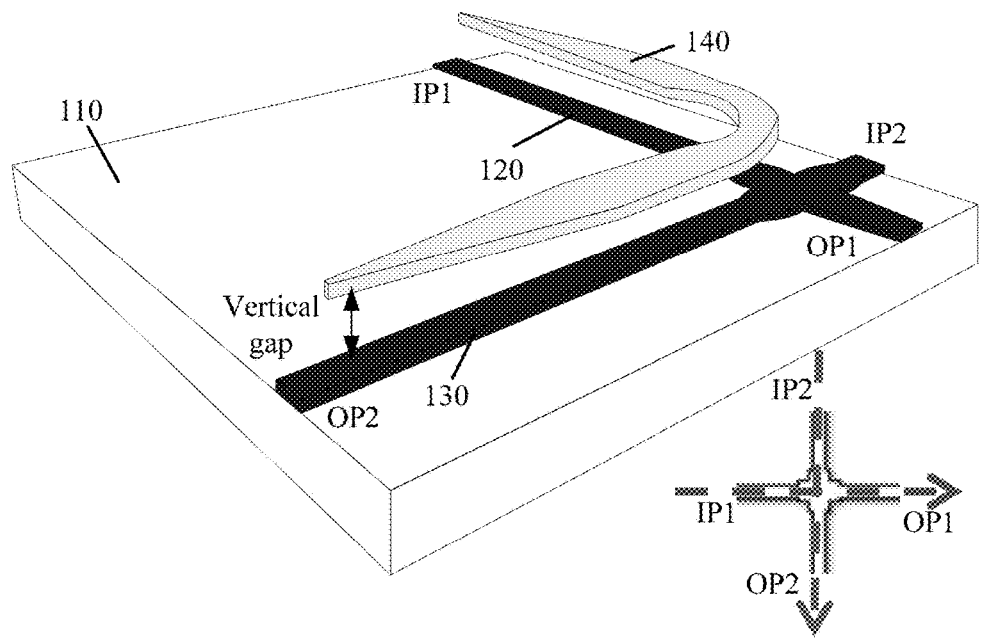
FIG. 1 and FIG. 2 are schematic diagrams of an optical switch in an OFF state and an ON state, respectively.
Figure 2:
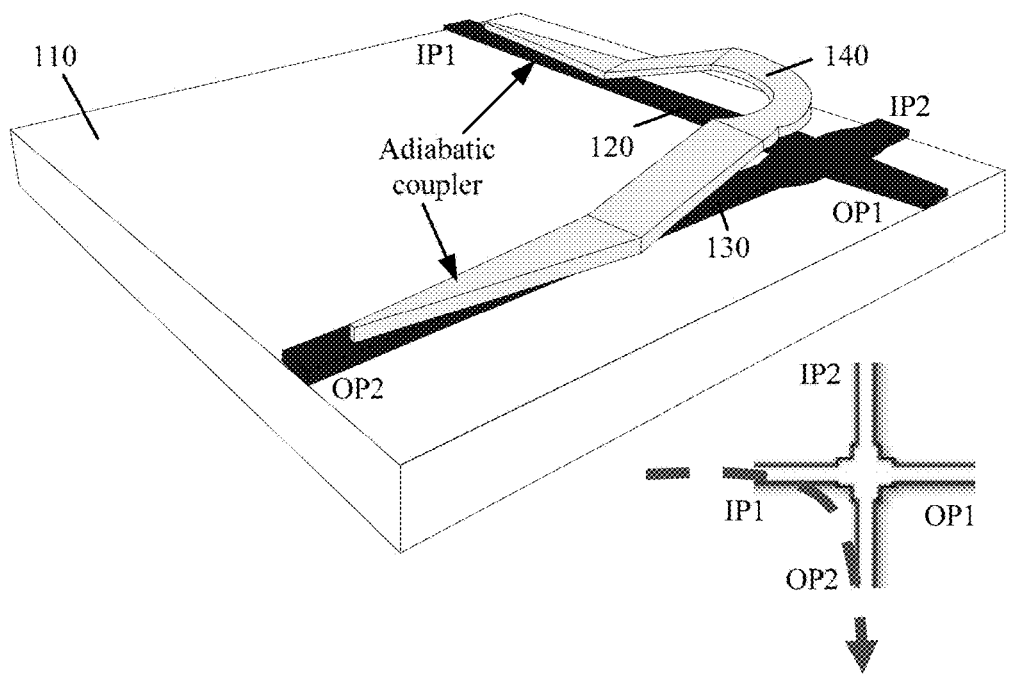

First, an optical switch having a hysteresis effect according to an embodiment of this application is described. FIG. 1 and FIG. 2 are schematic diagrams of the optical switch 100 in an OFF (Through) state and an ON (Drop) state, respectively. The optical switch 100 is based on silicon-based optical waveguides, including an upper-layer optical waveguide and lower-layer optical waveguides. The lower-layer optical waveguides include two cross bus optical waveguides (a through waveguide 120 and a drop waveguide 130) that are fastened on a substrate 110. The upper-layer optical waveguide includes one shunting optical waveguide 140 that can perpendicularly move relative to the substrate 110, and the shunting optical waveguide 140 is actuated by using static electricity. The through waveguide 120 of the optical switch 100 has a first input port IP1 and a first output port OP1, and the drop waveguide 130 of the optical switch 100 has a second input port IP2 and a second output port OP2.

As shown in FIG. 1, when the optical switch 100 is in the OFF state, no voltage is applied to an actuator, there is a relatively large vertical gap between the shunting optical waveguide 140 and the two bus optical waveguides, and the shunting optical waveguide 140 is not optically coupled to the two bus optical waveguides. Input light that is input from the IP1 is transmitted along the through waveguide 120 and perpendicularly intersects with the drop waveguide 130, and output light is output from the OP1 of the through waveguide 120. As shown in FIG. 2, when the optical switch 100 is in the ON state, a voltage is applied to the actuator, the shunting optical waveguide 140 perpendicularly moves downwards. The vertical gap between the shunting optical waveguide 140 and the two bus optical waveguides decreases, and the shunting optical waveguide 140 is optically coupled to both the bus optical waveguides, thereby forming two adiabatic couplers (Adiabatic couplers) with coupling in a vertical direction. Input light that is input from the IP1 is first coupled from the through waveguide to the shunting optical waveguide 140 by using a first adiabatic coupler, and then coupled from the shunting optical waveguide 140 to the drop waveguide 130 by using a second adiabatic coupler, and output light is output from the OP2 of the drop waveguide 130.

Figure 3:
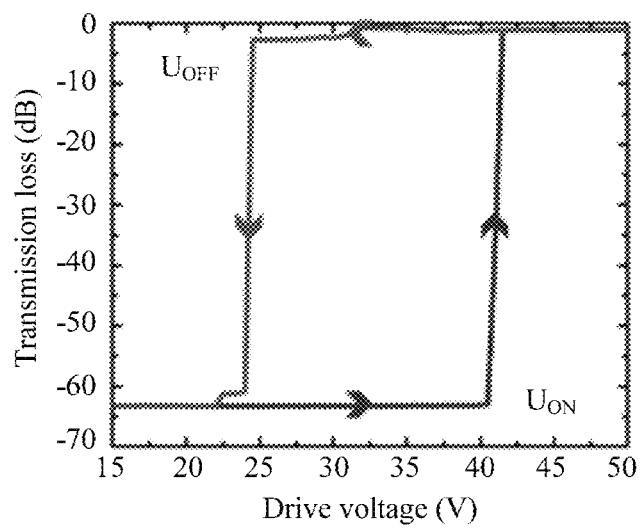
FIG. 3 is a schematic diagram of drive characteristics of an optical switch according to an embodiment of this application.
Figure 4:
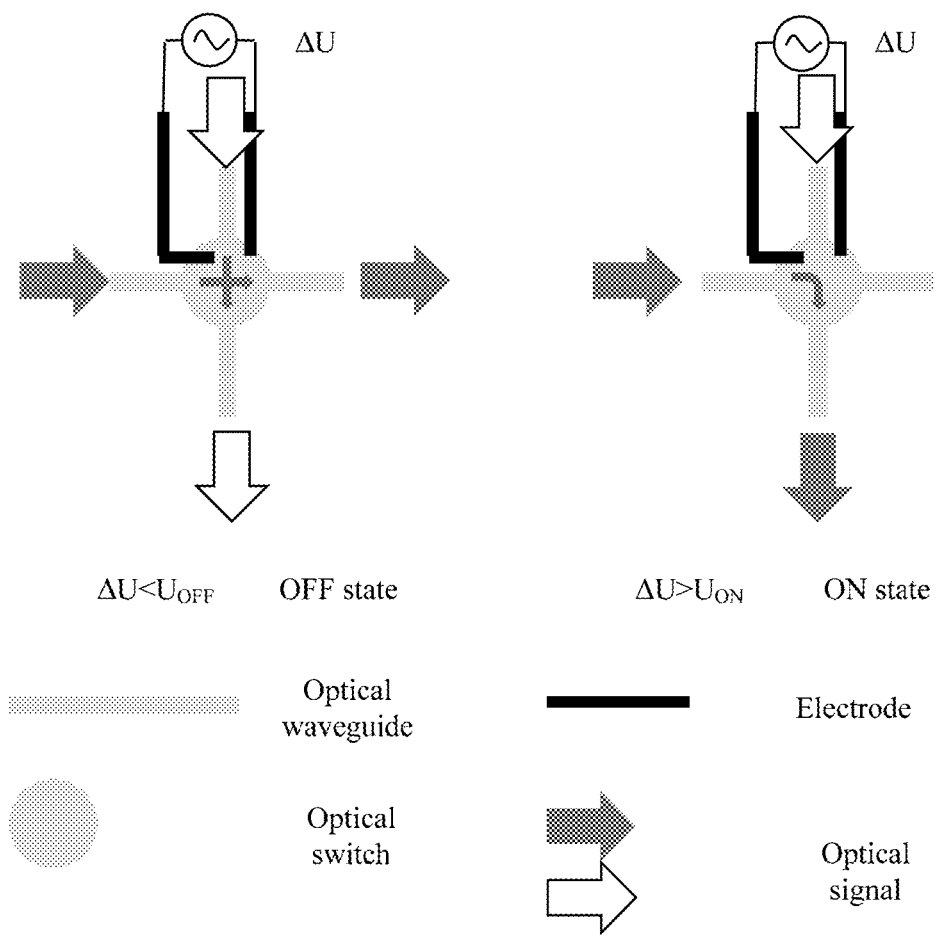
FIG. 4 is a schematic diagram of an OFF state and an ON state of an optical switch according to an embodiment of this application.

The following uses an example to describe drive characteristics of an optical switch having a hysteresis effect. For example, for the optical switch shown in FIG. 1 and FIG. 2, the drive characteristics of the optical switch are shown in FIG. 3, and a status of the optical switch is shown in FIG. 4. When an absolute value $\Delta U$ of a voltage difference between two electrodes of the optical switch meets $\Delta U > U_{ON}$, the optical switch is in the ON state; or when an absolute value $\Delta U$ of a voltage difference between two electrodes of the optical switch meets $\Delta U < U_{OFF}$, the optical switch is in the OFF state; or when an absolute value $\Delta U$ of a voltage difference between two electrodes of the optical switch meets $U_{OFF} < \Delta U < U_{ON}$, a state of the optical switch remains unchanged.

It should be understood that an optical switch in embodiments of this application also has a hysteresis effect, but is not limited to the optical switch shown in FIG. 1 to FIG. 4. Any optical switch in M×N optical switches in an optical switch matrix in the embodiments of this application includes a first drive and a second drive. When a value obtained after an operation is performed on a parameter value of the first drive and a parameter value of the second drive belongs to a first interval, the any optical switch is in a first state; or when a value obtained after an operation is performed on a parameter value of the first drive and a parameter value of the second drive belongs to a second interval, the any optical switch remains in a current state; or when a value obtained after an operation is performed on a parameter value of the first drive and a parameter value of the second drive belongs to a third interval, the any optical switch is in a second state. An intersection of any two of the first interval, the second interval, and the third interval is an empty set, and the second interval is between the first interval and the third interval.

For the optical switch shown in FIG. 1 to FIG. 4, the first drive and the second drive are voltages, the parameter value of the first drive and the parameter value of the second drive are voltage values, the operation is difference between the two voltage values, the first state is the OFF state, and the second state is the ON state. The first interval is an interval $(U_{ON}, +\infty)$, denoting a set of values greater than $U_{ON}$; the second interval is an interval $(U_{OFF}, U_{ON})$, denoting a set of values greater than $U_{OFF}$ and less than $U_{ON}$; and the third interval is an interval $(0, U_{OFF})$, denoting a set of values less than $U_{OFF}$. When an absolute value of a voltage difference is $U_{OFF}$ or $U_{ON}$, an action of the optical switch is undetermined. For example, the current state of the optical switch is the ON state. When the absolute value of the voltage difference changes from a value greater than $U_{OFF}$ to $U_{OFF}$, the optical switch may not be switched to the OFF state but remain in the ON state, and only when the absolute value of the voltage difference is less than $U_{OFF}$, the optical switch is switched to the OFF state; or the optical switch may be switched to the OFF state when the absolute value of the voltage difference is equal to $U_{OFF}$. This is not limited in the embodiments of this application.

Figure 5:
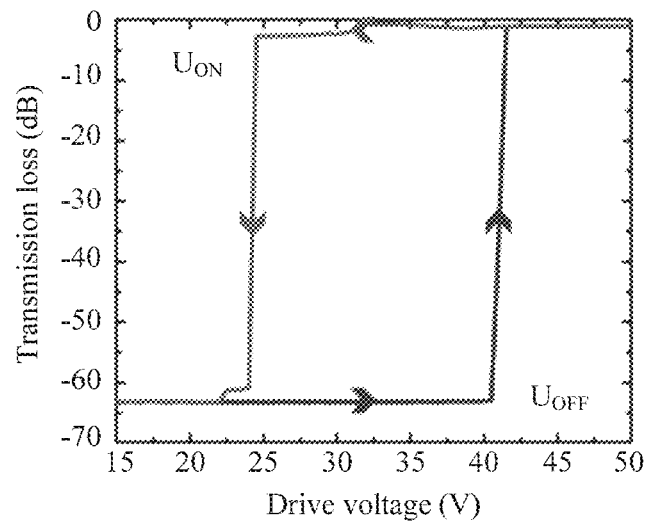
FIG. 5 is a schematic diagram of drive characteristics of an optical switch according to another embodiment of this application.

FIG. 5 is a schematic diagram of drive characteristics of another optical switch. In this case, the first drive and the second drive of the optical switch are voltages, the parameter value of the first drive and the parameter value of the second drive are voltage values, the operation is difference between the two voltage values, the first state is the OFF state, and the second state is the ON state. The drive characteristics of the optical switch are follows: The first interval is an interval $(0, U_{OFF})$, denoting a set of values less than $U_{OFF}$; the second interval is an interval $(U_{OFF}, U_{ON})$, denoting a set of values greater than $U_{OFF}$ and less than $U_{ON}$; and the third interval is an interval $(U_{ON}, +\infty)$, denoting a set of values greater than $U_{ON}$.

Figure 6:
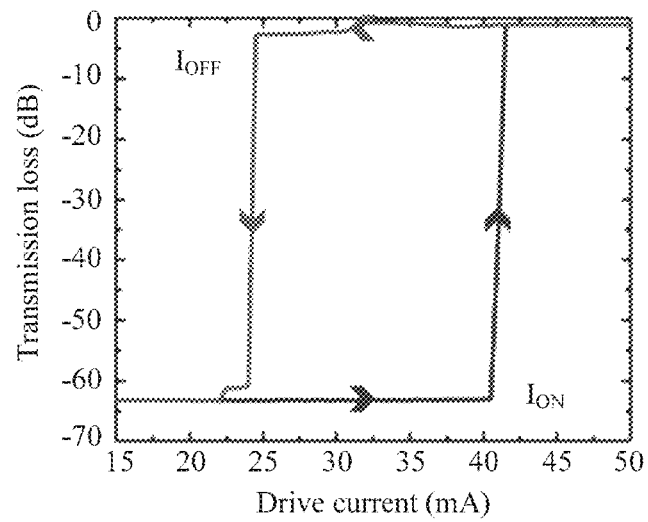
FIG. 6 is a schematic diagram of drive characteristics of an optical switch according to still another embodiment of this application.
Figure 7:
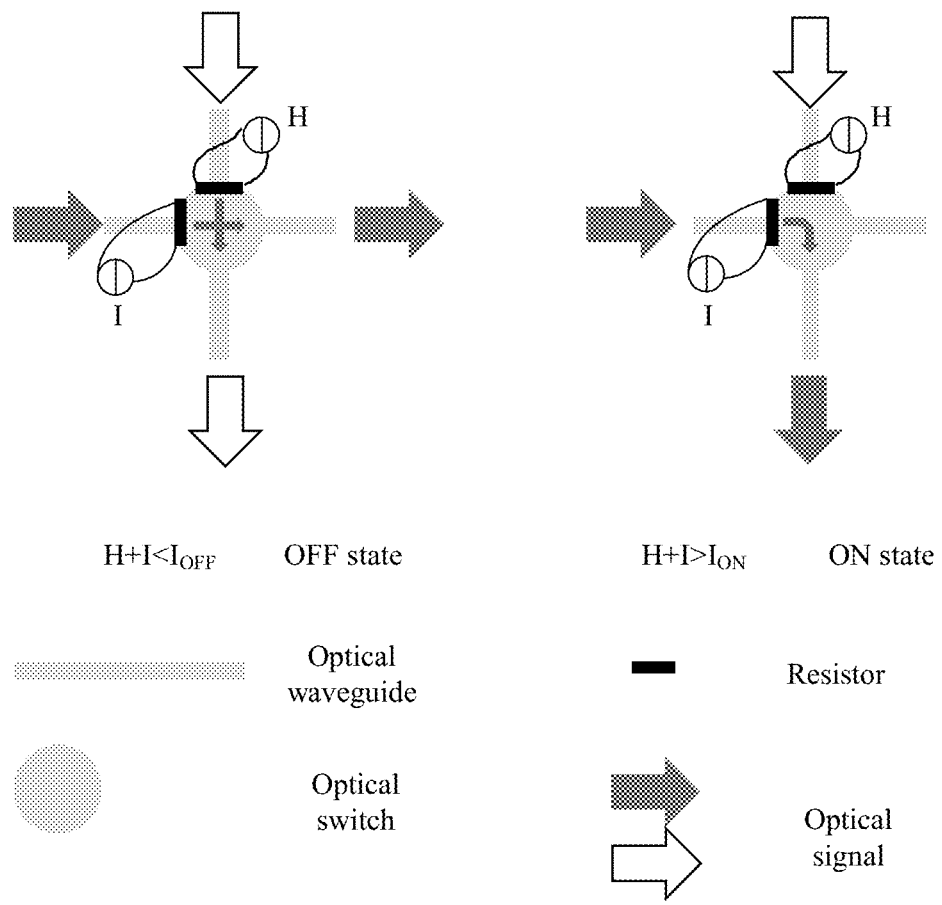
FIG. 7 is a schematic diagram of an OFF state and an ON state of an optical switch according to another embodiment of this application.

FIG. 6 is a schematic diagram of drive characteristics of still another optical switch. FIG. 7 is a schematic diagram of a status of the optical switch. In the optical switch, the first drive and the second drive are carrier injection actuators, the parameter value of the first drive and the parameter value of the second drive are current values H and I, the operation is summation of the two current values, the first state is the OFF state, and the second state is the ON state. The first interval is an interval $(ION, +\infty)$, denoting a set of values greater than ION; the second interval is an interval $(I_{OFF}, I_{ON})$, denoting a set of values greater than $I_{OFF}$ and less than $I_{ON}$; and the third interval is an interval $(0, I_{OFF})$, denoting a set of values less than $I_{OFF}$. When a sum of the current values is $I_{OFF}$ or $I_{ON}$, an action of the optical switch is undetermined. For example, the current state of the optical switch is the ON state. When the sum of the current values changes from a value greater than $I_{OFF}$ to $I_{OFF}$, the optical switch may not be switched to the OFF state but remain in the ON state, and only when the sum of the current values is less than $I_{OFF}$, the optical switch is switched to the OFF state; or the optical switch may be switched to the OFF state when the sum of the current values is equal to $I_{OFF}$. This is not limited in the embodiments of this application.

It should be understood that the first state of the optical switch in the embodiments of this application means that the optical switch is in a state that causes an optical signal that is input from an input port and passes through the optical switch to finally output from an output port; and the second state of the optical switch means that the optical switch is in a state that causes an optical signal that is input from an input port and passes through the optical switch not to finally output from an output port. For an optical switch matrix of a crossbar topological architecture, the first state of the optical switch means that the optical switch is in a state that causes an optical signal that is input from an input port and passes through the optical switch to finally output from a cross; and the second state of the optical switch means that the optical switch is in a state that causes an optical signal that is input from an input port and passes through the optical switch to finally output from a bar. For ease of distinguishing, in this specification, the first state is also referred to as the ON state, and the second state is also referred to as the OFF state. This is only for distinguishing, instead of limitation.

Figure 8:
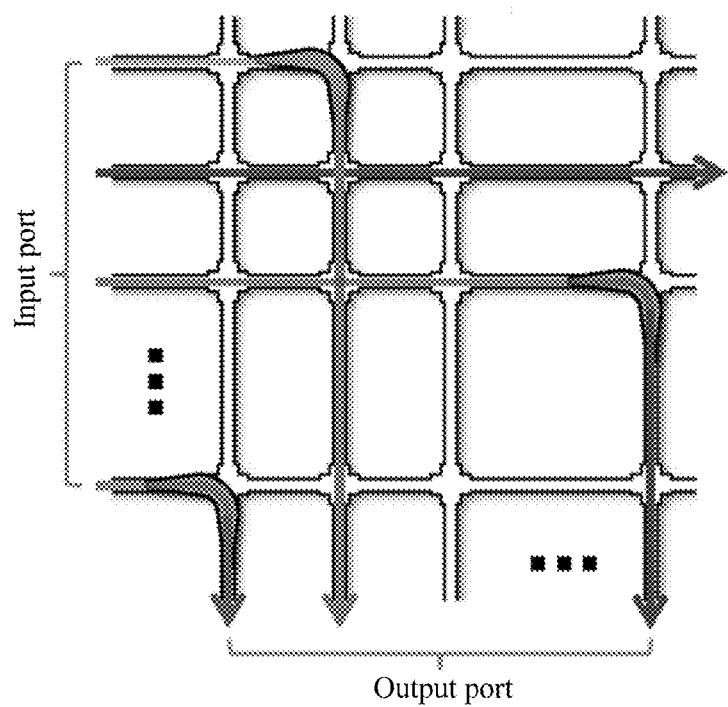
FIG. 8 is a schematic diagram of optical path switching of an optical switch matrix of a crossbar topological architecture.

FIG. 8 is a schematic diagram of optical path switching of an optical switch matrix of a crossbar topological architecture. As shown in FIG. 8, the crossbar topological structure is an optical switch matrix structure formed by connecting 2×2 optical switches of the foregoing principle together in a cross-bar manner. The optical switch matrix includes M×N optical switches, forming a matrix with M rows and N columns. The M×N optical switches each are located at an intersection of each row and each column. A first output port OP1 of one of N optical switches in each row is connected to a first input port IP1 of an adjacent optical switch, and a first input port IP1 that is of an optical switch in the N optical switches in each row and that is not connected to a first output port OP1 of another optical switch is an input port of the optical switch matrix. A second output port OP2 of one of M optical switches in each column is connected to a second input port IP2 of an adjacent optical switch, and a second output port OP2 that is of an optical switch in the M optical switches in each column and that is not connected to a second input port IP2 of another optical switch is an output port of the optical switch matrix. When the optical switch matrix needs to switch an optical signal on an input port m in M input ports to an output port n in N output ports, it is required to switch an optical switch in an $m^{th}$ row and an $n^{th}$ column to the ON state, and switch other optical switches in the $m^{th}$ row and other optical switches in the $n^{th}$ column to the OFF state.

It should be understood that a connection relationship between the optical switches described above is merely an example, and when optical switches of different principles form an optical switch matrix of a crossbar topological architecture, connection relationships between the optical switches may be different. This is not limited in the embodiments of this application.

An existing packaging and driving solution is to separately extrude electrodes of all optical switches and separately control the optical switches. According to this solution for separately controlling the optical switches, for the voltage-driven optical switch shown in FIG. 1 to FIG. 5, a large quantity of electrodes in an optical switch chip need to be connected to external drive circuits. This brings great difficulty to chip packaging. For example, for a 64×64 optical switch matrix, the optical switch matrix includes 4096 optical switches. If two electrodes of each optical switch are both extruded outside a chip for driving, 8192 electrodes need to be extruded. Even if one electrode of each optical switch is grounded and the other electrode is used to supply a drive voltage, 4097 electrodes need to be extruded. For a current-driven optical switch shown in FIG. 6 and FIG. 7, carrier injection actuators of each optical switch also need to be extruded outside a chip for driving. For both voltage driving and current driving, the solution is highly difficult to implement.

Another existing packaging and driving solution is to control optical switches in an optical switch matrix one by one in a row-column addressing manner by using a hysteresis effect of the optical switch. For example, for voltage driving, in this technology, one electrode of each of optical switches is connected and extruded together in rows, and the other electrode of each of the optical switches is connected and extruded together in columns. For an M×N optical switch matrix, a total quantity of electrodes extruded to edges of a chip is M+N. With such a connection, a voltage difference between the two electrodes of an optical switch unit in an $m^{th}$ row and an $n^{th}$ column is a difference between a voltage of the $m^{th}$ row and a voltage of the $n^{th}$ column. A principle for current driving is similar. One carrier injection actuator of each of optical switches is connected and extruded together in rows, and the other carrier injection actuator of each of the optical switches is connected and extruded together in columns. For an M×N optical switch matrix, a total quantity of carrier injection actuators extruded to edges of a chip is M+N. With such a connection, a sum of currents of two carrier injection actuators of an optical switch unit in an $m^{th}$ row and an $n^{th}$ column is a sum of a current of the $m^{th}$ row and a current of the $n^{th}$ column.

Figure 9:
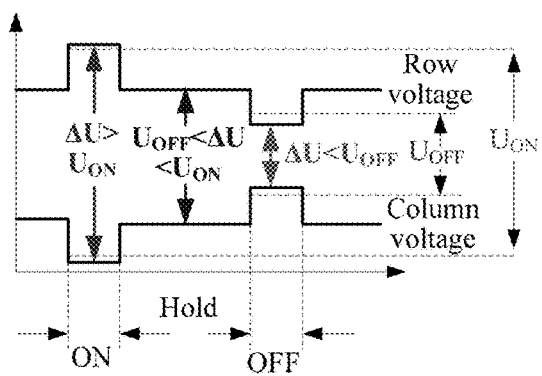
FIG. 9 to FIG. 12 are schematic diagrams of an existing procedure for controlling an optical switch matrix based on, for example, voltage driving.
Figure 10:
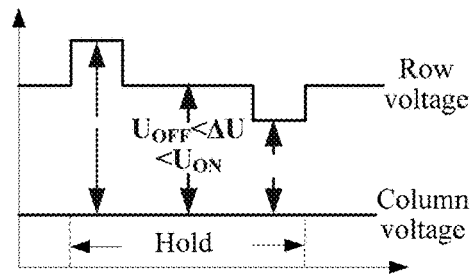
Figure 11:
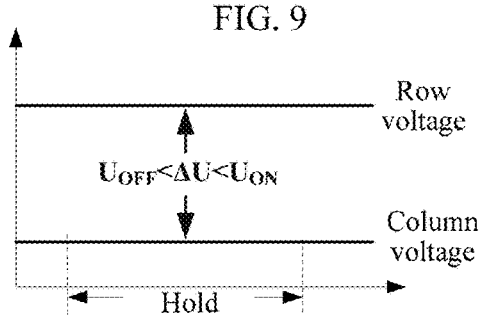
Figure 12:
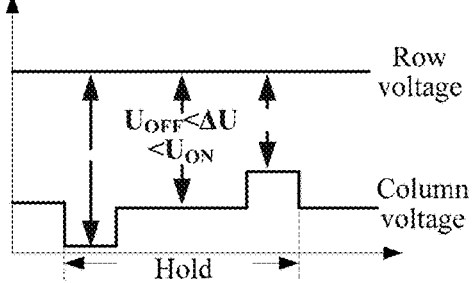

With reference to FIG. 9 to FIG. 12, the following uses voltage driving as an example to describe an existing control procedure for an optical switch matrix. A solution in a case of current driving is not described in detail. When the optical switch matrix does not need to be switched, stable voltage signals, namely a row voltage and a column voltage, are applied to a row electrode and a column electrode, respectively, and an absolute value ΔU of a difference between the row voltage and the column voltage is between $U_{ON}$ and $U_{OFF}$. In this case, as shown in FIG. 11, all optical switches are in a hold state, and a state of the optical switch matrix is not switched. When an optical switch S at an intersection of an $i^{th}$ row and a $j^{th}$ column needs to be switched to the ON state, a voltage of an electrode of the $i^{th}$ row increases, and a voltage of the $j^{th}$ column decreases, so that the absolute value ΔU of the difference between the row voltage and the column voltage is slightly greater than $U_{ON}$, and the optical switch S is switched to the ON state, as shown in FIG. 9. An increased amplitude of the voltage of the $i^{th}$ row and a decreased amplitude of the voltage of the $j^{th}$ column are controlled, so that when only the row voltage changes or only the column voltage changes, the absolute value ΔU of the difference between the row voltage and the column voltage is still between $U_{ON}$ and $U_{OFF}$. In this case, as shown in FIG. 10 and FIG. 12, the other optical switches in the $i^{th}$ row different from the optical switch S and the other optical switches in the $j^{th}$ column different from the optical switch S are not switched when the optical switch S is switched. Throughout this process, a row voltage and a column voltage of an optical switch that is located in neither the $i^{th}$ row nor the $j^{th}$ column are shown in FIG. 11, and a state of the optical switch does not change either.

According to the solution in which the optical switches in the optical switch matrix are controlled one by one in this row-column addressing manner, the M×N optical switch matrix may be controlled by using M+N electrodes or carrier injection actuators, thereby greatly decreasing difficulty in packaging and controlling. However, according to the solution, only one optical switch can be controlled each time, and when many ports in the optical switch matrix need to be simultaneously switched, a switching time of the optical switch matrix becomes very long, and working efficiency of the optical switch matrix becomes low. For example, for a 64×64 optical switch matrix, assuming that a time for switching an optical switch from the ON state to the OFF state is $t_{OFF}$, and a time for switching the optical switch from the OFF state to the ON state is $t_{ON}$, when all ports of the optical switch matrix need to be switched, a required time is $T=64*t_{ON}+64*t_{OFF}$ if the optical switches are controlled one by one for switching.

In view of the foregoing problems, an embodiment of this application provides a method for controlling an optical switch matrix. The optical switch matrix may be an M×N optical switch matrix of the crossbar topological structure described above or a similar structure. The optical switch matrix includes M input ports and N output ports, where M and N are both positive integers, and at least one of M and N is greater than or equal to 2. First drives of N optical switches in each row of the optical switch matrix are connected together to form a row drive, and second drives of M optical switches in each column of the optical switch matrix are connected together to form a column drive. It should be understood that because of reversibility of an optical path of the optical switch matrix of the crossbar topological structure, the input ports of the optical switch matrix and the output ports of the foregoing optical switch matrix may also be reversed.

Any optical switch in M×N optical switches of the optical switch matrix can meet the following: when a reset row drive value and a reset column drive value are applied, the optical switch is in a first state; or when a switching row drive sequence and a switching column drive sequence are applied, the optical switch remains in the first state all the time or is switched from the first state to a second state.

Optionally, the optical switch in this embodiment of this application may be an optical switch having non-linear drive characteristics. For example, the optical switch may include a first drive and a second drive, and a transmission loss changes non-linearly with a parameter value of the first drive and a parameter value of the second drive of the optical switch, that is, a relationship between the transmission loss and a value obtained after an operation is performed on the parameter value of the first drive and the parameter value of the second drive is a non-linear relationship.

Further, the any optical switch in the M×N optical switches of the optical switch matrix may be the optical switch described above, that is, an optical switch having a hysteresis effect in terms of drive characteristics. Specifically, the optical switch may include the first drive and the second drive, when a value obtained after an operation is performed on a parameter value of the first drive and a parameter value of the second drive belongs to a first interval, the any optical switch is in the first state; or when a value obtained after an operation is performed on a parameter value of the first drive and a parameter value of the second drive belongs to a second interval, the any optical switch remains in a current state; or when a value obtained after an operation is performed on a parameter value of the first drive and a parameter value of the second drive belongs to a third interval, the any optical switch is in the second state. An intersection of any two of the first interval, the second interval, and the third interval is an empty set, and the second interval may be between the first interval and the third interval.

As described above, the drives include the first drive and the second drive, and may be electrodes or thermoelectric actuators (the thermoelectric actuator is equivalent to a resistor in terms of load characteristics), or may be carrier injection actuators (the carrier injection actuator is equivalent to a diode in terms of load characteristics). The parameter value of the drive may be a voltage value or a current value. If the drive is the electrode, the operation may be calculating a difference and determining an absolute value. If the drive is the carrier injection actuator, the operation may be performing a summation. If the drive is the thermoelectric actuator, the operation may be calculating a sum of squares, or calculating a sum of squares times a resistance (an equivalent resistance of the thermoelectric actuator), or the like. Value ranges corresponding to the first interval, the second interval, and the third interval are also the same as those described above, and details are not described herein again.

Figure 13:
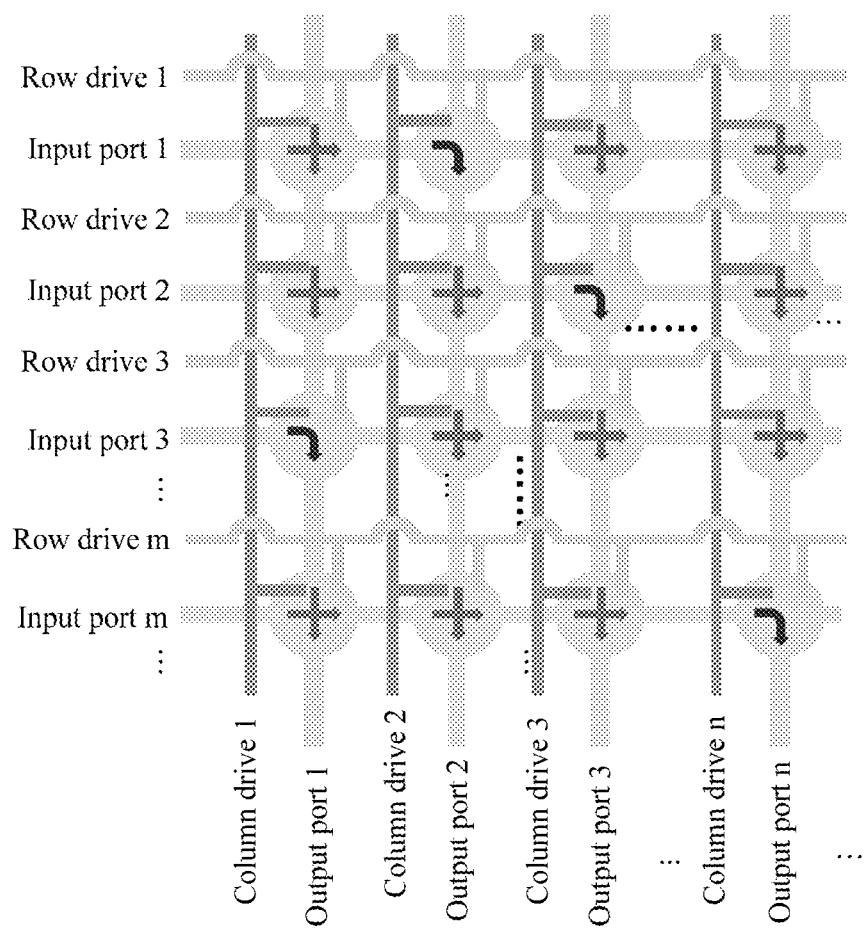
FIG. 13 is a schematic diagram of numbering for an optical switch matrix according to an embodiment of this application.

In this embodiment of this application, the first drives of the N optical switches in each row of the optical switch matrix are connected together to form the row drive, and the second drives of the M optical switches in each column of the optical switch matrix are connected together to form the column drive. As shown in FIG. 13, input ports of the optical switch matrix and output ports of the optical switch matrix may be numbered, an input port corresponding to an $m^{th}$ row in M rows is numbered as an input port m, and an output port corresponding to an $n^{th}$ column in N columns is numbered as an output port n. Row drives corresponding to the input ports of the optical switch matrix and column drives corresponding to the output ports of the optical switch matrix may be numbered, a row drive corresponding to the $m^{th}$ row in the M rows is numbered as a row drive m, and a column drive corresponding to the $n^{th}$ column in the N columns is numbered as a column drive n.

For ease of subsequent description, the following definitions are given. A row drive corresponding to an input port is a row drive that is in the same row as the input port; and a column drive corresponding to an output port is a column drive that is in the same column as the output port. An optical switch corresponding to an input port and an output port is an optical switch at an intersection of a row corresponding to the input port and a column corresponding to the output port. Optical switches corresponding to P input ports and Q output ports are P×Q optical switches at intersections of P rows corresponding to the input ports and Q columns corresponding to the output ports.

Figure 14:
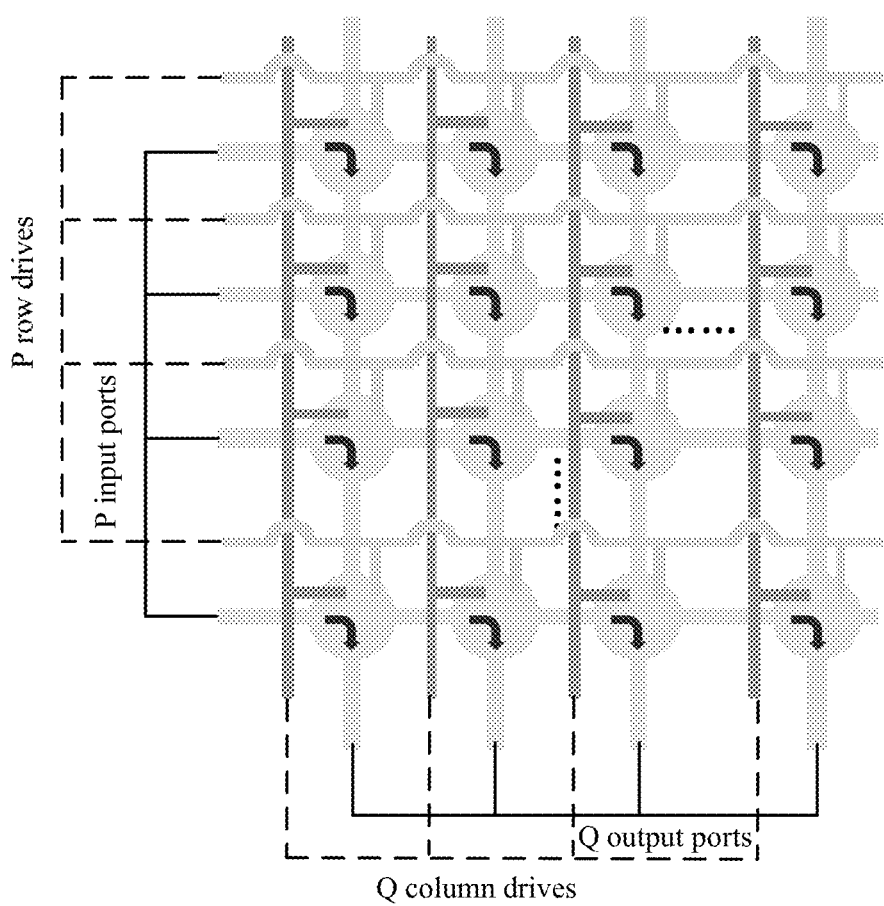
FIG. 14 is a schematic diagram of a reset step according to an embodiment of this application.

The method in this embodiment of this application may include the following two steps:

As shown in FIG. 14, a first step, which may be referred to as a reset step, includes: setting P row drives corresponding to P to-be-switched input ports in the M input ports to a reset row drive value, and setting Q column drives corresponding to Q to-be-switched output ports in the N output ports to a reset column drive value, so that P×Q optical switches at intersections of the P input ports and the Q output ports are in a first state, where P is less than or equal to M, and Q is less than or equal to N. Herein, a value obtained after an operation is performed on the reset row drive value and the reset column drive value belongs to the first interval.

Figure 15:
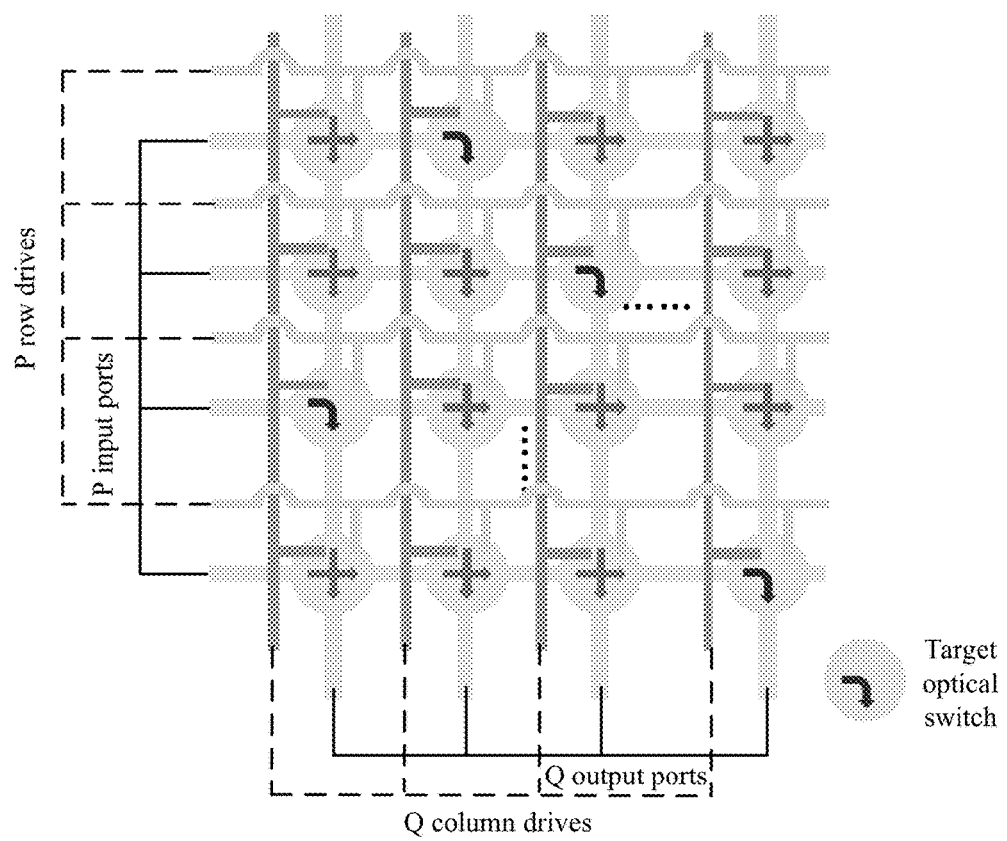
FIG. 15 is a schematic diagram of a connection establishment step according to an embodiment of this application.

As shown in FIG. 15, a second step, which may be referred to as a connection establishment step, includes: simultaneously performing the following operations on the P row drives corresponding to the P input ports and the Q column drives corresponding to the Q output ports: successively setting, based on time, a row drive corresponding to an $i^{th}$ input port in the P input ports to values in a switching row drive sequence, and successively setting, based on time, a column drive corresponding to a $j^{th}$ output port in the Q output ports to values in a switching column drive sequence, where the switching row drive sequence and the switching column drive sequence make a target optical switch in the P×Q optical switches remain in the first state all the time, and the switching row drive sequence and the switching column drive sequence make other optical switches in the P×Q optical switches different from the target optical switch switched from the first state to the second state in first time periods respectively corresponding to the other optical switches, where the target optical switch is at least one optical switch at an intersection of at least one input port in the P input ports and a target output port corresponding to the at least one input port, a value of i is 1, 2, . . . , or P, and a value of j is 1, 2, . . . , or Q. Herein, a value obtained after an operation is performed on any value in the switching row drive sequence and a corresponding value in the switching column drive sequence belongs to the second interval or belongs to the third interval.

According to the method for controlling an optical switch matrix in this embodiment of this application, the optical switches at the intersections of the to-be-switched input ports and the to-be-switched output ports are all set to be in the first state, and then the switching row drive sequence and the switching column drive sequence are simultaneously applied to the row drives and the column drives of the optical switches, respectively. In this way, the optical switches are simultaneously controlled instead of being controlled one by one, so that a switching time of the optical switch matrix can be shortened and working efficiency of the optical switch matrix can be increased.

Optionally, in the method in this embodiment of this application, the P to-be-switched input ports and the Q to-be-switched output ports may be all input ports and all output ports in the optical switch matrix. To be specific, during port switching according to the method in this embodiment of this application, transmission of all optical signals switched at the optical switch matrix is paused and then resumed after switching of all the input ports and all the output ports in the optical switch matrix is completed. In this case, P is equal to M, and Q is equal to N. In the method in this embodiment of this application, to-be-switched ports do not need to be counted, so that a calculation amount of an apparatus for controlling an optical switch matrix can be reduced.

Optionally, the method in this embodiment of this application may further include: determining the P to-be-switched input ports and the Q to-be-switched output ports in the optical switch matrix based on a direction along which an optical signal is to be transmitted. This embodiment of this application corresponds to a situation in which only some ports need to be switched and the other ports do not need to be switched. In this case, P is less than M, and Q is less than N. In the method in this embodiment of this application, the to-be-switched ports are counted, and only the optical switches corresponding to the to-be-switched ports are switched, without affecting transmission of optical signals on the other ports.

It should be understood that, in this embodiment of this application, P may be equal to Q, as shown in FIG. 14 and FIG. 15. That P is equal to Q may correspond to the following scenario: P optical signals are originally input from P input ports and output from P output ports; and during switching, the P optical signals are still switched between the P input ports and the P output ports, but each optical signal is output from an output port different from an original output port.

Figure 16:
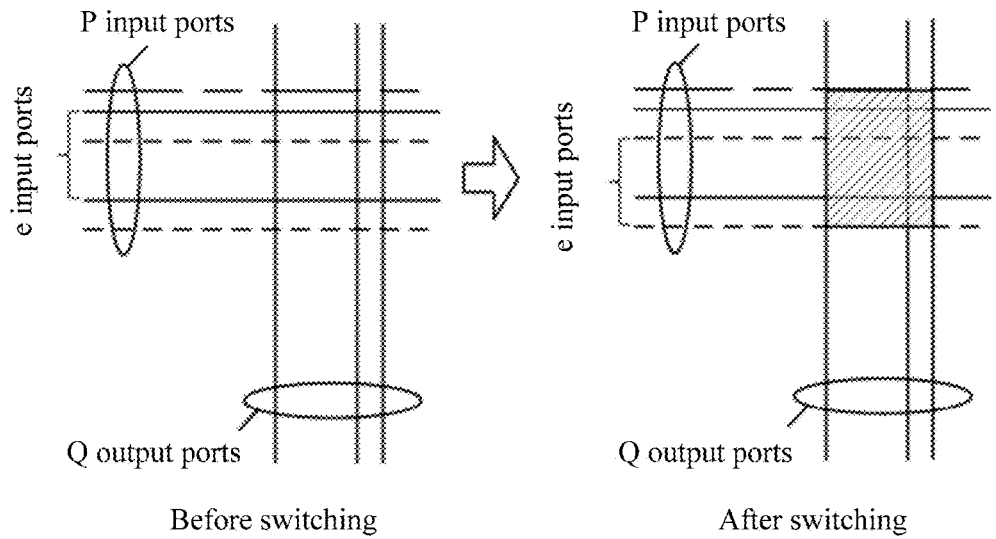
FIG. 16 and FIG. 17 are schematic diagrams of an optical switch at an intersection of a to-be-switched input port and a to-be-switched output port according to an embodiment of this application.
Figure 17:
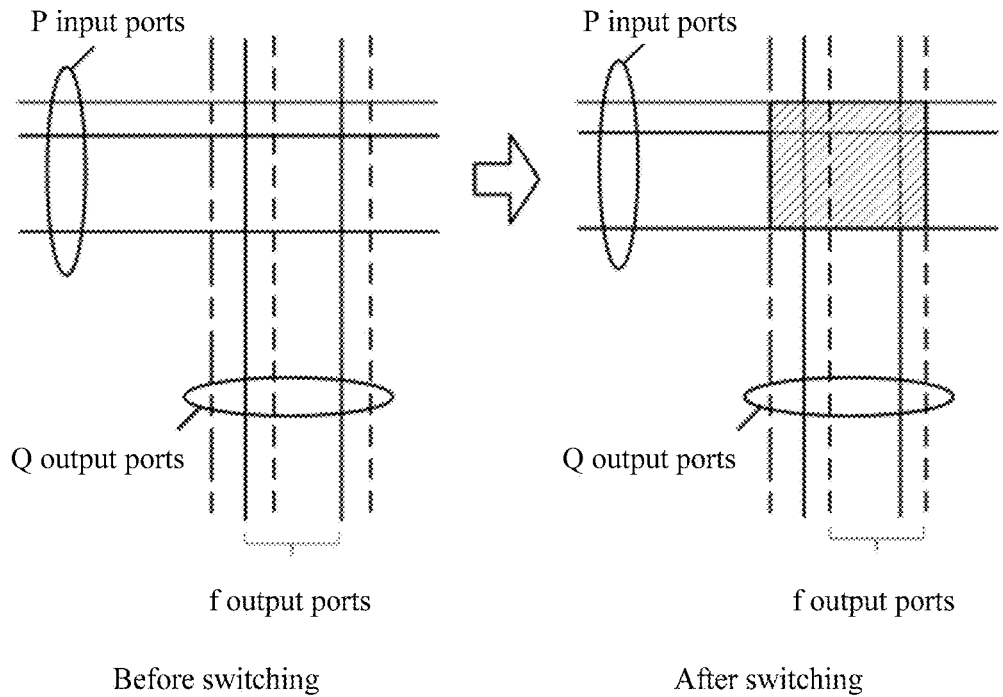

In this embodiment of this application, P may not be equal to Q. That P is greater than Q may correspond to the following scenario: As shown in FIG. 16, before switching, some or all of the optical signals, for example, e optical signals, are input from e input ports in the P input ports, and are output from e output ports in the Q output ports; and after switching, the e input ports are not used anymore, the e optical signals are input from another e input ports in the P input ports, but are still output from the e output ports in the Q output ports, that is, each of all the optical signals is output from an output port the same as an output port before switching. In FIG. 16, optical switches shown in a shaded area after switching are the optical switches at the intersections of the to-be-switched input ports and the to-be-switched output ports. That P is less than Q may correspond to the following scenario: As shown in FIG. 17, before switching, some or all of the optical signals, for example, f optical signals, are input from f input ports in the P input ports, and are output from f output ports in the Q output ports; and after switching, the f optical signals are not output from the f output ports in the Q output ports like before switching, but are output from another f output ports in the Q output ports, to be specific, each of all the optical signals is output from an output port different from an output port before switching. In FIG. 17, optical switches shown in a shaded area after switching are the optical switches at the intersections of the to-be-switched input ports and the to-be-switched output ports.

Optionally, in an embodiment, after the foregoing first step and second step are completed, the method may further include: setting the P row drives corresponding to the P to-be-switched input ports in the M input ports to a hold row drive value, and setting the Q column drives corresponding to the Q to-be-switched output ports in the N output ports to a hold column drive value, where a value obtained after an operation is performed on the hold row drive value and the hold column drive value belongs to the second interval, so that the P×Q optical switches at the intersections of the P input ports and the Q output ports remain in a current state. In the method in this embodiment of this application, after the optical switches corresponding to the to-be-switched ports are switched, the P row drives are set to the hold row drive value, and the Q column drives are set to the hold column drive value, so that the corresponding optical switches remain in a switched state.

Optionally, in an embodiment, the switching row drive sequence is $[X_{i,1}, X_{i,2}, \ldots, X_{i,2t}]$, the switching column drive sequence is $[Y_{j,1}, Y_{j,2}, \ldots, Y_{j,2t}]$, and the successively setting, based on time, a row drive corresponding to an $i^{th}$ input port in the P input ports to values in a switching row drive sequence, and successively setting, based on time, a column drive corresponding to a $j^{th}$ output port in the Q output ports to values in a switching column drive sequence may include: in an $a^{th}$ time unit of 2t time units, setting the row drive corresponding to the $i^{th}$ input port to a switching row drive value $X_{i,a}$, and setting the column drive corresponding to the $j^{th}$ output port to a switching column drive value $Y_{j,a}$, where in the 2t time units, the target optical switch remains in the first state all the time, and the other optical switches in the P×Q optical switches different from the target optical switch are switched from the first state to the second state in first time units respectively corresponding to the other optical switches, and remain in the second state after the first time unit, where the first time period is the first time unit, and a value of a is 1, 2, ..., or 2t.

Specifically, in a process of applying the switching row drive sequence and the switching column drive sequence, the target optical switch remains in an ON state all the time, and the other optical switches in the P×Q optical switches different from the target optical switch are switched from the ON state to an OFF state in the process. The other optical switches may be switched in a first time unit corresponding to a digit of the applied switching row drive sequence and switching column drive sequence. When the digit is not a last digit in the sequences, the other optical switches remain in the OFF state after the first time unit.

It should be understood that the sequence in this embodiment of this application is not limited to having 2t digits, that is, not limited to having an even number of digits. Alternatively, the sequence may have an odd number of digits. Further, a length of the switching row drive sequence and a length of the switching column drive sequence are not necessarily equal, and the lengths of the two sequences may not be equal. It is acceptable provided that the switching row drive sequence and the switching column drive sequence meet the foregoing results. This is not limited in this embodiment of this application.

Specifically, the switching row drive sequence may be a switching row voltage sequence $[U_{i,1}, U_{i,2}, \ldots, U_{i,2t}]$, the switching column drive sequence may be a switching column voltage sequence $[V_{j,1}, V_{j,2}, \ldots, V_{j,2t}]$, and the successively setting, based on time, a row drive corresponding to an $i^{th}$ input port in the P input ports to values in a switching row drive sequence, and successively setting, based on time, a column drive corresponding to a $j^{th}$ output port in the Q output ports to values in a switching column drive sequence may include: representing the $i^{th}$ input port in the P input ports as $[C_{i,1}, C_{i,2}, \ldots, C_{i,2t}]$ by using a 2t-digit base-s number, where any two input ports in the P input ports correspond to different 2t-digit base-s numbers; and representing the $j^{th}$ output port in the Q output ports as $[D_{j,1}, D_{j,2}, \ldots, D_{j,2t}]$ by using a 2t-digit base-s number, where any two output ports in the Q output ports correspond to different 2t-digit base-s numbers, a 2t-digit base-s number corresponding to the first target input port and a 2t-digit base-s number corresponding to the first target output port are the same, a set of values available for each digit of the 2t-digit base-s number is $[0, 1, \ldots, s-1]$, a switching row drive value set corresponding to the value set $[0, 1, \ldots, s-1]$ is $[U_0, U_1, \ldots, U_{s-1}]$, and a switching column drive value set corresponding to the value set $[0, 1, \ldots, s-1]$ is $[V_0, V_1, \ldots, V_{s-1}]$; and simultaneously performing the following operations on the P row drives corresponding to the P input ports and the Q column drives corresponding to the Q output ports: in the $a^{th}$ time unit of the 2t time units, setting the row drive corresponding to the $i^{th}$ input port to a switching row drive value $U_{Ci,a}$ corresponding to a value $C_{i,a}$ of an $a^{th}$ digit of the 2t-digit base-s number as which the $i^{th}$ input port is represented, and setting the column drive corresponding to the $j^{th}$ output port to a switching column drive value $V_{Dj,a}$ corresponding to a value $D_{j,a}$ of an $a^{th}$ digit of the 2t-digit base-s number as which the $j^{th}$ output port is represented, where a value of a is 1, 2, ..., or 2t.

The switching row drive value set $[U_0, U_1, \ldots, U_{s-1}]$ and the switching column drive value set $[V_0, V_1, \ldots, V_{s-1}]$ can meet the following: When an $m^{th}$ switching row drive value $U_m$ in the switching row drive value set $[U_0, U_1, \ldots, U_{s-1}]$ is applied to a first row drive and an $n^{th}$ switching column drive value $V_n$ in the switching drive value set $[V_0$, $V_1, \ldots, V_{s-1}$] is applied to a first column drive, an optical switch at an intersection of the first row drive and the first column drive remains in a current state or is switched from the first state to the second state, and the optical switch at the intersection of the first row drive and the first column drive cannot be switched from the second state to the first state.

In a specific example, the switching row drive value set $[U_0, U_1, \ldots, U_{s-1}]$ and the switching column drive value set $[V_0, V_1, \ldots, V_{s-1}]$ meet the following: When $U_m$ is applied to the first row drive and $V_n$ is applied to the first column drive, if m≥n, the optical switch at the intersection of the first row drive and the first column drive remains in an original state; or if m<n, the optical switch at the intersection of the first row drive and the first column drive is switched to the second state.

2t-digit base-s numbers as which the P input ports are respectively represented and 2t-digit base-s numbers as which the Q output ports are respectively represented meet the following: The 2t-digit base-s number corresponding to the $i^{th}$ input port in the P input ports is $[C_{i,1}, C_{i,2}, \ldots, C_{i,2t}]$, $[C_{i,1}, C_{i,2}, \ldots, C_{i,2t}]$ is divided into first t digits and second t digits, the 2t-digit base-s number corresponding to the $j^{th}$ output port in the Q output ports is $[D_{j,1}, D_{j,2}, \ldots, D_{j,2t}]$, and $[D_{j,1}, D_{j,2}, \ldots, D_{j,2t}]$ is divided into third t digits and fourth t digits, where positions of the first t digits in $[C_{i,1}, C_{i,2}, \ldots, C_{i,2t}]$ are the same as those of the third t digits in $[D_{j,1}, D_{j,2}, \ldots, D_{j,2t}]$, and when a value of any digit in the first t digits is $C_u$, and a value of a corresponding digit in the third t digits is $D_u$, if $C_u$ is not equal to $D_u$, $[C_{i,1}, C_{i,2}, \ldots, C_{i,2t}]$ and $[D_{j,1}, D_{j,2}, \ldots, D_{j,2t}]$ include at least one pair of values that meet $C_v<D_v$.

In this specific example, values in the switching row drive value set $[U_0, U_1, \ldots, U_{s-1}]$ and values in the switching column drive value set $[V_0, V_1, \ldots, V_{s-1}]$ are arranged in ascending order.

In another specific example, the switching row drive value set $[U_0, U_1, \ldots, U_{s-1}]$ and the switching column drive value set $[V_0, V_1, \ldots, V_{s-1}]$ meet the following: When $U_m$ is applied to the first row drive and $V_n$ is applied to the first column drive, if m≤n, the optical switch at the intersection of the first row drive and the first column drive remains in an original state; or if m>n, the optical switch at the intersection of the first row drive and the first column drive is switched to the second state.

2t-digit base-s numbers as which the P input ports are respectively represented and 2t-digit base-s numbers as which the Q output ports are respectively represented meet the following: The 2t-digit base-s number corresponding to the $i^{th}$ input port in the P input ports is $[C_{i,1}, C_{i,2}, \ldots, C_{i,2t}]$, $[C_{i,1}, C_{i,2}, \ldots, C_{i,2t}]$ is divided into first t digits and second t digits, the 2t-digit base-s number corresponding to the $j^{th}$ output port in the Q output ports is $[D_{j,1}, D_{j,2}, \ldots, D_{j,2t}]$, and $[D_{j,1}, D_{j,2}, \ldots, D_{j,2t}]$ is divided into third t digits and fourth t digits, where positions of the first t digits in $[C_{i,1}, C_{i,2}, \ldots, C_{i,2t}]$ are the same as those of the third t digits in $[D_{j,1}, D_{j,2}, \ldots, D_{j,2t}]$, and when a value of any digit in the first t digits is $C_u$, and a value of a corresponding digit in the third t digits is $D_u$, if $C_u$ is not equal to $D_u$, $[C_{i,1}, C_{i,2}, \ldots, C_{i,2t}]$ and $[D_{j,1}, D_{j,2}, \ldots, D_{j,2t}]$ include at least one pair of values that meet $C_v>D_v$.

In this specific example, values in the switching row drive value set [U0, U1, . . . , Us−1] and values in the switching column drive value set [V0, V1, . . . , Vs−1] are arranged in descending order.

More specifically, that the value obtained after the operation is performed on the parameter value of the first drive and the parameter value of the second drive belongs to the first interval may mean that an absolute value of a difference between the parameter value of the first drive and the parameter value of the second drive is greater than a first threshold, that the value obtained after the operation is performed on the parameter value of the first drive and the parameter value of the second drive belongs to the second interval may mean that the absolute value of the difference between the parameter value of the first drive and the parameter value of the second drive is less than the first threshold and greater than a second threshold, and that the value obtained after the operation is performed on the parameter value of the first drive and the parameter value of the second drive belongs to the third interval may mean that the absolute value of the difference between the parameter value of the first drive and the parameter value of the second drive is less than the second threshold. The switching row drive value set [U0, U1, . . . , Us−1] and the switching column drive value set [V0, V1, . . . , Vs−1] may be determined by using the following method:

determining 2s−1 arithmetic progression values ΔU1, ΔU2, ΔU3, . . . , and ΔU2s−1 based on the first threshold and the second threshold, where ΔU1, ΔU2, . . . , and ΔUs−1 are less than the second threshold, and ΔUs, ΔUs+1, . . . , and ΔU2s−1 are greater than the second threshold and less than the first threshold; determining the switching column drive value set [V0, V1, . . . , Vs−1], where a common difference of V0, V1, . . . , and Vs−1 is ΔU2-ΔU1; and adding ΔUs to any switching column drive value in the switching column drive value set [V0, V1, . . . , Vs−1], to obtain a corresponding switching row drive value, so that switching row drive values form the switching row drive value set [U0, U1, . . . , Us−1].

It should be understood that the switching row drive value set [U0, U1, . . . , Us−1] and the switching column drive value set [V0, V1, . . . , Vs−1] may not be determined by using the foregoing method, and values of the drive value set need to meet only requirements on a switching row drive value and a switching column drive value in this embodiment of this application, to make an optical switch meet a switching requirement.

The following describes the method in this embodiment of this application by using a specific example.

A parameter value of a drive is used as an example. In the method in this embodiment of this application, a proper switching row drive value set (a switching row voltage set) [U0, U1, . . . , Us−1], a proper switching column drive value set (a switching column voltage set) [V0, V1, . . . , Vs−1], and a proper representation manner of a port of an optical switch matrix are selected based on a drive characteristics curve of an optical switch, so as to optimize performance of the optical switch matrix.

This embodiment of this application provides a driving solution using a switching row voltage set and a switching column voltage set that include s voltage values each. Accordingly, base-s numbers are needed to represent input ports and output ports of the optical switch matrix. The following steps are specifically performed:

finding 2s−1 arithmetic progression voltage values ΔU1, ΔU2, ΔU3, . . . , and ΔU2s−1 that are in ascending order from a drive voltage curve of an optical switch, where
ΔU1, ΔU2, . . . , ΔUs−1<UOFF, and
UOFF<ΔUs, ΔUs+1, . . . , ΔU2s−1<UON;

selecting s arithmetic progression voltage values to form a switching column voltage set [V0, V1, . . . , Vs−1], where a common difference is ΔU2−ΔU1, and for ease of control, the s arithmetic progression voltage values in the switching column voltage set [V0, V1, . . . , Vs−1] may be relatively small values; and adding $\Delta U_s$ to each voltage in the switching column voltage set to obtain a switching row voltage set [U0, U1, . . . , Us−1].

Based on the foregoing setting, the switching row voltage set $[U_0, U_1, \ldots, U_{s-1}]$ and the switching column voltage set $[V_0, V_1, \ldots, V_{s-1}]$ are found, and the following relationship is met:

when a voltage value $U_m$ is selected from the switching row voltage set and used as a row voltage, and a voltage value $V_n$ is selected from the switching column voltage set and used as a column voltage, if m<n, $U_m - V_n \leq \Delta U_{s-1}$, and the optical switch is switched to an OFF state; or if m≥n, $U_m - V_n \geq \Delta U_s$, and the optical switch remains in an original state.

For example, for an N×N optical switch matrix, when N ports of the optical switch matrix all need to be switched, the optical switch matrix is controlled by using the following two steps.

1. Reset Step $U_x$ is applied to all row voltages, and $V_x$ is applied to all column voltages, where $U_x - V_x > U_{on}$. In this case, all optical switches are reset to an ON state. $U_x$ is a reset row voltage (that is, a reset row drive value), and $V_x$ is a reset column voltage (that is, a reset column drive value).

2. Connection Establishment Step

It is assumed that a target state of the optical switch matrix is [1, 2, 3, . . . , N]→[m1, m2, m3, . . . , mN] (where m1, m2, m3, . . . , and mN correspond to 1 to N, respectively). To be specific, an optical signal on an input port 1 of the optical switch matrix needs to be switched to an output port m1, an optical signal on an input port 2 needs to be switched to an output port m2, . . . , and an optical signal on an input port N needs to be switched to an output port mN.

Input ports and output ports of the optical switch matrix are represented by using 2t-digit base-s numbers ($s^t \geq N$), where a 2t-digit base-s number corresponding to an $i^{th}$ input port is $[C_{i,1}, C_{i,2}, \ldots, C_{i,2t}]$, and a 2t-digit base-s number corresponding to a $j^{th}$ input port is $[D_{j,1}, D_{j,2}, \ldots, D_{j,2t}]$. 2t-digit base-s numbers corresponding to an input port 1 and an output port $m_1$ are the same, 2t-digit base-s numbers corresponding to an input port 2 and an output port $m_2$ are the same, and 2t-digit base-s numbers corresponding to an input port N and an output port $m_N$ are the same.

For the 2t-digit base-s number $[C_{i,1}, C_{i,2}, \ldots, C_{i,2t}]$, a sum of a value of one digit in second t digits and a value of a corresponding digit in first t digits of each base-s number is s−1. If the first t digits are initial t digits, and the second t digits are last t digits, a relationship between a value h of the initial t digits and a value q of the last t digits is $h = s^t - 1 - q$. If s is equal to 2, the second t digits may be referred to as inverse codes of the first t digits. For ease of description, in this specification, when s is greater than 2, the second t digits are also referred to as inverse codes of the first t digits.

Likewise, for the 2t-digit base-s number $[D_{j,1}, D_{j,2}, \ldots, D_{j,2t}]$, a sum of a value of one digit in fourth t digits and a value of a corresponding digit in third t digits of each base-s number is s−1, and details are not described herein again.

The following provides a specific method for representing input ports and output ports of an optical switch matrix by using 2t-digit base-s numbers, where a base-s number includes t digits (first t digits) of original codes and t digits (second t digits) of inverse codes.

For example, the ports are represented by using 6-digit quaternary numbers. If original codes encoded for four ports are 000, 011, 213, and 333, respectively, inverse codes encoded for the four ports are 333, 322, 120, and 000, respectively. If 3 digits of original codes are placed in initial three positions, and 3 digits of inverse codes are placed in last three positions, 6-digit quaternary numbers for the four ports are 000333, 011322, 213120, and 333000, respectively.

Another 6-digit quaternary number representation manner can also meet a control requirement of this embodiment of this application. An inverse code of each of the 3 digits of original codes is placed next to the digit of the 3 digits of original codes. In this case, 6-digit quaternary numbers for the foregoing four ports are 030303, 031212, 211230, and 303030, respectively.

Certainly, each digit of the inverse codes may be inserted into any specified position of the original codes in any specified order, and 2t-digit base-s numbers meeting a requirement of this embodiment of this application can also be obtained.

The 2t-digit base-s numbers meet the following features: "the 2t-digit base-s number corresponding to the $i^{th}$ input port in the P input ports is $[C_{i,1}, C_{i,2}, \ldots, C_{i,2t}]$, $[C_{i,1}, C_{i,2}, \ldots, C_{i,2t}]$ is divided into first t digits and second t digits, the 2t-digit base-s number corresponding to the $j^{th}$ output port in the Q output ports is $[D_{j,1}, D_{j,2}, \ldots, D_{j,2t}]$, and $[D_{j,1}, D_{j,2}, \ldots, D_{j,2t}]$ is divided into third t digits and fourth t digits, where positions of the first t digits in $[C_{i,1}, C_{i,2}, \ldots, C_{i,2t}]$ are the same as those of the third t digits in $[D_{j,1}, D_{j,2}, \ldots, D_{j,2t}]$, and when a value of any digit in the first t digits is $C_u$, and a value of a corresponding digit in the third t digits is $D_u$, if $C_u$ is not equal to $D_u$, $[C_{i,1}, C_{i,2}, \ldots, C_{i,2t}]$ and $[D_{j,1}, D_{j,2}, \ldots, D_{j,2t}]$ include at least one pair of values that meet $C_v < D_v$."

The ports of the optical switch matrix in this embodiment of this application may be represented in another representation manner. Consistent with the switching row drive sequence and the switching column drive sequence in the foregoing description, a K-digit number $\{A_k\}$ (K may be an odd number or may be an even number) is obtained after the input ports are represented, and a K-digit number $\{B_k\}$ is obtained after the output ports are represented, where a value of k is 0, 1, . . . , or K−1. $\{A_k\}$ and $\{B_k\}$ should meet the following feature: "when a value of any digit in $\{A_k\}$ is $A_k$, and a value of a corresponding digit in $\{B_k\}$ is $B_k$, if $A_k$ is not equal to $B_k$, $\{A_k\}$ and $\{B_k\}$ include at least one pair of values that meet $A_k < B_k$".

For example, in another representation manner, after a 2t-digit base-s number is obtained through representation, any e digits in the 2t-digit base-s number are duplicated to obtain a (2t+e)-digit base-s number. Specifically, for example, a last digit in the 2t-digit base-s number may be duplicated to obtain a (2t+1)-digit base-s number. The (2t+1)-digit base-s number meets the following feature: "when a value of any digit in $\{A_k\}$ is $A_k$, and a value of a corresponding digit in $\{B_k\}$ is $B_k$, if $A_k$ is not equal to $B_k$, $\{A_k\}$ and $\{B_k\}$ include at least one pair of values that meet $A_k < B_k$".

In this embodiment of this application, after ports are represented, only an input port and an output port that need to be connected after switching correspond to identical 2t-digit base-s numbers. For example, 2t-digit base-s numbers corresponding to an input port 1 and an output port $m_1$ are the same, 2t-digit base-s numbers corresponding to an input port 2 and an output port $m_2$ are the same, and so on. An input port and an output port that are not connected after switching correspond to different 2t-digit base-s numbers. For example, the input port 2 and the output port $m_1$ correspond to different 2t-digit base-s numbers, an input port 3 and an output port $m_N$ correspond to different 2t-digit base-s numbers, and so on.

According to the foregoing 2t-digit base-s serial numbers, a switching row voltage sequence $[U_{i,1}, U_{i,2}, \ldots, U_{i,2t}]$ is applied to row electrodes of the optical switch matrix, and a switching column voltage sequence $[V_{j,1}, V_{j,2}, \ldots, V_{j,2t}]$ is applied to column electrodes. The switching row voltage sequence and the switching column voltage sequence are applied in 2t time units. A length of each of the 2t time units may be the same or may be different. The length of each time unit should be greater than or equal to a drive time required for switching an optical switch from an ON state to an OFF state.

In an $a^{th}$ time unit (a value of a is 1, 2, . . . , or 2t), when a value $C_{i,a}$ of an $a^{th}$ digit of a 2t-digit base-s number of an input port i is 0, $U_{Ci,a}$ (that is, $U_0$) is applied to a corresponding row electrode; when a value of an $a^{th}$ digit of a 2t-digit base-s number of an input port is 1, $U_1$ is applied to a corresponding row electrode; and so on.

Likewise, in the $a^{th}$ time unit, when a value $D_{j,a}$ of an $a^{th}$ digit of a 2t-digit base-s number of an output port j is 0, $V_{Dj,a}$ (that is, $V_0$) is applied to a corresponding column electrode; when a value of an $a^{th}$ digit of a 2t-digit base-s number of an output port is 1, $V_1$ is applied to a corresponding column electrode; and so on.

For an optical switch in an $i^{th}$ row and a $j^{th}$ column, when $j=m_i$, values of all digits of 2t-digit base-s numbers of an input port i corresponding to the $i^{th}$ row and an output port j corresponding to the $j^{th}$ column are the same. When a row voltage of the $i^{th}$ row is $U_0$, a column voltage of the $j^{th}$ column is $V_0$; when a row voltage of the $i^{th}$ row is $U_1$, a column voltage of the $j^{th}$ column is $V_1$; and so on. Based on the foregoing relationship between a voltage and an optical switch status, throughout the 2t time units, the optical switch in the $i^{th}$ row and the $j^{th}$ column remains in an original state all the time, that is, the ON state.

When $j \neq m_i$, 2t-digit base-s numbers of the input port i corresponding to the $i^{th}$ row and the output port j corresponding to the $j^{th}$ column are different. Based on the foregoing feature of the 2t-digit base-s number, the 2t-digit base-s number of the input port i corresponding to the $i^{th}$ row and the 2t-digit base-s number of the output port j corresponding to the $j^{th}$ column necessarily include at least one pair of values that meet $C_v < D_v$. In this case, the optical switch is switched to the OFF state. Further, it can be learned from the foregoing relationship between the switching row voltage set $[U_0, U_1, \ldots, U_{s-1}]$ and the switching column voltage set $[V_0, V_1, \ldots, V_{s-1}]$ that, in the 2t time units, no optical switch is switched from the OFF state to the ON state.

Therefore, after the 2t time units, only an optical switch whose row number i and column number j meet $j=m_i$ is in the ON state, and other optical switches are all switched to the OFF state. It can be learned from a feature of the optical switch matrix of the crossbar topological structure that, a connected state $[1, 2, 3, \ldots, N] \to [m_1, m_2, m_3, \ldots, m_N]$ between the input ports and the output ports of the optical switch matrix has been established.

After the connected state between the input port and the output port has been established, a hold row voltage $U_r$ (that is, a hold row drive value) may be applied to the row electrodes, and a hold column voltage $V_r$ (that is, a hold column drive value) may be applied to the column electrodes, so that all the optical switches remain in a current state, and the optical switch matrix works stably and waits for next switching, where $U_{OFF} < U_r - V_r < U_{ON}$.

In the foregoing embodiment, a situation in which all ports of the N×N optical switch matrix need to be switched is used as an example to describe the control method. In this embodiment of this application, normal control can also be performed for a situation in which only some ports need to be switched and the other ports do not need to be switched.

This embodiment of this application provides a control method by using an example in which only some input ports and output ports (for example, P input ports and P output ports) of an M×N optical switch matrix need to be switched.

For input ports and output ports in the M×N optical switch matrix that do not need to be switched, a hold row voltage $U_r$ is applied to corresponding row electrodes, and a hold column voltage $V_r$ is applied to corresponding column electrodes.

For P input ports and P output ports in the M×N optical switch matrix that need to be switched, in a reset phase, a reset row voltage $U_x$ is applied to row electrodes corresponding to the P input ports, a reset column voltage $V_x$ is applied to column electrodes corresponding to the P output ports, and P×P optical switches at intersections of the P input ports and P output ports change to the ON state; and in a connection establishment phase, a switching row voltage sequence $[U_{i,1}, U_{i,2}, \ldots, U_{1,2t}]$ is applied to a row electrode corresponding to an $i^{th}$ input port of the P input ports, a switching column voltage sequence $[V_{j,1}, V_{j,2}, \ldots, V_{j,2t}]$ is applied to a column electrode corresponding to a $j^{th}$ output port of the P output ports, an optical switch that needs to remain in the ON state remains in the ON state, and an optical switch that needs to be switched to the OFF state is switched to the OFF state.

During switching of the P input ports and the P output ports that need to be switched, to avoid affecting the input ports and the output ports that do not need to be switched, values of $U_r$, $V_r$, $U_x$, and $V_x$ may be properly set based on the switching row drive value set $[U_0, U_1, \ldots, U_{s-1}]$ and the switching column drive value set $[V_0, V_1, \ldots, V_{s-1}]$.

A feasible setting solution is as follows:

$$V_r = \frac{U_{s-1} + V_0}{2} - \frac{U_{ON} + U_{OFF}}{4};$$

$$U_r = \frac{U_{s-1} + V_0}{2} + \frac{U_{ON} + U_{OFF}}{4};$$

-continued $$V_x = \frac{U_{s-1} + V_0}{2} - \frac{U_{ON}}{2} - \Delta U_x; \text{ and}$$

$$U_x = \frac{U_{s-1} + V_0}{2} + \frac{U_{ON}}{2} + \Delta U_x, \text{ where}$$

$\Delta U_x$ meets $0 < \Delta U_x < \frac{U_{ON} - U_{OFF}}{4}$.

Figure 18:
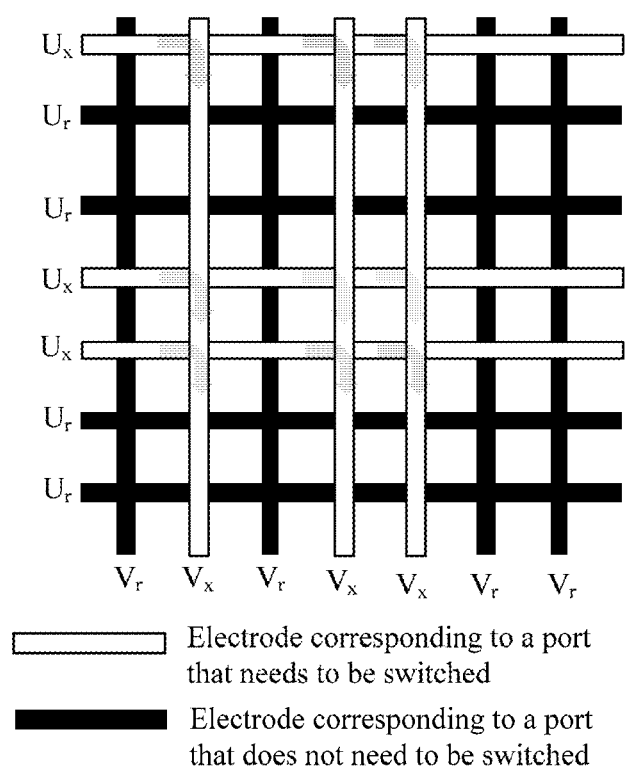
FIG. 18 is a schematic diagram of a reset step according to another embodiment of this application.
Figure 19:
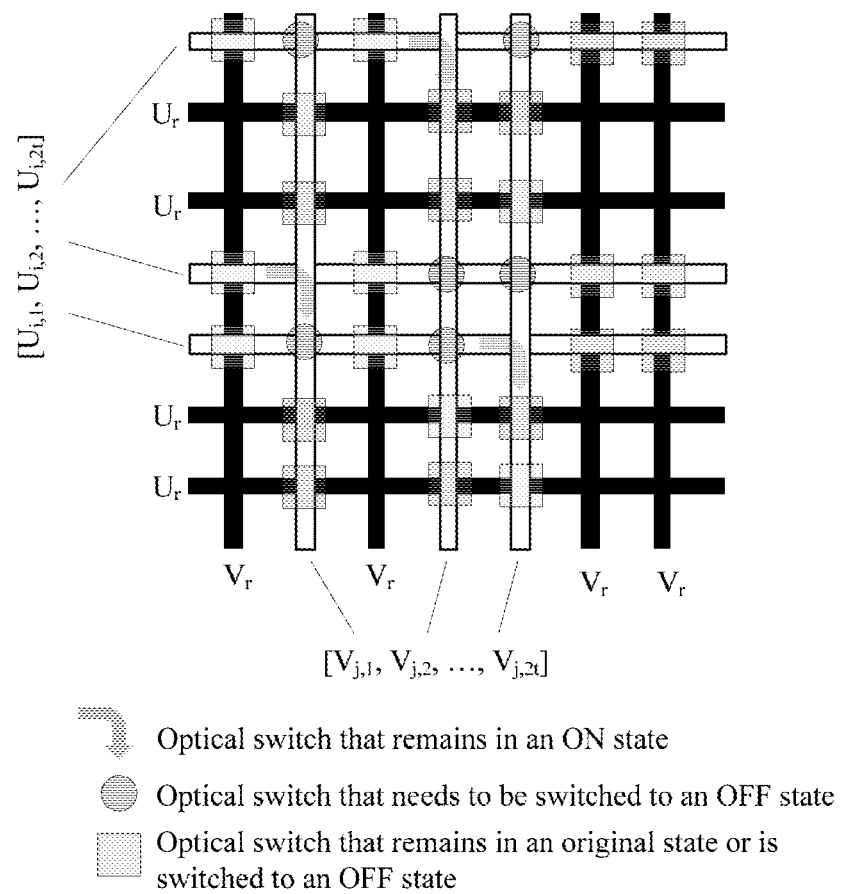
FIG. 19 is a schematic diagram of a connection establishment step according to another embodiment of this application.

In the reset phase, voltages of the row electrodes and voltages of the column electrodes of the optical switch matrix are shown in FIG. 18. In the connection establishment phase, voltages of the row electrodes, voltages of the column electrodes, and states of the optical switches of the optical switch matrix are shown in FIG. 19.

As shown in FIG. 18, in the reset phase, a voltage difference between a row electrode corresponding to the to-be-switched P input ports and a column electrode corresponding to and the to-be-switched P output ports is $U_x - V_x = U_{ON} + 2*\Delta U_x$. Therefore, the P×P optical switches at the intersections of the P input ports and the P output ports are reset to the ON state. For other optical switches, a voltage difference between a row electrode and a column electrode is $$U_r - V_r = \frac{U_{ON} + U_{OFF}}{2};$$

$$U_x - V_r = \frac{3*U_{ON}}{4} + \frac{U_{OFF}}{4} + \Delta U_x < U_{ON};$$

or $$U_r - V_x = \frac{3*U_{ON}}{4} + \frac{U_{OFF}}{4} + \Delta U_x < U_{ON}.$$

Therefore, the other optical switches all remain in an original state.

As shown in FIG. 19, in the connection establishment phase, the optical switches at the intersections of the to-be-switched input ports and the to-be-switched output ports are switched in the foregoing manner. That is, some of the optical switches at the intersections remain in the ON state, and the other optical switches are switched from the ON state to the OFF state. It can be learned from a feature of the crossbar topological structure that, other optical switches in the same row or the same column as an optical switch that needs to be switched need to be switched from the ON state to the OFF state. In any time unit, a voltage difference between two electrodes of optical switches that are in the same row as the optical switch that needs to be switched meets:

$$U_i - V_r < U_{s-1} - V_r =$$

$$U_{s-1} - \frac{U_{s-1} + V_0}{2} + \frac{U_{ON} + U_{OFF}}{4} < U_{s-1} - \frac{U_{s-1} + V_0}{2} + \frac{U_{ON}}{2} =$$

$$\frac{U_{s-1} - V_0 + U_{ON}}{2} < U_{ON}.$$

Therefore, these optical switches remain in an original state or are switched to the OFF state.

In any time unit, a voltage difference between two electrodes of optical switches that are in the same column as the optical switch that needs to be switched meets:

$$U_r - V_i < U_r - V_0 =$$

$$\frac{U_{s-1} + V_0}{2} + \frac{U_{ON} + U_{OFF}}{4} - V_0 < \frac{U_{s-1} + V_0}{2} + \frac{U_{ON}}{2} - V_0 =$$

$$\frac{U_{s-1} - V_0 + U_{ON}}{2} < U_{ON}.$$

Therefore, these optical switches remain in an original state or are switched to the OFF state.

For the other switches, a voltage difference between their two electrodes is $$U_r - V_r = \frac{U_{ON} + U_{OFF}}{2},$$

and these switches remain in an original state.

Based on the foregoing solution, a port that needs to be switched can be switched, without affecting a state of a port that does not need to be switched. After switching is completed, the hold row voltage $U_r$ may be applied to all row electrodes, and the hold column voltage $V_r$ may be applied to all column electrodes, so that all the optical switches remain in a current state, and the optical switch matrix works stably and waits for next switching.

This embodiment of this application provides the control method for the situation in which some ports of the optical switch matrix need to be switched. In a switching process, states of ports that do not need to be switched are not affected, and optical signals transmitted on the ports are not interrupted. This solution is applicable especially to an asynchronous switching system.

It should be understood that values of $U_r$, $V_r$, $U_x$, and $V_x$ given in this embodiment of this application are merely examples. In this embodiment of this application, the values of $U_r$, $V_r$, $U_x$, and $V_x$ may also be determined in another manner, to meet the control requirement of this embodiment of this application.

It should be understood that, in the specific example shown in FIG. 14 and FIG. 15 and the specific example shown in FIG. 18 and FIG. 19, a quantity of input ports that need to be switched and a quantity of output ports that need to be switched are equal, and in this embodiment of this application, the quantity of input ports that need to be switched and the quantity of output ports that need to be switched may not be equal. When the quantity of input ports that need to be switched and the quantity of output ports that need to be switched are not equal, the input ports and the output ports are still numbered according to the method in this embodiment of this application. One type of port (input ports or output ports) that outnumbers the other type of port does not have the same 2t-digit base-s numbers as the other type of ports. After a voltage sequence is applied according to the foregoing method, optical switches in rows or columns corresponding to the ports are in the OFF state.

It should be understood that, in both the specific example shown in FIG. 14 and FIG. 15 and the specific example shown in FIG. 18 and FIG. 19, descriptions are made by using an example in which a value of a row voltage is greater than a value of a column voltage. In this embodiment of this application, a voltage value of a column electrode may be greater than a voltage value of a row electrode. In this case, an absolute value of a voltage difference between two electrodes meets the control requirement of this embodiment of this application, and a result in this embodiment of this application can still be achieved.

In this embodiment of this application, s and t may be determined based on a maximum value between P and Q. For example, if a maximum value between P and Q is 8, s may be 2, t may be 3, and a port can be represented by using a 6-digit sequence. For another example, if a maximum value between P and Q is 64, s may be 4, t may be 3, and a port can still be represented by using a 6-digit sequence. Certainly, s may be 2, t may be 6, and a port can be represented by using a 12-digit sequence. s may be any integer that is greater than or equal to 2, and t may be any integer that is greater than or equal to 1. A specific method for selecting s and t is not limited in this embodiment of this application.

When all the ports in the optical switch matrix need to be switched or a quantity (a maximum value between P and Q) of ports that need to be switched is greater than a threshold, a switching time can be greatly shortened by using the method for controlling an optical switch matrix in this embodiment of this application. When a quantity of ports that need to be switched in a current round is greater than a threshold, but a quantity of ports that need to be switched in a next round is less than a threshold, the following manner may be used to optimize the switching time of the optical switch matrix.

For an optical switch matrix, when a quantity of ports that need to be switched is greater than a threshold ($s^t$ is greater than or equal to a maximum value between P and Q), the ports that need to be switched are represented by using 2t-digit base-s numbers, to control a status of an optical switch in the optical switch matrix. A time used by the optical switch matrix to complete switching is $T_1=t_{ON}+2t*t_{OFF}$. When a quantity of optical switch ports that need to be switched is less than $s^{t-1}$, the ports that need to be switched are represented by using (2t−2)-digit base-s numbers. In this case, a switching time of the optical switch matrix is $T_1=t_{ON}+(2t-2)*t_{OFF}$. When a quantity of optical switch ports that need to be switched is less than $s^{t-2}$, the ports that need to be switched are represented by using (2t−4)-digit base-s numbers. In this case, a switching time of the optical switch matrix is $T_1=t_{ON}+(2t-4)*t_{OFF}$. When only two ports need to be switched, states of optical switches are controlled one by one by using an existing technology.

In this embodiment of this application, in an application scenario in which the optical switch matrix needs to perform switching a plurality of times and a quantity of ports that need to be switched continuously changes, when the quantity of ports that need to be switched decreases, lengths of the switching row drive sequence and the switching column drive sequence may be reduced, to shorten the switching time of the optical switch matrix.

The following uses s=2 as an example to describe a method for controlling an N×N optical switch matrix.

Figure 20:
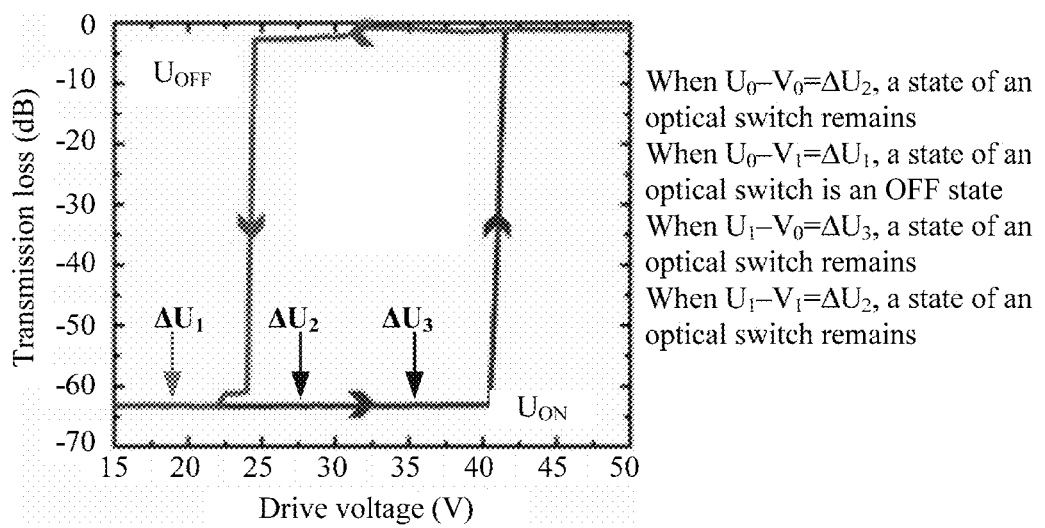
FIG. 20 is a schematic diagram of a correspondence between a drive voltage and an optical switch status according to an embodiment of this application.

Three voltage values $\Delta U_1$, $\Delta U_2$, and $\Delta U3$ are found in a drive voltage characteristics curve of an optical switch, where $\Delta U_1 < U_{OFF}$, $U_{OFF} < \Delta U_2$ and $\Delta U_3 < U_{ON}$, and $\Delta U_3 - \Delta U_2 = \Delta U_2 - \Delta U_1$. For example, $\Delta U_1$, $\Delta U_2$, and $\Delta U_3$ may be 17 V, 27 V and 37 V, respectively. As shown in FIG. 20, $U_{ON}$ is approximately 40 V, and $U_{OFF}$ is approximately 24 V.

For ease of control, two relatively small voltage values may be selected to form a switching column voltage set $[V_0, V_1]$, where $V_1 - V_0 = \Delta U_2 - \Delta U_1$. For example, $[V_0, V_1]$ may be [6 V, 16 V].

$\Delta U_2$ is added to all voltages in the switching column voltage set, to obtain two voltage values that form a switching row voltage set $[U_0, U_1]$, where $U_0 = V_0 + \Delta U_2$, and $U_1 = V_1 + \Delta U_2$. For example, $[U_0, U_1]$ may be [33 V, 43 V].

Based on the foregoing setting, the switching row voltage set $[U_0, U_1]$ and the switching column voltage set $[V_0, V_1]$ are found, and the following relationship is met:

when a voltage value is selected from the switching row voltage set $[U_0, U_1]$ and used as a row voltage, and a voltage value is selected from the switching column voltage set $[V_0, V_1]$ and used as a column voltage, a corresponding optical switch is switched to an OFF state only when the row voltage is $U_0$ and the column voltage is $V_1$, and the optical switch remains in an original state in other cases.

The switching row voltage set and the switching column voltage set in this embodiment of this application may also be obtained in another manner, and provided that the foregoing relationship is met, can be applied to this embodiment.

An operation process in this embodiment of this application is described still by using an example in which N input ports and N output ports of the optical switch matrix all need to be switched. The operation process is completed by using the following two steps.

1. Reset Step

A reset row voltage $U_x$ is applied to all row electrodes, and a reset column voltage $V_x$ is applied to all column electrodes, where $U_x - V_x > U_{ON}$. In this case, all optical switches are reset to an ON state.

2. Connection Establishment Step

Figure 21:
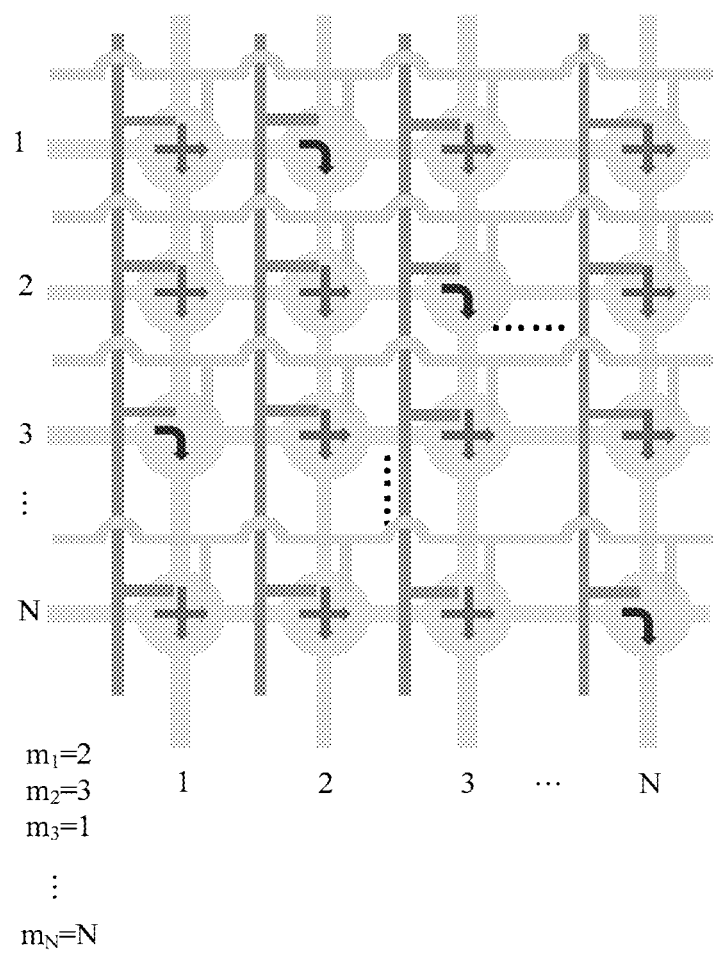
FIG. 21 and FIG. 22 are schematic diagrams of representation of an input port and an output port according to an embodiment of this application.

It is assumed that a target state of the optical switch matrix is $[1, 2, 3, \ldots, N] \rightarrow [m_1, m_2, m_3, \ldots, m_N]$. To be specific, an optical signal on an input port 1 of the optical switch matrix needs to be switched to an output port $m_1$, an optical signal on an input port 2 needs to be switched to an output port $m_2$, ..., and an optical signal on an input port N needs to be switched to an output port $m_N$. In an example shown in FIG. 21, $m_1=2$, $m_2=3$, $m_3=1$, and $m_N=N$.

Input ports and output ports of the optical switch matrix are represented by using 2t-digit binary numbers ($2^t \geq N$), where 2t-digit binary numbers corresponding to an input port 1 and an output port $m_1$ are the same, 2t-digit binary numbers corresponding to an input port 2 and an output port $m_2$ are the same, and so on. For each 2t-digit binary number, last t digits are inverse codes of initial t digits, that is, a relationship between a value h of the initial t digits and a value q of the last t digits is $h=2t-1-q$.

After the ports are represented, only an input port and an output port that need to be connected after switching correspond to identical 2t-digit binary numbers. In addition, when an input port and an output port correspond to different 2t-digit binary numbers ($[C_{i,1}, C_{i,2}, \ldots, C_{i,2t}]$ and $[D_{j,1}, D_{j,2}, \ldots, D_{j,2t}]$), $[C_{i,1}, C_{i,2}, \ldots, C_{i,2t}]$ and $[D_{j,1}, D_{j,2}, \ldots, D_{j,2t}]$ include at least a pair of digits that meet $C_v < D_v$, that is, "$C_v = 0$ and $D_v = 1$". Because $[C_{i,1}, C_{i,2}, \ldots, C_{i,2t}]$ and $[D_{j,1}, D_{j,2}, \ldots, D_{j,2t}]$ are different, initial t digits of $[C_{i,1}, C_{i,2}, \ldots, C_{i,2t}]$ are necessarily different from those of $[D_{j,1}, D_{j,2}, \ldots, D_{j,2t}]$. If "$C_v=0$ and $D_v=1$" occurs once in the initial t digits, "$C_u=1$ and $D_u=0$" necessarily occurs once in last t digits. On the contrary, if "$C_v=1$ and $D_u=0$" occurs once in the initial t digits, "$C_v=0$ and $D_v=1$" necessarily occurs once in the last t digits.

Figure 22:
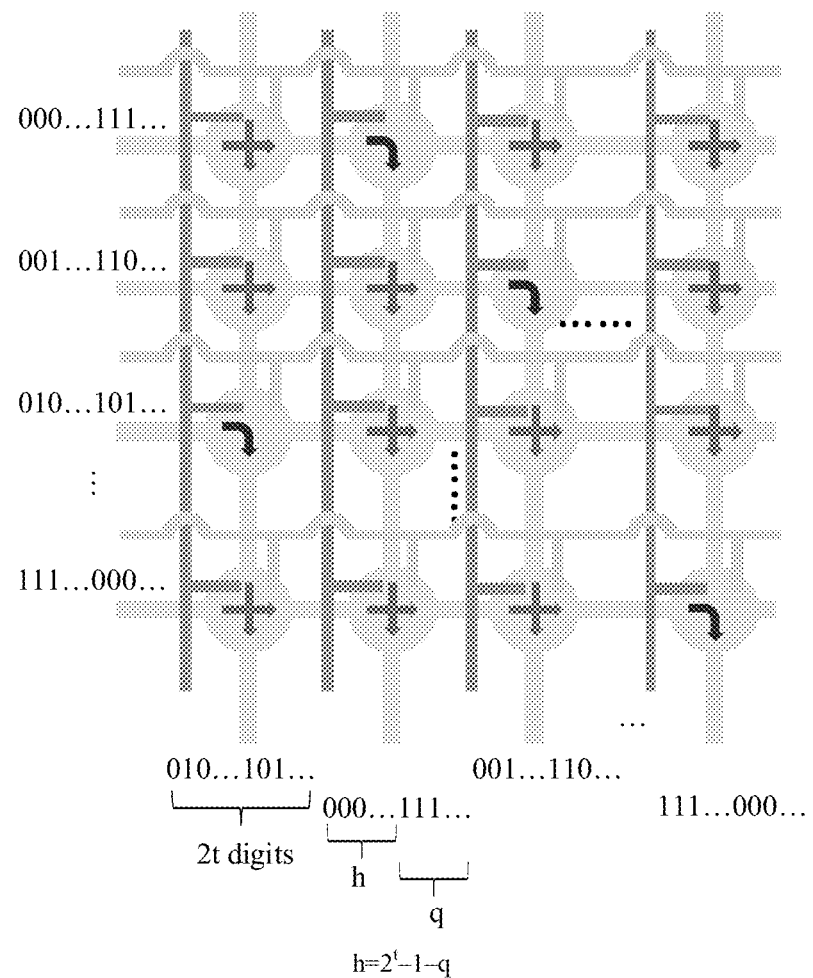

As shown in FIG. 22, representation results of the ports are as follows: 2t-digit binary numbers corresponding to an input port 1 and an output port 2 are 000 . . . 111 . . . , 2t-digit binary numbers corresponding to an input port 2 and an output port 3 are 001 . . . 110 . . . , 2t-digit binary numbers corresponding to an input port 3 and an output port 1 are 010 . . . 101 . . . , and 2t-digit binary numbers corresponding to an input port N and an output port N are 111 . . . 000 . . . .

Based on the foregoing 2t-digit binary serial numbers, voltages are applied to row electrodes and column electrodes of the optical switch matrix. The voltages are applied in 2t time units. A length of each time unit should be greater than or equal to a drive time required for switching an optical switch from an ON state to an OFF state.

In an $a^{th}$ time unit (a value of a is 1, 2, . . . , or 2t), when a value of an $a^{th}$ digit of a 2t-digit binary number of an input port i is 0, $U_0$ is applied to a corresponding row electrode; when a value of an $a^{th}$ digit of a 2t-digit binary number of an input port is 1, $U_1$ is applied to a corresponding row electrode.

Likewise, in the $a^{th}$ time unit, when a value $D_{j,a}$ of an $a^{th}$ digit of a 2t-digit binary number of an output port j is 0, $V_0$ is applied to a corresponding column electrode; when a value of an $a^{th}$ digit of a 2t-digit binary number of an output port is 1, $V_1$ is applied to a corresponding column electrode.

Similar to the foregoing description, for an optical switch in an $i^{th}$ row and a $j^{th}$ column, when $j=m_i$, values of all digits of 2t-digit binary numbers of an input port i corresponding to the $i^{th}$ row and an output port j corresponding to the $j^{th}$ column are the same. Throughout the 2t time units, the optical switch in the $i^{th}$ row and the $j^{th}$ column remains in an original state all the time, that is, the ON state.

When $j \neq m_i$, 2t-digit binary numbers of the input port i corresponding to the $i^{th}$ row and the output port j corresponding to the $j^{th}$ column are different, and the optical switch is switched to the OFF state. It can be learned from the relationship between the switching row voltage set $[U_0, U_1]$ and the switching column voltage set $[V_0, V_1]$ that, in the 2t time units, no optical switch is switched from the OFF state to the ON state.

Therefore, after the 2t time units, only an optical switch whose row number i and column number j meet $j=m_i$ is in the ON state, and other optical switches are all switched to the OFF state. It can be learned from a feature of the optical switch matrix of the crossbar topological structure that, a connected state [1, 2, 3, . . . , N]→[$m_1, m_2, m_3, \ldots, m_N$] between the input ports and the output ports of the optical switch matrix has been established.

After the connected state between the input port and the output port has been established, a hold row voltage $U_r$ may be applied to the row electrodes, and a hold column voltage $V_r$ ($U_{OFF}<U_r-V_r<U_{ON}$) may be applied to the column electrodes, so that all the optical switches remain in a current state, and the optical switch matrix works stably and waits for next switching.

Assuming that a time required for switching an optical switch from the ON state to the OFF state is $t_{OFF}$ and a time required for switching the optical switch from the OFF state to the ON state is $t_{ON}$, for the N×N optical switch matrix, if all the ports need to be switched, one $t_{ON}$ and 2t $t_{OFF}$ are required in the solution in this embodiment of this application, that is, a switching time according to the solution in this embodiment of this application is $T1=t_{ON}+2t^*t_{OFF}$ ($2^t \geq N$). In an existing technology of switching optical switches one by one, if all ports need to be switched, N $t_{ON}$ and N $t_{OFF}$ are required, that is, a switching time according to the existing technology of switching optical switches one by one is $T=N^*t_{ON}+N^*t_{OFF}$.

For example, for a 64×64 optical switch matrix, if t=6, a switching time according to the solution in this embodiment of this application is $T_1=t_{ON}+12^*t_{OFF}$, and a switching time according to the existing technology of switching optical switches one by one is $T_0=64^*t_{ON}+64^*t_{OFF}$. After the control method in this embodiment of this application is used, the switching time of the optical switch matrix is significantly shortened.

The following further uses s=4 as an example to describe a method for controlling an N×N optical switch matrix.

Figure 23:
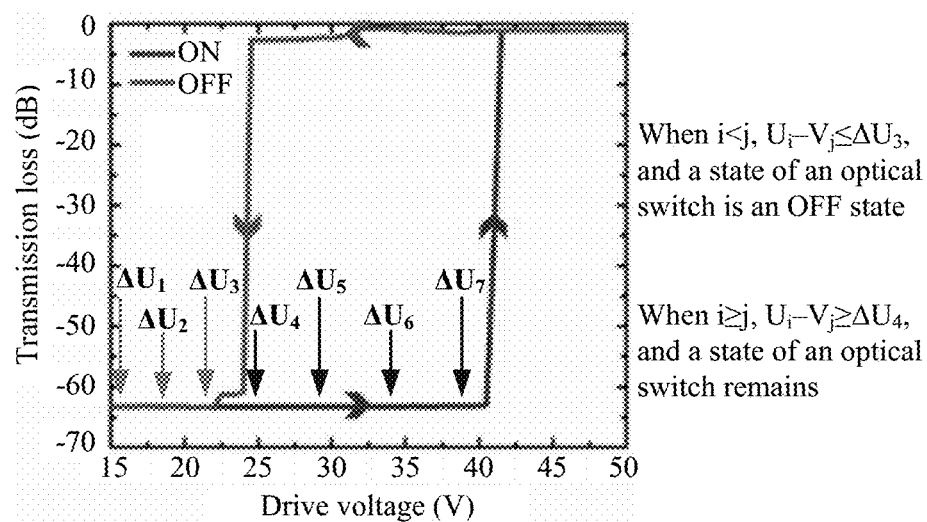
FIG. 23 is a schematic diagram of a correspondence between a drive voltage and an optical switch status according to another embodiment of this application.

A case in which s=4 is similar to the case in which s=2. A difference is that a switching row voltage set in this embodiment of this application has four voltage values $[U_0, U_1, U_2, U_3]$, and a switching column voltage set also has four voltage values $[V_0, V_1, V_2, V_3]$. Correspondingly, an input port and an output port of an optical switch in this embodiment of this application are represented by using quaternary encoding. A specific implementation process may be as follows:

Seven arithmetic progression voltage values $\Delta U_1$, $\Delta U_2$, $\Delta U_3$, $\Delta U_4$, $\Delta U_5$, $\Delta U_6$, and $\Delta U_7$ that are in ascending order are found from a drive voltage characteristics curve of an optical switch, where $\Delta U_1$, $\Delta U_2$ and $\Delta U_3 < U_{off}$, $U_{off} < \Delta U_4$, $\Delta U_5$, and $\Delta U_6$, and $\Delta U_7 < U_{on}$. For example, as shown in FIG. 23, $\Delta U_1$, $\Delta U_2$, $\Delta U_3$, $\Delta U_4$, $\Delta U_5$, $\Delta U_6$, and $\Delta U_7$ may be 15 V, 19 V, 23 V, 27 V, 31 V, 35 V, and 39 V, respectively.

For ease of control, four relatively small arithmetic progression voltage values may be selected to form a switching column voltage set $[V_0, V_1, V_2, V_3]$, where a common difference is $\Delta U_2 - \Delta U_1$. For example, the switching column voltage set may be [6 V, 10 V, 14 V, 18 V].

$\Delta U_4$ is added to all voltages in the switching column voltage set, to obtain four voltage values that form a switching row voltage set $[U_0, U_1, U_2, U_3]$. For example, the switching column voltage set may be [33 V, 37 V, 41 V, 45 V].

Based on the foregoing setting, the switching row voltage set $[U_0, U_1, U_2, U_3]$ and the switching column voltage set $[V_0, V_1, V_2, V_3]$ are found, and the following relationship is met:

when a voltage value $U_i$ is selected from the switching row voltage set $[U_0, U_1, U_2, U_3]$ and used as a row voltage, and a voltage value $V_j$ is selected from the switching column voltage set $[V_0, V_1, V_2, V_3]$ and used as a column voltage, a corresponding optical switch is switched to an OFF state only when i<j, and the optical switch remains in an original state in other cases.

An operation process in this embodiment of this application is described still by using an example in which N input ports and N output ports of the optical switch matrix all need to be switched. The operation process is completed by using the following two steps.

1. Reset Step

This step is similar to that in the case in which s=2, and details are not described herein again.

2. Connection Establishment Step

It is assumed that a target state of the optical switch matrix is [1, 2, 3, . . . , N]→[$m_1$, $m_2$, $m_3$, . . . , $m_N$]. To be specific, an optical signal on an input port 1 of the optical switch matrix needs to be switched to an output port $m_1$, an optical signal on an input port 2 needs to be switched to an output port $m_2$, . . . , and an optical signal on an input port N needs to be switched to an output port $m_N$. In an example shown in FIG. 21, $m_i$=2, $m_{2=3}$, $m_{3=1}$, and $m_N$=N.

Input ports and output ports of the optical switch matrix are represented by using 2t-digit quaternary numbers ($4^t$≥N), where 2t-digit quaternary numbers corresponding to an input port 1 and an output port $m_1$ are the same, 2t-digit quaternary numbers corresponding to an input port 2 and an output port $m_2$ are the same, and so on. For each 2t-digit quaternary number, last t digits are inverse codes of initial t digits, that is, a relationship between a value h of the initial t digits and a value q of the last t digits is h=4t−1−q.

After the ports are represented, only an input port and an output port that need to be connected after switching correspond to identical 2t-digit quaternary numbers. In addition, when an input port and an output port correspond to different 2t-digit quaternary numbers ([$C_{i,1}$, $C_{i,2}$, . . . , $C_{i,2t}$] and [$D_{j,1}$, $D_{j,2}$, . . . , $D_{j,2t}$]), [$C_{i,1}$, $C_{i,2}$, . . . , $C_{i,2t}$] and [$D_{j,1}$, $D_{j,2}$, . . . , $D_{j,2t}$] include at least one pair of digits that meet $C_v$<$D_v$. Because [$C_{i,1}$, $C_{i,2}$, . . . , $C_{i,2t}$] and [$D_{j,1}$, $D_{j,2}$, . . . , $D_{j,2t}$] are different, initial t digits of [$C_{i,1}$, $C_{i,2}$, . . . , $C_{i,2t}$] are necessarily different from those of [$D_{j,1}$, $D_{j,2}$, . . . , $D_{j,2t}$]. If $C_v$<$D_v$ occurs once in the initial t digits, $C_u$>$D_u$ necessarily occurs once in last t digits. Conversely, if $C_u$>$D_u$ occurs once in the initial t digits, $C_v$<$D_v$ necessarily occurs once in the last t digits.

Figure 24:
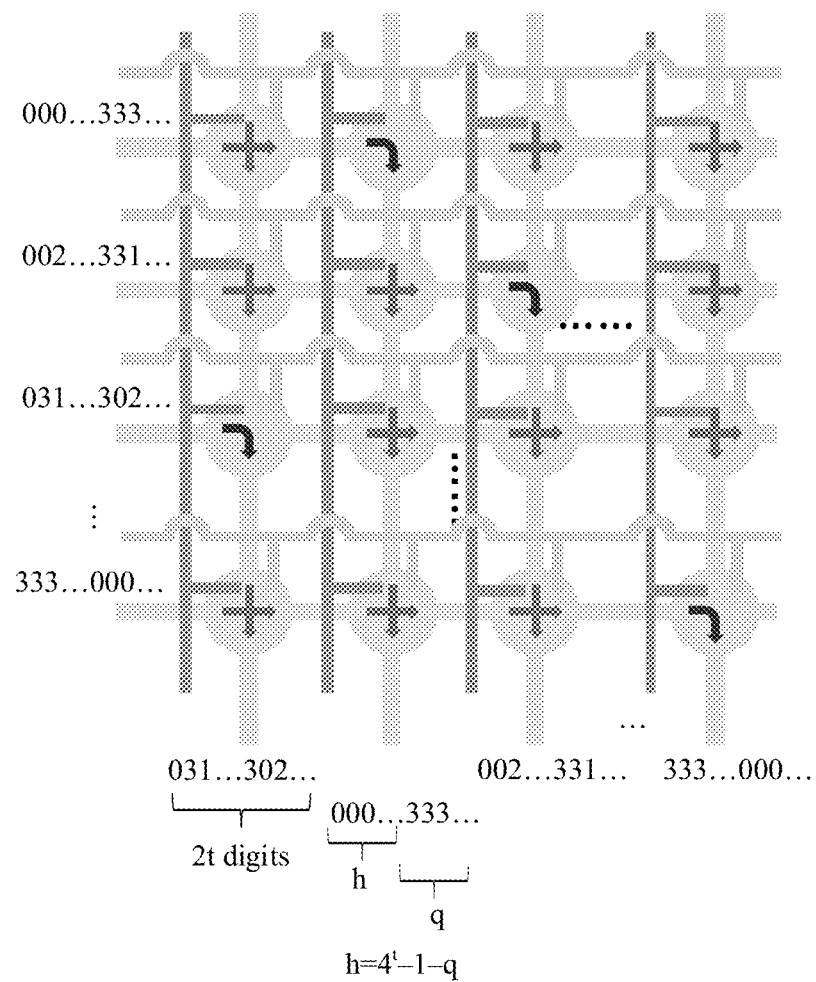
FIG. 24 is a schematic diagram of representation of an input port and an output port according to another embodiment of this application.

As shown in FIG. 24, representation results of the ports are as follows: 2t-digit quaternary numbers corresponding to an input port 1 and an output port 2 are 000 . . . 333 . . . , 2t-digit quaternary numbers corresponding to an input port 2 and an output port 3 are 002 . . . 331 . . . , 2t-digit quaternary numbers corresponding to an input port 3 and an output port 1 are 031 . . . 302 . . . , and 2t-digit quaternary numbers corresponding to an input port N and an output port N are 333 . . . 000 . . . .

Based on the foregoing 2t-digit quaternary serial numbers, voltages are applied to row electrodes and column electrodes of the optical switch matrix. The voltages are applied in 2t time units. A length of each time unit should be greater than or equal to a drive time required for switching an optical switch from an ON state to an OFF state.

In an $a^{th}$ time unit (a value of a is 1, 2, . . . , or 2t), when a value of an $a^{th}$ digit of a 2t-digit quaternary number of an input port i is 0, $U_0$ is applied to a corresponding row electrode; when a value of an $a^{th}$ digit of a 2t-digit quaternary number of an input port is 1, $U_1$ is applied to a corresponding row electrode; and so on.

Likewise, in the a$^{th}$ time unit, when a value $D_{j,a}$ of an $a^{th}$ digit of a 2t-digit quaternary number of an output port j is 0, $V_0$ is applied to a corresponding column electrode; when a value of an $a^{th}$ digit of a 2t-digit quaternary number of an output port is 1, $V_1$ is applied to a corresponding column electrode; and so on.

Similar to the foregoing description, for an optical switch in an $i^{th}$ row and a $j^{th}$ column, when j=$m_i$, values of all digits of 2t-digit quaternary numbers of an input port i corresponding to the $i^{th}$ row and an output port j corresponding to the $j^{th}$ column are the same. Throughout the 2t time units, the optical switch in the $i^{th}$ row and the $j^{th}$ column remains in an original state all the time, that is, the ON state.

When j≠$m_i$, 2t-digit quaternary numbers of the input port i corresponding to the $i^{th}$ row and the output port j corresponding to the $j^{th}$ column are different, and the optical switch is switched to the OFF state. It can be learned from the relationship between the switching row voltage set [$U_0$, $U_1$, $U_2$, $U_3$] and the switching column voltage set [$V_0$, $V_1$, $V_2$, $V_3$] that, in the 2t time units, no optical switch is switched from the OFF state to the ON state.

Therefore, after the 2t time units, only an optical switch whose row number i and column number j meet j=$m_i$ is in the ON state, and other optical switches are all switched to the OFF state. It can be learned from a feature of the optical switch matrix of the crossbar topological structure that, a connected state [1, 2, 3, . . . , N]→[$m_1$, $m_2$, $m_3$, . . . , $m_N$] between the input ports and the output ports of the optical switch matrix has been established.

After the connected state between the input port and the output port has been established, a hold row voltage $U_r$ may be applied to the row electrodes, and a hold column voltage $V_r$ ($U_{OFF}$<$U_r$-$V_r$<$U_{ON}$) may be applied to the column electrodes, so that all the optical switches remain in a current state, and the optical switch matrix works stably and waits for next switching.

Assuming that a time required for switching an optical switch from the ON state to the OFF state is $t_{OFF}$ and a time required for switching the optical switch from the OFF state to the ON state is $t_{ON}$, for the N×N optical switch matrix, if all the ports need to be switched, one $t_{ON}$ and 2t $t_{OFF}$ are required in the solution in this embodiment of this application, that is, a switching time according to the solution in this embodiment of this application is $T_1$=$t_{ON}$+2t*$t_{OFF}$ ($4^t$≥N). In an existing technology of switching optical switches one by one, if all ports need to be switched, N $t_{ON}$ and N $t_{OFF}$ are required, that is, a switching time according to the existing technology of switching optical switches one by one is $T_0$=N*$t_{ON}$+N*$t_{OFF}$.

For example, for a 64×64 optical switch matrix, if t=3, a switching time according to the solution in this embodiment of this application is $T_1$=$t_{ON}$+6*$t_{OFF}$, and a switching time according to the existing technology of switching optical switches one by one is $T_0$=64*$t_{ON}$+64*$t_{OFF}$. After the control method in this embodiment of this application is used, the switching time of the optical switch matrix is significantly shortened.

In this embodiment of this application, the seven arithmetic progression voltage values are found in the drive voltage characteristics curve of the optical switch, where three of the seven arithmetic progression values are less than $U_{OFF}$ and the other four are between $U_{OFF}$ and $U_{ON}$. Ports are represented by using 2t-digit quaternary numbers, so that the optical switch matrix has a higher switching speed. Certainly, if more arithmetic progression voltage values are selected, there is a higher requirement for drive voltage characteristics of an optical switch.

Figure 25:
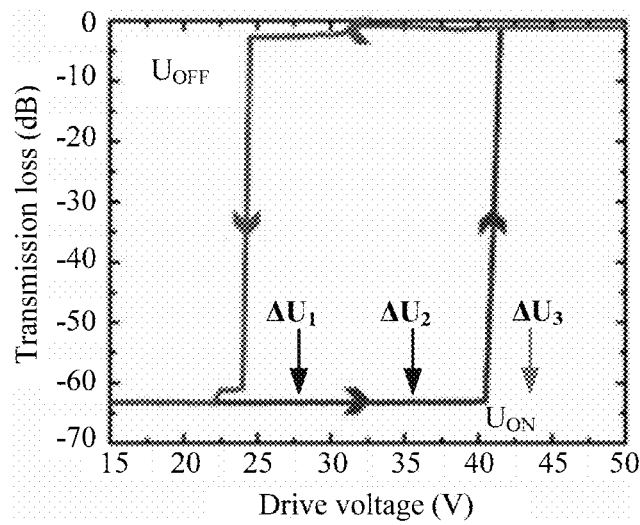
FIG. 25 is a schematic diagram of a correspondence between a drive voltage and an optical switch status according to still another embodiment of this application.

It should be understood that, in both the specific example shown in FIG. 14 and FIG. 15 and the specific example shown in FIG. 18 and FIG. 19 to FIG. 24, description is made based on that an optical switch meets the drive characteristics shown in FIG. 3. In this embodiment of this application, when the optical switch meets the drive characteristics shown in FIG. 5, if s=2 is still used as an example, three voltage values $\Delta U_1$, $\Delta U_2$, and $\Delta U_3$ are found from a drive voltage characteristics curve of an optical switch, where a relationship between $\Delta U_1$, $\Delta U_2$, and $\Delta U_3$, and $U_{OFF}$ and $U_{ON}$ may be shown in FIG. 25. That is, $U_{OFF}<\Delta U_1$, $\Delta U_2<U_{ON}$, $\Delta U_3>U_{ON}$, and $\Delta U_3-\Delta U_2=\Delta U_2-\Delta U_1$. Subsequent determining of a switching column voltage set and a switching row voltage set, port representation, a reset step, and a connection establishment step are all similar to those in the foregoing descriptions, and details are not described herein again.

For the current-driven optical switch shown in FIG. 6 and FIG. 7, the switching row drive sequence may be a switching row current sequence $[H_{i,1}, H_{i,2}, \ldots, H_{i,2t}]$, the switching column drive sequence may be a switching column current sequence $[I_{j,1}, I_{j,2}, \ldots, I_{j,2t}]$, and the successively setting, based on time, a row drive corresponding to an $i^{th}$ input port in the P input ports to values in a switching row drive sequence, and successively setting, based on time, a column drive corresponding to a $j^{th}$ output port in the Q output ports to values in a switching column drive sequence may include:

representing the $i^{th}$ input port in the P input ports as $[C_{i,1}, C_{i,2}, \ldots, C_{i,2t}]$ by using a 2t-digit base-s number, where any two input ports in the P input ports correspond to different 2t-digit base-s numbers; and representing the $j^{th}$ output port in the Q output ports as $[D_{j,1}, D_{j,2}, \ldots, D_{j,2t}]$ by using a 2t-digit base-s number, where any two output ports in the Q output ports correspond to different 2t-digit base-s numbers, a sum of a value of one digit of a 2t-digit base-s number corresponding to the first target input port and a value of a corresponding digit of a 2t-digit base-s number corresponding to the first target output port is s−1, a set of values available for each digit of the 2t-digit base-s number is [0, 1, . . . , s−1], a switching row drive value set corresponding to the value set [0, 1, . . . , s−1] is $[H_0, H_1, \ldots, H_{s-1}]$, and a switching column drive value set corresponding to the value set [0, 1, . . . , s−1] is $[I_0, I_1, \ldots, I_{s-1}]$; and simultaneously performing the following operations on the P row drives corresponding to the P input ports and the Q column drives corresponding to the Q output ports: in the $a^{th}$ time unit of the 2t time units, setting the row drive corresponding to the $i^{th}$ input port to a switching row drive value $H_{Ci,a}$ corresponding to a value $C_{i,a}$ of an $a^{th}$ digit of the 2t-digit base-s number as which the $i^{th}$ input port is represented, and setting the column drive corresponding to the $j^{th}$ output port to a switching column drive value $I_{Dj,a}$ corresponding to a value $D_{j,a}$ of an $a^{th}$ digit of the 2t-digit base-s number as which the $j^{th}$ output port is represented, where a value of a is 1, 2, . . . , or 2t.

The switching row drive value set $[H_0, H_1, \ldots, H_{s-1}]$ and the switching column drive value set $[I_0, I_1, \ldots, I_{s-1}]$ meet the following: when an $m^{th}$ switching row drive value $H_m$ in the switching row drive value set $[H_0, H_1, \ldots, H_{s-1}]$ is applied to a first row drive, and an $n^{th}$ switching column drive value $I_n$ in the switching drive value set $[I_0, I_1, \ldots, I_{s-1}]$ is applied to a first column drive, an optical switch at an intersection of the first row drive and the first column drive remains in a current state or is switched from the first state to the second state, and the optical switch at the intersection of the first row drive and the first column drive cannot be switched from the second state to the first state.

Specifically, that the value obtained after the operation is performed on the parameter value of the first drive and the parameter value of the second drive belongs to the first interval may mean that a sum of the parameter value of the first drive and the parameter value of the second drive belongs to the first interval, that the value obtained after the operation is performed on the parameter value of the first drive and the parameter value of the second drive belongs to the second interval may mean that the sum of the parameter value of the first drive and the parameter value of the second drive belongs to the second interval, and that the value obtained after the operation is performed on the parameter value of the first drive and the parameter value of the second drive belongs to the third interval may mean that the sum of the parameter value of the first drive and the parameter value of the second drive belongs to the third interval.

Similarly, for a crossbar optical switch matrix of current-driven optical switches in this embodiment of this application, ports may also be represented by using 2t-digit base-s numbers, s row current values form a switching row current set (that is, a switching row drive value set), and s column current values form a switching column current set (that is, a switching column drive value set).

Optionally, values in the first interval are greater than a first threshold $I_{ON}$, values in the second interval are greater than a second threshold $I_{OFF}$ and less than the first threshold $I_{ON}$, and values in the third interval are less than the second threshold $I_{OFF}$.

The switching row current set and the switching column current set may be determined in the following manner:

finding 2s−1 arithmetic progression current values $\Delta I_1$, $\Delta I_2$, $\Delta I_3$, . . . , and $\Delta I_{2s-1}$ that are in ascending order from a drive current curve of an optical switch, where $\Delta I_1, \Delta I_2, \ldots, \Delta I_{s-1} < I_{OFF}$, and $I_{OFF} < \Delta I_s, \Delta I_{s+1}, \ldots, \Delta I_{2s-1} < I_{ON}$;

selecting s arithmetic progression current values to form a switching column current set $[I_0, I_1, I_2, \ldots, I_{s-1}]$, where a common difference is $\Delta I_2-\Delta I_1$, and for ease of control, the s arithmetic progression current values in the switching column current set $[I_0, I_1, I_2, \ldots, I_{s-1}]$ may be relatively small values; and setting $H_0=\Delta I_s-I_{s-1}$, $H_1=\Delta I_s-I_{s-2}$, $H_2=\Delta I_s-I_{s-3}$, . . . , and $H_{s-1}=\Delta I_s-I_0$, to obtain a switching row current set $[H_0, H_1, H_2, \ldots, H_{s-1}]$.

Based on the foregoing setting, the switching row current set $[H_0, H_1, H_2, \ldots, H_{s-1}]$ and the switching column current set $[I_0, I_1, I_2, \ldots, I_{s-1}]$ are found, and the following relationship is met:

when a current value $H_m$ is selected from the switching row current set and used as a row current, and a current value $I_n$ is selected from the switching column current set and used as a column current, if m<n, $H_m+I_n \leq \Delta I_{s-1}$, and the optical switch is switched to an OFF state; or if m≥n, $H_m+I_n \geq \Delta I_s$, and the optical switch remains in an original state.

A method for controlling an N×N optical switch matrix is described still by using s=2 as an example.

A switching row current set $[H_0, H_1]$ and a switching column current set $[I_0, I_1]$ may be designed, where $H_0=8$ mA, $H_1=18$ mA, $I_0=8$ mA, and $I_1=18$ mA. When a row current and a column current are $H_0$ and $I_0$, respectively, an optical switch is switched to the OFF state. I$_n$ other cases, the optical switch remains in an original state.

An operation process in this embodiment of this application is described still by using an example in which N input ports and N output ports of the optical switch matrix all need to be switched. The operation process is completed by using the following two steps.

1. Reset Step

A reset row current $H_x$ (a reset row drive value) is applied to all rows, and a reset column current $I_x$ (a reset column drive value) is applied to all columns, where $H_x+I_x>I_{ON}$. In this case, all optical switches are reset to an ON state. For example, $H_x$ is 22 mA, and $I_x$ is 22 mA.

2. Connection Establishment Step

Input ports and output ports of the optical switch matrix are represented by using 2t-digit binary numbers. For an input port and an output port that need to be connected, a 2t-digit binary number corresponding to the input port and a 2t-digit binary number corresponding to the output port are inverse codes of each other (for example, 0011 and 1100).

It is assumed that a target state of the optical switch matrix is $[1, 2, 3, \ldots, N] \to [m_1, m_2, m_3, \ldots, m_N]$. To be specific, an optical signal on an input port 1 of the optical switch matrix needs to be switched to an output port $m_1$, an optical signal on an input port 2 needs to be switched to an output port $m_2, \ldots$, and an optical signal on an input port N needs to be switched to an output port $m_N$. In this example, assuming that there are only four input ports and four output ports, $m_1=2$, $m_{2=3}$, $m_3=1$, and $m_4=4$.

Figure 26:
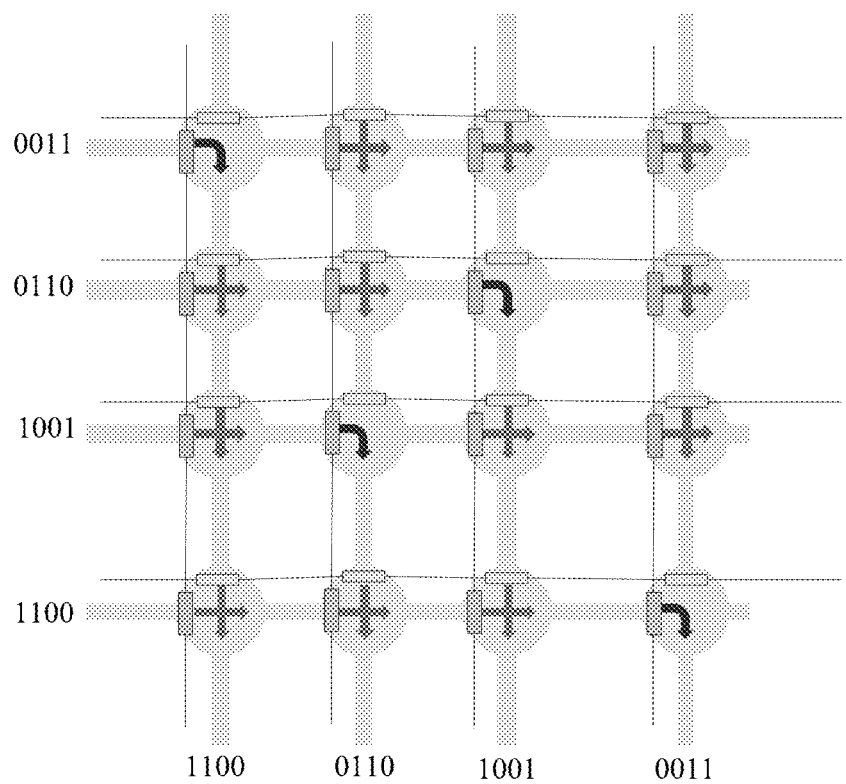
FIG. 26 is a schematic diagram of representation of an input port and an output port according to still another embodiment of this application.

As shown in FIG. 26, representation results of the ports are as follows: a four-digit quaternary number corresponding to an input port 1 is 0011, and a four-digit quaternary number corresponding to an output port 2 is 1100; a four-digit quaternary number corresponding to an input port 2 is 0110, and a four-digit quaternary number corresponding to an output port 3 is 1001; a four-digit quaternary number corresponding to an input port 3 is 1001, and a four-digit quaternary number corresponding to an output port 1 is 0110; and a four-digit quaternary number corresponding to an input port 4 is 1100, and a four-digit quaternary number corresponding to an output port 4 is 0011.

Based on the foregoing 2t-digit binary serial numbers, currents are applied to rows and columns of the optical switch matrix, that is, a switching row current sequence is applied to the rows, and a switching column current sequence is applied to the columns. The currents are applied in 2t time units. A length of each time unit should be greater than or equal to a drive time required for switching an optical switch from an ON state to an OFF state. After several periods, an optical switch whose row and column are inverse codes of each other remains in an original state, and other optical switches are switched to the OFF state in a time unit.

It should be understood that, in the embodiments of this application, the switching row voltage sequence and the switching row current sequence may be collectively referred to as the switching row drive sequence, and the switching column voltage sequence and the switching column current sequence may be collectively referred to as the switching column drive sequence. The switching row voltage set and the switching row current set may be collectively referred to as the switching row drive value set, and the switching column voltage set and the switching column current set may be collectively referred to as the switching column drive value set.

It should be understood that the M×N optical switch matrix of the crossbar topological structure in this embodiment of this application, especially the N×N optical switch matrix, may be applied to a scenario of an optical switching node. When the optical switch matrix is applied to the optical switching node, the method for controlling an optical switch matrix in this embodiment of this application can still be used.

Figure 27:
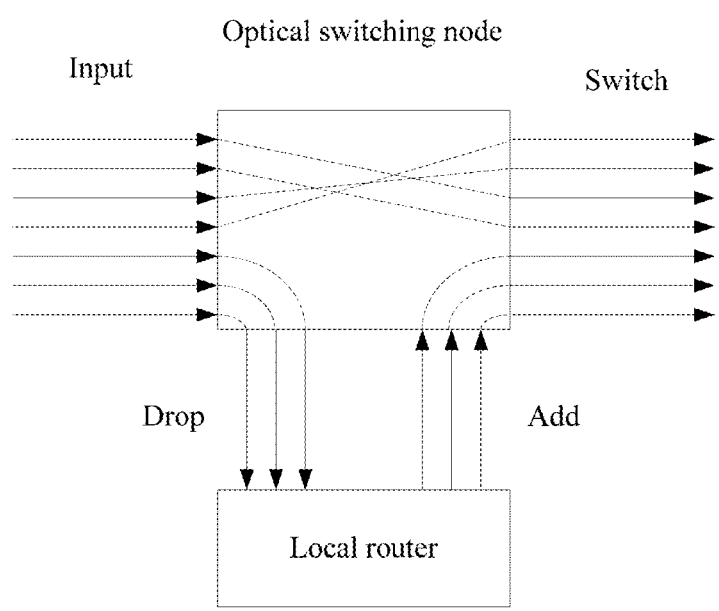
FIG. 27 is a schematic diagram of signal switching using an optical switching node according to an embodiment of this application.

As shown in FIG. 27, optical signals that are input (input) from a plurality of other nodes to an optical switching node in a backbone network need to be dropped (drop) to the local node in some cases, or need to be switched (through) to another node in other cases. In addition, a local optical signal may need to be added (add) to another node by using a local optical switching node. In this application scenario, a connection relationship of cut-through optical signals usually needs to be implemented through switching by using an optical switch on the optical switching node, and a connection relationship of added and dropped optical signals may be implemented through local electrical switching. Therefore, added and dropped optical signals may only need to be transmitted by using an optical switch, and do not need to be switched by using the optical switch.

Figure 28:
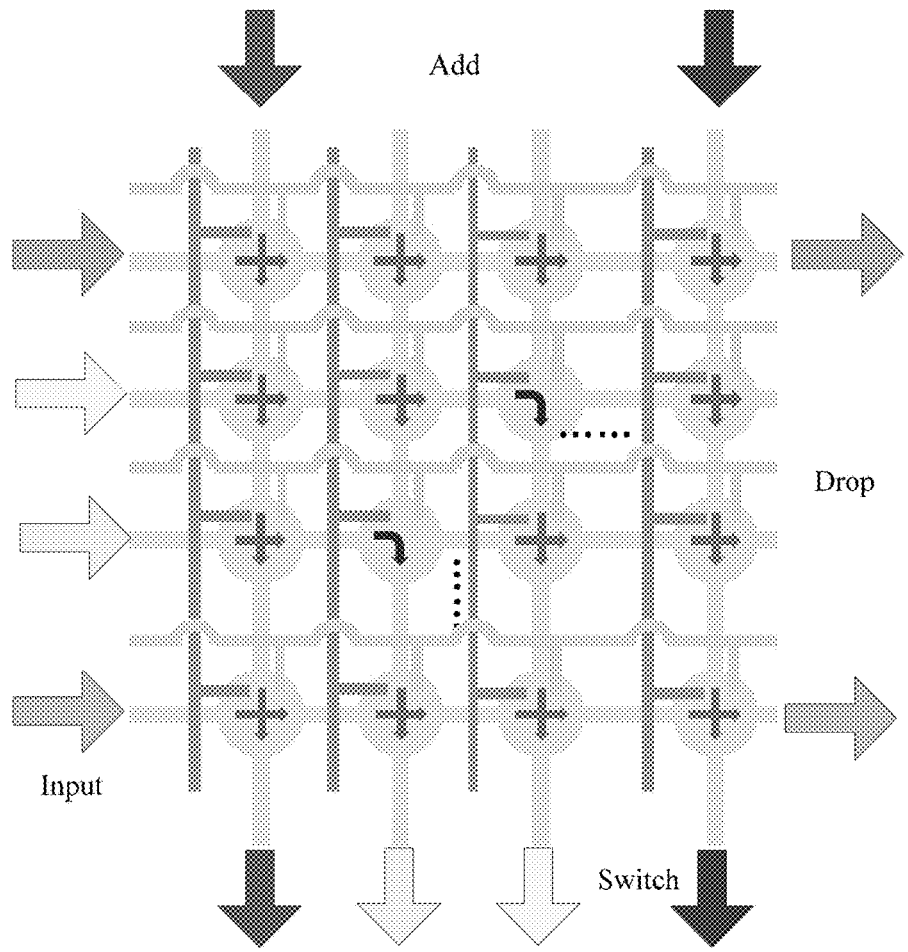
FIG. 28 is a schematic diagram of signal switching using an optical switching node according to another embodiment of this application.

For an optical switch matrix in this embodiment of this application, input ports (left-side ports shown in FIG. 27) of the optical switch matrix may be used for an input function, and output ports (lower-side ports shown in FIG. 27) of the optical switch matrix may be used for a through function. In this way, input-to-through switching performance can be ensured. Upper-side ports shown in FIG. 27 may be used for an add function, and right-side ports shown in FIG. 27 may be used for a drop function. In this way, it is ensured that an added optical signal can enter a through port, and an input optical signal can enter a drop port, thereby meeting a transmission requirement of the backbone network, as shown in FIG. 28. To be specific, a first output port OP1 that is of an optical switch in the N optical switches in each row and that is connected to no first input port IP1 of another optical switch is a drop port of the optical switch matrix; a second output port OP2 of one of M optical switches in each column is connected to a second input port IP2 of an adjacent optical switch; a second output port OP2 that is of an optical switch in the M optical switches in each column and that is connected to no second input port IP2 of another optical switch is a through port of the optical switch matrix; and a second input port IP2 that is of an optical switch in the M optical switches in each column and that is connected to no second output port OP2 of another optical switch is an add port of the optical switch matrix.

In this application scenario, a maximum of only one optical switch in each row and each column of the optical switch matrix is in the ON state, and the method for controlling an optical switch matrix in this embodiment of this application can still be used for control.

Optionally, in an embodiment, the method may further include: determining the P to-be-switched input ports and the Q to-be-switched output ports in the optical switch matrix based on switching requirements collected by an asynchronous switching system in a second time period.

The method for controlling an optical switch matrix in this embodiment of this application may be applied to the asynchronous switching system. Specifically, the solution for controlling an optical switch matrix in this embodiment of this application may be considered as three parts: a switching requirement collection phase, an algorithm phase, and a switching execution phase.

In a running process, the asynchronous switching system collects switching requirements of the asynchronous switching system for the optical switch matrix. After the second time period, the apparatus for controlling an optical switch matrix in the asynchronous switching system gathers the collected switching requirements, starts to execute an algorithm, and at the same time, collects next-round switching requirements. Algorithm execution may include contention-related handling, representation of ports of the optical switch matrix, determining of a radix and a quantity of digits (determining of t and s), representation of the ports of the optical switch matrix, and other possible control logic.

After a third time period, the apparatus for controlling an optical switch matrix completes algorithm execution. The apparatus for controlling an optical switch matrix controls the optical switch matrix to execute a switching operation. As described above, the switching execution phase includes a reset step (that is, resetting an optical switch at an intersection of a row and a column that correspond to a to-be-switched port to an ON state) and a connection establishment step (switching an optical switch that needs to be switched to an OFF state to the OFF state).

It should be understood that algorithm execution in this embodiment of this application may alternatively be started before switching requirement collection is completed, that is, algorithm execution starts in a process of collecting the switching requirements. In other words, the second time period and the third time period overlap.

Figure 29:
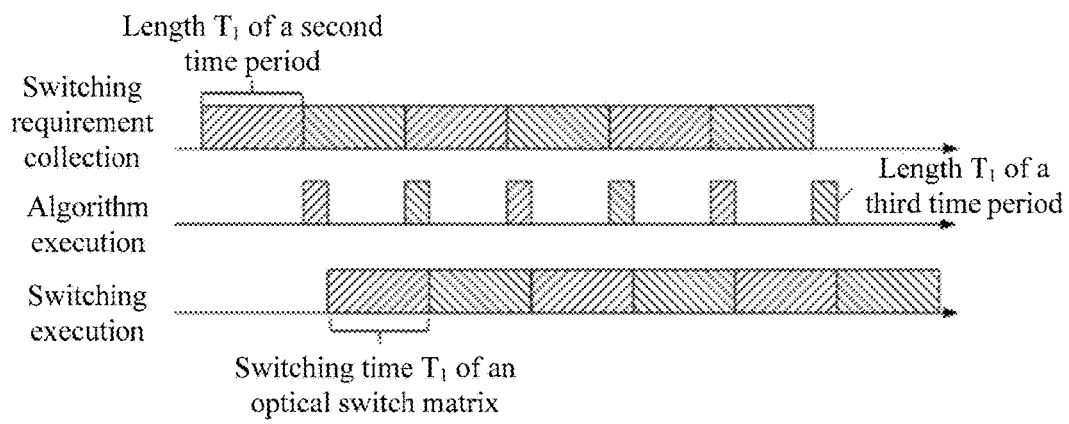
FIG. 29 is a schematic diagram of a method for controlling an optical switch matrix in an asynchronous switching system according to an embodiment of this application.

As shown in FIG. 29, for the asynchronous switching system, the second time period spent in collecting the switching requirements and the switching time of the optical switch matrix may be set to be equal and are both $T_1$, and the third time period for algorithm execution may be set to $t_1$. In the solution in this embodiment of this application, a required maximum time from a moment at which the asynchronous switching system starts to collect the switching requirements to a moment at which the optical switch matrix completes switching execution is $2*T_1+t_1$. Therefore, for the asynchronous switching system, if the solution in this embodiment of this application is used, a time interval between two data packets should be at least greater than $2*T_1+t_1$.

This embodiment of this application provides another solution for controlling an optical switch matrix for the asynchronous switching system, so that a time from putting forward switching requirements to completing switching can be further shortened. It is assumed that a time required for resetting an optical switch is $t_{ON} > T_1/2$.

Figure 30:
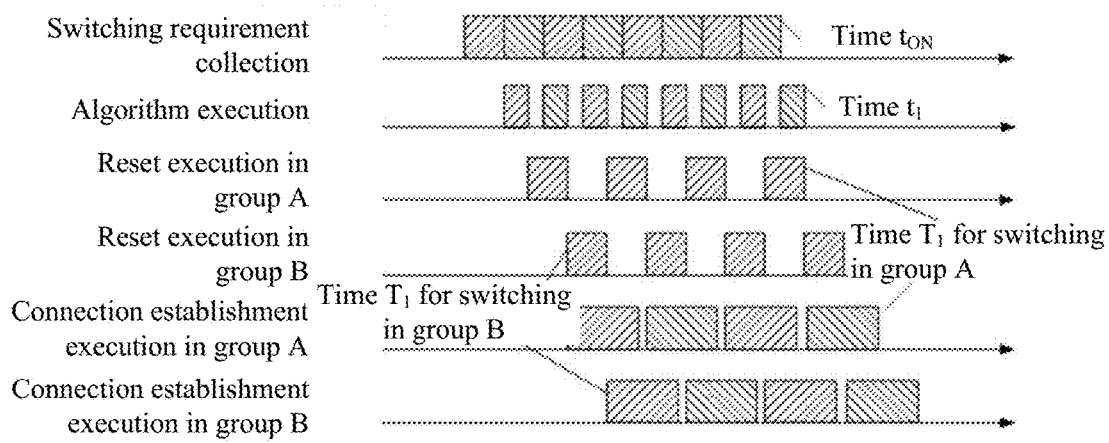
FIG. 30 is a schematic diagram of a method for controlling an optical switch matrix in an asynchronous switching system according to another embodiment of this application.

As shown in FIG. 30, in this embodiment of this application, resetting and connection establishment of optical switches in the optical switch matrix may be performed in two groups. After resetting in group A is completed, a connection establishment operation starts to be performed, and at the same time, resetting in group B starts. It can be understood that, in three cases in which resetting is performed in group A and the connection establishment operation is performed in group B, the connection establishment operation is performed in group A and resetting is performed in group B, and the connection establishment operation is simultaneously performed in group A and group B, operations in group A and group B do not affect each other.

In a running process, the asynchronous switching system collects switching requirements of the asynchronous switching system for the optical switch matrix. After a time of $t_{ON}$, the apparatus for controlling an optical switch matrix in the asynchronous switching system gathers the collected switching requirements, starts to execute an algorithm, and at the same time, starts to collect second-round switching requirements.

After a time of $t_1$, a first-round algorithm execution operation is completed, and the optical switch matrix starts to perform resetting and a connection establishment operation in group A.

After second-round switching requirement collection is completed, that is, in a time of $2*t_{ON}$ after the asynchronous switching system starts to collect the switching requirements, the apparatus for controlling an optical switch matrix gathers the collected switching requirements, starts an algorithm execution operation, and at the same time, collects third-round switching requirements.

After a time of another $t_1$, a second-round algorithm execution operation is completed, and the optical switch matrix starts to perform resetting and a connection establishment operation in group B.

After third-round switching requirement collection is completed, that is, in a time of $3*t_{ON}$ after the asynchronous switching system starts to collect switching requirements, the apparatus for controlling an optical switch matrix gathers the collected switching requirements, starts an algorithm execution operation, and at the same time, collects fourth-round switching requirements.

According to the solution in this embodiment of this application, reset operations in group A and group B are performed in alternate manner with no time interval between each other, and connection establishment operations closely follows the resetting operations. The connection establishment operations in group A and group B overlap.

According to the solution in this embodiment of this application, a required maximum time from a moment at which the asynchronous switching system starts to collect a round of switching requirements to a moment at which the optical switch matrix completes switching execution is $t_{ON}+t_1+T_1$. The time is further shortened in comparison with that in the foregoing solution. Actually, when $t_{ON}<T_1/2$, resetting and connection establishment operations may further be performed in more groups in this embodiment in this application. Provided that resetting operations in different groups do not overlap in time, the different groups cannot affect each other.

Figure 31:
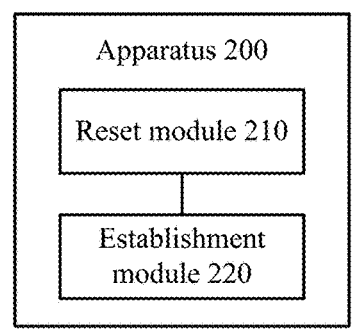
FIG. 31 is a schematic block diagram of an apparatus for controlling an optical switch matrix according to an embodiment of this application.

With reference to FIG. 31, the following describes an apparatus 200 for controlling an optical switch matrix in an embodiment of this application. The optical switch matrix controlled by the apparatus 200 is an M×N optical switch matrix of a crossbar structure, the optical switch matrix includes M input ports and N output ports, any optical switch in M×N optical switches of the optical switch matrix includes a first drive and a second drive, first drives of N optical switches in each row of the optical switch matrix are connected together to form a row drive, and second drives of M optical switches in each column of the optical switch matrix are connected together to form a column drive, where M and N are both positive integers, and at least one of M and N is greater than or equal to 2.

The apparatus 200 may include:

a reset module 210, configured to set P row drives corresponding to P to-be-switched input ports in the M input ports to a reset row drive value, and set Q column drives corresponding to Q to-be-switched output ports in the N output ports to a reset column drive value, so that P×Q optical switches at intersections of the P input ports and the Q output ports are in a first state, where P is less than or equal to M, and Q is less than or equal to N; and an establishment module 220, configured to simultaneously perform the following operations on the P row drives corresponding to the P input ports and the Q column drives corresponding to the Q output ports: successively setting, based on time, a row drive corresponding to an $i^{th}$ input port in the P input ports to values in a switching row drive sequence, and successively setting, based on time, a column drive corresponding to a $j^{th}$ output port in the Q output ports to values in a switching column drive sequence, where the switching row drive sequence and the switching column drive sequence make a target optical switch in the P×Q optical switches remain in the first state all the time, and the switching row drive sequence and the switching column drive sequence make other optical switches in the P×Q optical switches different from the target optical switch switched from the first state to a second state in first time periods respectively corresponding to the other optical switches, where the target optical switch is at least one optical switch at an intersection of at least one input port in the P input ports and a target output port corresponding to the at least one input port, a value of i is 1, 2, . . . , or P, and a value of j is 1, 2, . . . , or Q.

According to the apparatus for controlling an optical switch matrix in this embodiment of this application, the optical switches at the intersections of the to-be-switched input ports and the to-be-switched output ports are all set to be in the first state, and then the switching row drive sequence and the switching column drive sequence are simultaneously applied to the row drives and the column drives of the optical switches, respectively. In this way, the optical switches are simultaneously controlled instead of being controlled one by one, so that a switching time of the optical switch matrix can be shortened and working efficiency of the optical switch matrix can be increased.

Optionally, in an embodiment, the any optical switch in the M×N optical switches of the optical switch matrix meets the following: when a value obtained after an operation is performed on a parameter value of the first drive and a parameter value of the second drive belongs to a first interval, the any optical switch is in the first state; or when a value obtained after an operation is performed on a parameter value of the first drive and a parameter value of the second drive belongs to a second interval, the any optical switch remains in a current state; or when a value obtained after an operation is performed on a parameter value of the first drive and a parameter value of the second drive belongs to a third interval, the any optical switch is in the second state, where an intersection of any two of the first interval, the second interval, and the third interval is an empty set; the reset row drive value and the reset column drive value meet the following: a value obtained after an operation is performed on the reset row drive value and the reset column drive value belongs to the first interval; and any value in the switching row drive sequence and a corresponding value in the switching column drive sequence meet the following: a value obtained after an operation is performed on the any value in the switching row drive sequence and the corresponding value in the switching column drive sequence belongs to the second interval or belongs to the third interval.

Optionally, in an embodiment, the switching row drive sequence is $[X_{i,1}, X_{i,2}, \ldots, X_{i,2t}]$, the switching column drive sequence is $[Y_{j,1}, Y_{j,2}, \ldots, Y_{j,2t}]$, and the successively setting, by the establishment module 220 based on time, a row drive corresponding to an $i^{th}$ input port in the P input ports to values in a switching row drive sequence, and successively setting, based on time, a column drive corresponding to a $j^{th}$ output port in the Q output ports to values in a switching column drive sequence may include: in an $a^{th}$ time unit of 2t time units, setting the row drive corresponding to the $i^{th}$ input port to a switching row drive value $X_{j,a}$, and setting the column drive corresponding to the $j^{th}$ output port to a switching column drive value $Y_{j,a}$, where in the 2t time units, the target optical switch remains in the first state all the time, and the other optical switches in the P×Q optical switches different from the target optical switch are switched from the first state to the second state in first time units respectively corresponding to the other optical switches, where the first time period is the first time unit, and a value of a is 1, 2, . . . , or 2t.

Optionally, in an embodiment, the apparatus 200 may further include a determining module, configured to determine the P to-be-switched input ports and the Q to-be-switched output ports in the optical switch matrix based on a direction along which an optical signal is to be transmitted.

Optionally, in an embodiment, the switching row drive sequence is a switching row voltage sequence $[U_{i,1}, U_{i,2}, \ldots, U_{i,2t}]$, the switching column drive sequence is a switching column voltage sequence $[V_{j,1}, V_{j,2}, \ldots, V_{j,2t}]$, and the successively setting, by the establishment module 220 based on time, a row drive corresponding to an $i^{th}$ input port in the P input ports to values in a switching row drive sequence, and successively setting, based on time, a column drive corresponding to a $j^{th}$ output port in the Q output ports to values in a switching column drive sequence may include: representing the $i^{th}$ input port in the P input ports as $[C_{i,1}, C_{i,2}, \ldots, C_{i,2t}]$ by using a 2t-digit base-s number, where any two input ports in the P input ports correspond to different 2t-digit base-s numbers; and representing the $j^{th}$ output port in the Q output ports as $[D_{j,1}, D_{j,2}, \ldots, D_{j,2t}]$ by using a 2t-digit base-s number, where any two output ports in the Q output ports correspond to different 2t-digit base-s numbers, a 2t-digit base-s number corresponding to the first target input port and a 2t-digit base-s number corresponding to the first target output port are the same, a set of values available for each digit of the 2t-digit base-s number is [0, 1, . . . , s−1], a switching row drive value set corresponding to the value set [0, 1, . . . , s−1] is [$U_0$, $U_1$, . . . , $U_{s-1}$], and a switching column drive value set corresponding to the value set [0, 1, . . . , s−1] is [$V_0$, $V_1$, . . . , $V_{s-1}$]; and simultaneously performing the following operations on the P row drives corresponding to the P input ports and the Q column drives corresponding to the Q output ports: in the $a^{th}$ time unit of the 2t time units, setting the row drive corresponding to the $i^{th}$ input port to a switching row drive value $U_{Ci,a}$ corresponding to a value $C_{i,a}$ of an $a^{th}$ digit of the 2t-digit base-s number as which the $i^{th}$ input port is represented, and setting the column drive corresponding to the $j^{th}$ output port to a switching column drive value $V_{Dj,a}$ corresponding to a value $D_{j,a}$ of an $a^{th}$ digit of the 2t-digit base-s number as which the $j^{th}$ output port is represented, where a value of a is 1, 2, . . . , or 2t, where the switching row drive value set [$U_0$, $U_1$, . . . , $U_{s-1}$] and the switching column drive value set [$V_0$, $V_1$, . . . , $V_{s-1}$] meet the following: when an $m^{th}$ switching row drive value $U_m$ in the switching row drive value set [$U_0$, $U_1$, . . . , $U_{s-1}$] is applied to a first row drive, and an $n^{th}$ switching column drive value $V_n$ in the switching drive value set [$V_0$, $V_1$, . . . , $V_{s-1}$] is applied to a first column drive, an optical switch at an intersection of the first row drive and the first column drive remains in a current state or is switched from the first state to the second state, and the optical switch at the intersection of the first row drive and the first column drive cannot be switched from the second state to the first state.

Optionally, in an embodiment, the switching row drive value set [$U_0$, $U_1$, . . . , $U_{s-1}$] and the switching column drive value set [$V_0$, $V_1$, . . . , $V_{s-1}$] meet the following: when $U_m$ is applied to the first row drive, and $V_n$ is applied to the first column drive, if m>n, the optical switch at the intersection of the first row drive and the first column drive remains in an original state; or if m<n, the optical switch at the intersection of the first row drive and the first column drive is switched to the second state; and 2t-digit base-s numbers as which the P input ports are respectively represented and 2t-digit base-s numbers as which the Q output ports are respectively represented meet the following: the 2t-digit base-s number corresponding to the $i^{th}$ input port in the P input ports is [$C_{i,1}$, $C_{i,2}$, . . . , $C_{i,2t}$], [$C_{i,1}$, $C_{i,2}$, . . . , $C_{i,2t}$] is divided into first t digits and second t digits, the 2t-digit base-s number corresponding to the $j^{th}$ output port in the Q output ports is [$D_{j,1}$, $D_{j,2}$, . . . , $D_{j,2t}$], and [$D_{j,1}$, $D_{j,2}$, . . . , $D_{j,2t}$] is divided into third t digits and fourth t digits, where positions of the first t digits in [$C_{i,1}$, $C_{i,2}$, . . . , $C_{i,2t}$] are the same as those of the third t digits in [$D_{j,1}$, $D_{j,2}$, . . . , $D_{j,2t}$], and when a value of any digit in the first t digits is $C_u$, and a value of a corresponding digit in the third t digits is $D_u$, if $C_u$ is not equal to $D_u$, [$C_{i,1}$, $C_{i,2}$, . . . , $C_{i,2t}$] and [$D_{j,1}$, $D_{j,2}$, . . . , $D_{j,2t}$] include at least one pair of values that meet $C_v$<$D_v$.

Optionally, in an embodiment, the switching row drive value set [$U_0$, $U_1$, . . . , $U_{s-1}$] and the switching column drive value set [$V_0$, $V_1$, . . . , $V_{s-1}$] meet the following: when $U_m$ is applied to the first row drive, and $V_n$ is applied to the first column drive, if m<n, the optical switch at the intersection of the first row drive and first column drive remains in an original state; or if m>n, the optical switch at the intersection of the first row drive and the first column drive is switched to the second state; and 2t-digit base-s numbers as which the P input ports are respectively represented and 2t-digit base-s numbers as which the Q output ports are respectively represented meet the following: the 2t-digit base-s number corresponding to the $i^{th}$ input port in the P input ports is [$C_{i,1}$, $C_{i,2}$, . . . , $C_{i,2t}$], [$C_{i,1}$, $C_{i,2}$, . . . , $C_{i,2t}$] is divided into first t digits and second t digits, the 2t-digit base-s number corresponding to the $j^{th}$ output port in the Q output ports is [$D_{j,1}$, $D_{j,2}$, . . . , $D_{j,2t}$], and [$D_{j,1}$, $D_{j,2}$, . . . , $D_{j,2t}$] is divided into third t digits and fourth t digits, where positions of the first t digits in [$C_{i,1}$, $C_{i,2}$, . . . , $C_{i,2t}$] are the same as those of the third t digits in [$D_{j,1}$, $D_{j,2}$, . . . , $D_{j,2t}$], and when a value of any digit in the first t digits is $C_u$, and a value of a corresponding digit in the third t digits is $D_u$, if $C_u$ is not equal to $D_u$, [$C_{i,1}$, $C_{i,2}$, . . . , $C_{i,2t}$] and [$D_{j,1}$, $D_{j,2}$, . . . , $D_{j,2t}$] include at least one pair of values that meet $C_v$>$D_v$.

Optionally, in an embodiment, a sum of a value of one digit in the second t digits and a value of a corresponding digit in the first t digits of the 2t-digit base-s number [$C_{i,1}$, $C_{i,2}$, . . . , $C_{i,2t}$] corresponding to the $i^{th}$ input port is s−1, and a sum of a value of one digit in the fourth t digits and a value of a corresponding digit in the third t digits of the 2t-digit base-s number [$D_{j,1}$, $D_{j,2}$, . . . , $D_{j,2t}$] corresponding to the $j^{th}$ output port is s−1.

Optionally, in an embodiment, s and t are determined based on a maximum value between P and Q.

Optionally, in an embodiment, the any optical switch in the M×N optical switches of the optical switch matrix meets the following: when the value obtained after the operation is performed on the parameter value of the first drive and the parameter value of the second drive belongs to the first interval, the any optical switch is in the first state; or when the value obtained after the operation is performed on the parameter value of the first drive and the parameter value of the second drive belongs to the second interval, the any optical switch remains in the current state; or when the value obtained after the operation is performed on the parameter value of the first drive and the parameter value of the second drive belongs to the third interval, the any optical switch is in the second state, where the intersection of any two of the first interval, the second interval, and the third interval is the empty set; and that the value obtained after the operation is performed on the parameter value of the first drive and the parameter value of the second drive belongs to the first interval means that an absolute value of a difference between the parameter value of the first drive and the parameter value of the second drive is greater than a first threshold, that the value obtained after the operation is performed on the parameter value of the first drive and the parameter value of the second drive belongs to the second interval means that the absolute value of the difference between the parameter value of the first drive and the parameter value of the second drive is less than the first threshold and greater than a second threshold, and that the value obtained after the operation is performed on the parameter value of the first drive and the parameter value of the second drive belongs to the third interval means that the absolute value of the difference between the parameter value of the first drive and the parameter value of the second drive is less than the second threshold; and the switching row drive value set [$U_0$, $U_1$, . . . , $U_{s-1}$]

and the switching column drive value set $[V_0, V_1, \ldots, V_{s-1}]$ are determined by using the following method: determining 2s−1 arithmetic progression values $\Delta U_1, \Delta U_2, \Delta U_3, \ldots,$ and $\Delta U_{2s-1}$ based on the first threshold and the second threshold, where $\Delta U_1$, $\Delta U_2, \ldots,$ and $\Delta U_{s-1}$ are less than the second threshold, and $\Delta U_s, \Delta U_{s+1}, \ldots,$ and $\Delta U_{2s-1}$ are greater than the second threshold and less than the first threshold; determining the switching column drive value set $[V_0, V_1, \ldots, V_{s-1}]$, where a common difference of $V_0$, $V_1, \ldots,$ and $V_{s-1}$ is $\Delta U_2-\Delta U_1$; and adding $\Delta U_s$ to any switching column drive value in the switching column drive value set $[V_0, V_1, \ldots, V_{s-1}]$, to obtain a corresponding switching row drive value, so that switching row drive values form the switching row drive value set $[U_0, U_1, \ldots, U_{s-1}]$.

Optionally, in an embodiment, the switching row drive sequence is a switching row current sequence $[H_{i,1}, H_{i,2}, \ldots, H_{i,2t}]$, the switching column drive sequence is a switching column current sequence $[I_{j,1}, I_{j,2}, \ldots, I_{j,2t}]$, and the successively setting, by the establishment module 220 based on time, a row drive corresponding to an $i^{th}$ input port in the P input ports to values in a switching row drive sequence, and successively setting, based on time, a column drive corresponding to a $j^{th}$ output port in the Q output ports to values in a switching column drive sequence may include: representing the $i^{th}$ input port in the P input ports as $[C_{i,1}, C_{i,2}, \ldots, C_{i,2t}]$ by using a 2t-digit base-s number, where any two input ports in the P input ports correspond to different 2t-digit base-s numbers; and representing the $j^{th}$ output port in the Q output ports as $[D_{j,1}, D_{j,2}, \ldots, D_{j,2t}]$ by using a 2t-digit base-s number, where any two output ports in the Q output ports correspond to different 2t-digit base-s numbers, a sum of a value of one digit of a 2t-digit base-s number corresponding to the first target input port and a value of a corresponding digit of a 2t-digit base-s number corresponding to the first target output port is s−1, a set of values available for each digit of the 2t-digit base-s number is $[0, 1, \ldots, s-1]$, a switching row drive value set corresponding to the value set $[0, 1, \ldots, s-1]$ is $[H_0, H_1, \ldots, H_{s-1}]$, and a switching column drive value set corresponding to the value set $[0, 1, \ldots, s-1]$ is $[I_0, I_1, \ldots, I_{s-1}]$; and simultaneously performing the following operations on the P row drives corresponding to the P input ports and the Q column drives corresponding to the Q output ports: in the $a^{th}$ time unit of the 2t time units, setting the row drive corresponding to the $i^{th}$ input port to a switching row drive value $H_{Ci,a}$ corresponding to a value $C_{i,a}$ of an $a^{th}$ digit of the 2t-digit base-s number as which the $i^{th}$ input port is represented, and setting the column drive corresponding to the $j^{th}$ output port to a switching column drive value $I_{Dj,a}$ corresponding to a value $D_{j,a}$ of an $a^{th}$ digit of the 2t-digit base-s number as which the $j^{th}$ output port is represented, where a value of a is $1, 2, \ldots,$ or 2t, where the switching row drive value set $[H_0, H_1, \ldots, H_{s-1}]$ and the switching column drive value set $[I_0, I_1, \ldots, I_{s-1}]$ meet the following: when an $m^{th}$ switching row drive value $H_m$ in the switching row drive value set $[H_0, H_1, \ldots, H_{s-1}]$ is applied to a first row drive, and an $n^{th}$ switching column drive value $I_n$ in the switching drive value set $[I_0, I_1, \ldots, I_{s-1}]$ is applied to a first column drive, an optical switch at an intersection of the first row drive and the first column drive remains in a current state or is switched from the first state to the second state, and the optical switch at the intersection of the first row drive and the first column drive cannot be switched from the second state to the first state.

Optionally, in an embodiment, the any optical switch in the M×N optical switches of the optical switch matrix meets the following: when the value obtained after the operation is performed on the parameter value of the first drive and the parameter value of the second drive belongs to the first interval, the any optical switch is in the first state; or when the value obtained after the operation is performed on the parameter value of the first drive and the parameter value of the second drive belongs to the second interval, the any optical switch remains in the current state; or when the value obtained after the operation is performed on the parameter value of the first drive and the parameter value of the second drive belongs to the third interval, the any optical switch is in the second state, where the intersection of any two of the first interval, the second interval, and the third interval is the empty set; and that the value obtained after the operation is performed on the parameter value of the first drive and the parameter value of the second drive belongs to the first interval means that a sum of the parameter value of the first drive and the parameter value of the second drive belongs to the first interval, that the value obtained after the operation is performed on the parameter value of the first drive and the parameter value of the second drive belongs to the second interval means that the sum of the parameter value of the first drive and the parameter value of the second drive belongs to the second interval, and that the value obtained after the operation is performed on the parameter value of the first drive and the parameter value of the second drive belongs to the third interval means that the sum of the parameter value of the first drive and the parameter value of the second drive belongs to the third interval.

Optionally, in an embodiment, the apparatus 200 may further include a maintaining module, configured to set the P row drives corresponding to the P to-be-switched input ports in the M input ports to a hold row drive value, and set the Q column drives corresponding to the Q to-be-switched output ports in the N output ports to a hold column drive value, where a value obtained after an operation is performed on the hold row drive value and the hold column drive value makes the P×Q optical switches at the intersections of the P input ports and the Q output ports remain in a current state.

Optionally, in an embodiment, the apparatus 200 may further include a determining module, configured to determine the P to-be-switched input ports and the Q to-be-switched output ports in the optical switch matrix based on switching requirements collected by an asynchronous switching system in a second time period. The apparatus for controlling an optical switch matrix in this embodiment of this application may be a processor, a control circuit, or a chip.

It should be understood that the first, second, third, fourth, and various numerals in this specification are only intended for distinguishing and ease of description, instead of limiting the scope of the embodiments of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected depending on actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for controlling an optical switch matrix, wherein the optical switch matrix is an M×N optical switch matrix of a crossbar structure, the optical switch matrix comprises M input ports and N output ports, the optical switch matrix comprises M×N optical switches, each optical switch in the M×N optical switches of the optical switch matrix comprises a first drive and a second drive, first drives of N optical switches in each row of the optical switch matrix are connected together to form a row drive, and second drives of M optical switches in each column of the optical switch matrix are connected together to form a column drive, wherein M and N are both positive integers, and at least one of M or N is greater than or equal to 2; and the method comprises:

setting P row drives corresponding to P input ports in the M input ports to a reset row drive value;

setting Q column drives corresponding to Q output ports in the N output ports to a reset column drive value, wherein P×Q optical switches at intersections of the P input ports and the Q output ports are in a first state, P is less than or equal to M, and Q is less than or equal to N; and simultaneously performing the following operations on the P row drives corresponding to the P input ports and the Q column drives corresponding to the Q output ports:

successively setting, based on time, a row drive corresponding to an $i^{th}$ input port in the P input ports to values in a switching row drive sequence; and successively setting, based on time, a column drive corresponding to a $j^{th}$ output port in the Q output ports to values in a switching column drive sequence, wherein the switching row drive sequence and the switching column drive sequence make a target optical switch in the P×Q optical switches remain in the first state, and the switching row drive sequence and the switching column drive sequence make other optical switches in the P×Q optical switches different from the target optical switch switched from the first state to a second state in first time periods respectively corresponding to the other optical switches, the target optical switch is at least one optical switch at an intersection of at least one input port in the P input ports and a target output port corresponding to the at least one input port, a value of i is 1, 2, . . . , or P, and a value of j is 1, 2, . . . , or Q.

2. The method according to claim 1, wherein
each optical switch in the M×N optical switches of the optical switch matrix meets the following:
when a value obtained after an operation is performed on a parameter value of the first drive and a parameter value of the second drive belongs to a first interval, the optical switch is in the first state; or
when a value obtained after an operation is performed on a parameter value of the first drive and a parameter value of the second drive belongs to a second interval, the optical switch remains in a current state; or
when a value obtained after an operation is performed on a parameter value of the first drive and a parameter value of the second drive belongs to a third interval, the optical switch is in the second state, wherein an intersection of any two of the first interval, the second interval, and the third interval is an empty set;
the reset row drive value and the reset column drive value meet the following: a value obtained after an operation is performed on the reset row drive value and the reset column drive value belongs to the first interval; and
each value in the switching row drive sequence and a corresponding value in the switching column drive sequence meet the following: a value obtained after an operation is performed on the value in the switching row drive sequence and the corresponding value in the switching column drive sequence belongs to the second interval or belongs to the third interval.

3. The method according to claim 1, wherein the switching row drive sequence is $[X_{i,1}, X_{i,2}, \ldots, x_{i,2t}]$, the switching column drive sequence is $[Y_{j,1}, Y_{j,2}, \ldots, Y_{j,2t}]$, and the successively setting, based on time, a row drive corresponding to an $i^{th}$ input port in the P input ports to values in a switching row drive sequence, and successively setting, based on time, a column drive corresponding to a $j^{th}$ output port in the Q output ports to values in a switching column drive sequence comprises:
in an $a^{th}$ time unit of 2t time units, setting the row drive corresponding to the $i^{th}$ input port to a switching row drive value $X_{i,a}$, and setting the column drive corresponding to the $j^{th}$ output port to a switching column drive value $Y_{j,a}$, wherein in the 2t time units, the target optical switch remains in the first state, and the other optical switches in the P×Q optical switches different from the target optical switch are switched from the first state to the second state in first time units respectively corresponding to the other optical switches, wherein the first time period is the first time unit, and a value of a is 1, 2, . . . , or 2t.

4. The method according to claim 1, wherein the method further comprises:
determining the P to-be-switched input ports and the Q to-be-switched output ports in the optical switch matrix based on a direction along which an optical signal is to be transmitted.

5. The method according to claim 1, wherein the switching row drive sequence is a switching row voltage sequence $[U_{1,i}, U_{i,2}, \ldots, U_{i,2t}]$, the switching column drive sequence is a switching column voltage sequence $[V_{j,1}, V_{j,2}, \ldots, V_{j,2t}]$, and the successively setting, based on time, a row drive corresponding to an $i^{th}$ input port in the P input ports to values in a switching row drive sequence, and successively setting, based on time, a column drive corresponding to a $j^{th}$ output port in the Q output ports to values in a switching column drive sequence comprises:

representing the $i^{th}$ input port in the P input ports as $[C_{i,1}, C_{i,2}, \ldots, C_{i,2t}]$ by using a 2t-digit base-s number, wherein any two input ports in the P input ports correspond to different 2t-digit base-s numbers;
representing the $j^{th}$ output port in the Q output ports as $[D_{j,1}, D_{j,2}, \ldots, D_{j,2t}]$ by using a 2t-digit base-s number, wherein any two output ports in the Q output ports correspond to different 2t-digit base-s numbers, a 2t-digit base-s number corresponding to a first target input port and a 2t-digit base-s number corresponding to a first target output port are the same, a set of values available for each digit of the 2t-digit base-s number is [0, 1, . . . , s−1], a switching row drive value set corresponding to the value set [0, 1, . . . , s−1] is $[U_0, U_1, \ldots, U_{s-1}]$, and a switching column drive value set corresponding to the value set [0, 1, . . . , s−1] is $[V_0, V_1, \ldots, V_{s-1}]$; and
simultaneously performing the following operations on the P row drives corresponding to the P input ports and the Q column drives corresponding to the Q output ports:
in an $a^{th}$ time unit of 2t time units, setting the row drive corresponding to the $i^{th}$ input port to a switching row drive value $U_{Ci,a}$ corresponding to a value $C_{i,a}$ of an $a^{th}$ digit of the 2t-digit base-s number as which the $i^{th}$ input port is represented, and
setting the column drive corresponding to the $j^{th}$ output port to a switching column drive value $V_{Dj,a}$ corresponding to a value $D_{j,a}$ of an $a^{th}$ digit of the 2t-digit base-s number as which the $j^{th}$ output port is represented, wherein a value of a is 1, 2, . . . , or 2t, wherein
the switching row drive value set $[U_0, U_1, \ldots, U_{s-1}]$ and the switching column drive value set $[V_0, V_1, \ldots, V_{s-1}]$ meet the following: when an $m^{th}$ switching row drive value $U_m$ in the switching row drive value set $[U_0, U_1, \ldots, U_{s-1}]$ is applied to a first row drive, and an $n^{th}$ switching column drive value $V_n$ in the switching column drive value set $[V_0, V_1, \ldots, V_{s-1}]$ is applied to a first column drive, an optical switch at an intersection of the first row drive and the first column drive remains in a current state or is switched from the first state to the second state, and the optical switch at the intersection of the first row drive and the first column drive cannot be switched from the second state to the first state.

6. The method according to claim 5, wherein the switching row drive value set $[U_0, U_1, \ldots, U_{s-1}]$ and the switching column drive value set $[V_0, V_1, \ldots, V_{s-1}]$ meet the following:
when $U_m$ is applied to the first row drive, and $V_n$ is applied to the first column drive,
if m≥n, the optical switch at the intersection of the first row drive and the first column drive remains in an original state; or
if m<n, the optical switch at the intersection of the first row drive and the first column drive is switched to the second state; and
2t-digit base-s numbers as which the P input ports are respectively represented and 2t-digit base-s numbers as which the Q output ports are respectively represented meet the following:
the 2t-digit base-s number corresponding to the $i^{th}$ input port in the P input ports is $[C_{i,1}, C_{i,2}, \ldots, C_{i,2t}]$, $[C_{i,1}, C_{i,2}, \ldots, C_{i,2t}]$ is divided into first t digits and second t digits, the 2t-digit base-s number corresponding to the $j^{th}$ output port in the Q output ports is $[D_{j,1},$ $D_{j,2}, \ldots, D_{j,2t}$], and [$D_{j,1}, D_{j,2}, \ldots, D_{j,2t}$] is divided into third t digits and fourth t digits, wherein positions of the first t digits in [$C_{i,1}, C_{i,2}, \ldots, C_{i,2t}$] are the same as those of the third t digits in [$D_{j,1}, D_{j,2}, \ldots, D_{j,2t}$], and when a value of any digit in the first t digits is $C_u$, and a value of a corresponding digit in the third t digits is $D_u$, if $C_u$ is not equal to $D_u$, [$C_{i,1}, C_{i,2}, \ldots, C_{i,2t}$] and [$D_{j,1}, D_{j,2}, \ldots, D_{j,2t}$] comprise at least one pair of values that meet $C_v < D_v$.

7. The method according to claim 5, wherein the switching row drive value set [$U_0, U_1, \ldots, U_{s-1}$] and the switching column drive value set [$V_0, V_1, \ldots, V_{s-1}$] meet the following:

when $U_m$ is applied to the first row drive, and $V_n$ is applied to the first column drive,
if $m \leq n$, the optical switch at the intersection of the first row drive and the first column drive remains in an original state; or
if $m > n$, the optical switch at the intersection of the first row drive and the first column drive is switched to the second state; and 2t-digit base-s numbers as which the P input ports are respectively represented and 2t-digit base-s numbers as which the Q output ports are respectively represented meet the following:

the 2t-digit base-s number corresponding to the $i^{th}$ input port in the P input ports is [$C_{i,1}, C_{i,2}, \ldots, C_{i,2t}$], [$C_{i,1}, C_{i,2}, \ldots, C_{i,2t}$] is divided into first t digits and second t digits, the 2t-digit base-s number corresponding to the $j^{th}$ output port in the Q output ports is [$D_{j,1}, D_{j,2}, \ldots, D_{j,2t}$], and [$D_{j,1}, D_{j,2}, \ldots, D_{j,2t}$] is divided into third t digits and fourth t digits, wherein positions of the first t digits in [$C_{i,1}, C_{i,2}, \ldots, C_{i,2t}$] are the same as those of the third t digits in [$D_{j,1}, D_{j,2}, \ldots, D_{j,2t}$], and when a value of any digit in the first t digits is $C_u$, and a value of a corresponding digit in the third t digits is $D_u$, if $C_u$ is not equal to $D_u$, [$C_{i,1}, C_{i,2}, \ldots, C_{i,2t}$] and [$D_{j,1}, D_{j,2}, \ldots, D_{j,2t}$] comprise at least one pair of values that meet $C_v > D_v$.

8. The method according to claim 6, wherein a sum of a value of one digit in the second t digits and a value of a corresponding digit in the first t digits of the 2t-digit base-s number [$C_{i,1}, C_{i,2}, \ldots, C_{i,2t}$] corresponding to the $i^{th}$ input port is s−1, and a sum of a value of one digit in the fourth t digits and a value of a corresponding digit in the third t digits of the 2t-digit base-s number [$D_{j,1}, D_{j,2}, \ldots, D_{j,2t}$] corresponding to the $j^{th}$ output port is s−1.

9. The method according to claim 5, wherein s and t are determined based on a maximum value between P and Q.

10. The method according to claim 5, wherein
each optical switch in the M×N optical switches of the optical switch matrix meets the following:
when the value obtained after an operation is performed on a parameter value of the first drive and a parameter value of the second drive belongs to a first interval, the optical switch is in the first state; or
when the value obtained after the operation is performed on a parameter value of the first drive and a parameter value of the second drive belongs to a second interval, the optical switch remains in the current state; or
when the value obtained after the operation is performed on a parameter value of the first drive and a parameter value of the second drive belongs to a third interval, the optical switch is in the second state, wherein the intersection of any two of the first interval, the second interval, and the third interval is an empty set;

the value obtained after the operation is performed on the parameter value of the first drive and the parameter value of the second drive belonging to the first interval comprises an absolute value of a difference between the parameter value of the first drive and the parameter value of the second drive being greater than a first threshold, the value obtained after the operation is performed on the parameter value of the first drive and the parameter value of the second drive belonging to the second interval comprises the absolute value of the difference between the parameter value of the first drive and the parameter value of the second drive being less than the first threshold and greater than a second threshold, the value obtained after the operation is performed on the parameter value of the first drive and the parameter value of the second drive belonging to the third interval comprises the absolute value of the difference between the parameter value of the first drive and the parameter value of the second drive being less than the second threshold; and the switching row drive value set [$U_0, U_1, \ldots, U_{s-1}$] and the switching column drive value set [$V_0, V_1, \ldots, V_{s-1}$] are determined by the following operations:

determining 2s−1 arithmetic progression values $\Delta U_1, \Delta U_2, \Delta U_3, \ldots$, and $\Delta U_{2s-1}$ based on the first threshold and the second threshold, wherein $\Delta U_1, \Delta U_2, \ldots$, and $\Delta U_{s-1}$ are less than the second threshold, and $\Delta U_s, \Delta U_{s+1}, \ldots$, and $\Delta U_{2s-1}$ are greater than the second threshold and less than the first threshold;

determining the switching column drive value set [$V_0, V_1, \ldots, V_{s-1}$], wherein a common difference of $V_0, V_1, \ldots$, and $V_{s-1}$ is $\Delta U_2 - \Delta U_1$; and adding $\Delta U_s$ to each switching column drive value in the switching column drive value set [$V_0, V_1, \ldots, V_{s-1}$], to obtain a corresponding switching row drive value, wherein switching row drive values form the switching row drive value set [$U_0, U_1, \ldots, U_{s-1}$].

11. An apparatus for controlling an optical switch matrix, wherein the optical switch matrix is an M×N optical switch matrix of a crossbar structure, the optical switch matrix comprises M input ports and N output ports, the optical switch matrix comprises M×N optical switches, each optical switch in switches of the optical switch matrix comprises a first drive and a second drive, first drives of N optical switches in each row of the optical switch matrix are connected together to form a row drive, and second drives of M optical switches in each column of the optical switch matrix are connected together to form a column drive, wherein M and N are both positive integers, and at least one of M or N is greater than or equal to 2; and the apparatus comprises a processor configured to:

set P row drives corresponding to P input ports in the M input ports to a reset row drive value;

set Q column drives corresponding to Q output ports in the N output ports to a reset column drive value, wherein P×Q optical switches at intersections of the P input ports and the Q output ports are in a first state, P is less than or equal to M, and Q is less than or equal to N; and simultaneously perform the following operations on the P row drives corresponding to the P input ports and the Q column drives corresponding to the Q output ports:

successively setting, based on time, a row drive corresponding to an $i^{th}$ input port in the P input ports to values in a switching row drive sequence; and successively setting, based on time, a column drive corresponding to a $j^{th}$ output port in the Q output ports to values in a switching column drive sequence, wherein the switching row drive sequence and the switching column drive sequence make a target optical switch in the P×Q optical switches remain in the first state, and the switching row drive sequence and the switching column drive sequence make other optical switches in the P×Q optical switches different from the target optical switch switched from the first state to a second state in first time periods respectively corresponding to the other optical switches, the target optical switch is at least one optical switch at an intersection of at least one input port in the P input ports and a target output port corresponding to the at least one input port, a value of i is 1, 2, ..., or P, and a value of j is 1, 2, ..., or Q.

12. The apparatus according to claim 11, wherein each optical switch in the M×N optical switches of the optical switch matrix meets the following:

when a value obtained after an operation is performed on a parameter value of the first drive and a parameter value of the second drive belongs to a first interval, the optical switch is in the first state; or when a value obtained after an operation is performed on a parameter value of the first drive and a parameter value of the second drive belongs to a second interval, the optical switch remains in a current state; or when a value obtained after an operation is performed on a parameter value of the first drive and a parameter value of the second drive belongs to a third interval, the optical switch is in the second state, wherein an intersection of any two of the first interval, the second interval, and the third interval is an empty set;

the reset row drive value and the reset column drive value meet the following: a value obtained after an operation is performed on the reset row drive value and the reset column drive value belongs to the first interval; and each value in the switching row drive sequence and a corresponding value in the switching column drive sequence meet the following: a value obtained after an operation is performed on the value in the switching row drive sequence and the corresponding value in the switching column drive sequence belongs to the second interval or belongs to the third interval.

13. The apparatus according to claim 11, wherein the switching row drive sequence is $[X_{i,1}, X_{i,2}, \ldots, X_{i,2t}]$, the switching column drive sequence is $[Y_{j,1}, Y_{j,2}, \ldots, Y_{j,2t}]$, and the processor is configured to:

in an $a^{th}$ time unit of 2t time units, set the row drive corresponding to the $i^{th}$ input port to a switching row drive value $X_{i,a}$, and set the column drive corresponding to the $j^{th}$ output port to a switching column drive value $Y_{j,a}$, wherein in the 2t time units, the target optical switch remains in the first state, and the other optical switches in the P×Q optical switches different from the target optical switch are switched from the first state to the second state in first time units respectively corresponding to the other optical switches, wherein the first time period is the first time unit, and a value of a is 1, 2, ..., or 2t.

14. The apparatus according to claim 11, wherein the processor is further configured to:

determine the P to-be-switched input ports and the Q to-be-switched output ports in the optical switch matrix based on a direction along which an optical signal is to be transmitted.

15. The apparatus according to claim 11, wherein the switching row drive sequence is a switching row voltage sequence $[U_{i,1}, U_{i,2}, \ldots, U_{i,2t}]$, the switching column drive sequence is a switching column voltage sequence $[V_{j,1}, V_{j,2}, \ldots, V_{j,2t}]$, and the processor is configured to:

represent the $i^{th}$ input port in the P input ports as $[C_{i,1}, C_{i,2}, \ldots, C_{i,2t}]$ by using a 2t-digit base-s number, wherein any two input ports in the P input ports correspond to different 2t-digit base-s numbers;

represent the $j^{th}$ output port in the Q output ports as $[D_{j,1}, D_{j,2}, \ldots, D_{j,2t}]$ by using a 2t-digit base-s number, wherein any two output ports in the Q output ports correspond to different 2t-digit base-s numbers, a 2t-digit base-s number corresponding to a first target input port and a 2t-digit base-s number corresponding to a first target output port are the same, a set of values available for each digit of the 2t-digit base-s number is $[0, 1, \ldots, s-1]$, a switching row drive value set corresponding to the value set $[0, 1, \ldots, s-1]$ is $[U_0, U_1, \ldots, U_{s-1}]$, and a switching column drive value set corresponding to the value set $[0, 1, \ldots, s-1]$ is $[V_0, V_1, \ldots, V_{s-1}]$; and simultaneously perform the following operations on the P row drives corresponding to the P input ports and the Q column drives corresponding to the Q output ports:

in an $a^{th}$ time unit of 2t time units, setting the row drive corresponding to the $i^{th}$ input port to a switching row drive value $U_{Ci,a}$ corresponding to a value $C_{i,a}$ of an $a^{th}$ digit of the 2t-digit base-s number as which the $i^{th}$ input port is represented, and setting the column drive corresponding to the $j^{th}$ output port to a switching column drive value $V_{Dj,a}$ corresponding to a value $D_{j,a}$ of an $a^{th}$ digit of the 2t-digit base-s number as which the $j^{th}$ output port is represented, wherein a value of a is 1, 2, ..., or 2t, wherein the switching row drive value set $[U_0, U_1, \ldots, U_{s-1}]$ and the switching column drive value set $[V_0, V_1, \ldots, V_{s-1}]$ meet the following: when an $m^{th}$ switching row drive value $U_m$ in the switching row drive value set $[U_0, U_1, \ldots, U_{s-1}]$ is applied to a first row drive, and an $n^{th}$ switching column drive value $V_n$ in the switching column drive value set $[V_0, V_1, \ldots, V_{s-1}]$ is applied to a first column drive, an optical switch at an intersection of the first row drive and the first column drive remains in a current state or is switched from the first state to the second state, and the optical switch at the intersection of the first row drive and the first column drive cannot be switched from the second state to the first state.

16. The apparatus according to claim 15, wherein the switching row drive value set $[U_0, U_1, \ldots, U_{s-1}]$ and the switching column drive value set $[V_0, V_1, \ldots, V_{s-1}]$ meet the following:

when $U_m$ is applied to the first row drive, and $V_n$ is applied to the first column drive, if m≥n, the optical switch at the intersection of the first row drive and the first column drive remains in an original state; or if m<n, the optical switch at the intersection of the first row drive and the first column drive is switched to the second state; and 2t-digit base-s numbers as which the P input ports are respectively represented and 2t-digit base-s numbers as which the Q output ports are respectively represented meet the following:

the 2t-digit base-s number corresponding to the $i^{th}$ input port in the P input ports is $[C_{i,1}, C_{i,2}, \ldots, C_{i,2t}]$, $[C_{i,1}, C_{i,2}, \ldots, C_{i,2t}]$ is divided into first t digits and second t digits, the 2t-digit base-s number corresponding to the $j^{th}$ output port in the Q output ports is $[D_{j,1}, D_{j,2}, \ldots, D_{j,2t}]$, and $[D_{j,1}, D_{j,2}, \ldots, D_{j,2t}]$ is divided into third t digits and fourth t digits, wherein positions of the first t digits in $[C_{i,1}, C_{i,2}, \ldots, C_{i,2t}]$ are the same as those of the third t digits in $[D_{j,1}, D_{j,2}, \ldots, D_{j,2t}]$, and when a value of any digit in the first t digits is $C_u$, and a value of a corresponding digit in the third t digits is $D_u$, if $C_u$ is not equal to $D_u$, $[C_{i,1}, C_{i,2}, \ldots, C_{i,2t}]$ and $[D_{j,1}, D_{j,2}, \ldots, D_{j,2t}]$ comprise at least one pair of values that meet $C_v < D_v$.

17. The apparatus according to claim 15, wherein the switching row drive value set $[U_0, U_1, \ldots, U_{s-1}]$ and the switching column drive value set $[V_0, V_1, \ldots, V_{s-1}]$ meet the following:

when $U_m$ is applied to the first row drive, and $V_n$ is applied to the first column drive, if m≤n, the optical switch at the intersection of the first row drive and the first column drive remains in an original state; or if m>n, the optical switch at the intersection of the first row drive and the first column drive is switched to the second state; and 2t-digit base-s numbers as which the P input ports are respectively represented and 2t-digit base-s numbers as which the Q output ports are respectively represented meet the following:

the 2t-digit base-s number corresponding to the $i^{th}$ input port in the P input ports is $[C_{i,1}, C_{i,2}, \ldots, C_{i,2t}]$, $[C_{i,1}, C_{i,2}, \ldots, C_{i,2t}]$ is divided into first t digits and second t digits, the 2t-digit base-s number corresponding to the $j^{th}$ output port in the Q output ports is $[D_{j,1}, D_{j,2}, \ldots, D_{j,2t}]$, and $[D_{j,1}, D_{j,2}, \ldots, D_{j,2t}]$ is divided into third t digits and fourth t digits, wherein positions of the first t digits in $[C_{i,1}, C_{i,2}, \ldots, C_{i,2t}]$ are the same as those of the third t digits in $[D_{j,1}, D_{j,2}, \ldots, D_{j,2t}]$, and when a value of any digit in the first t digits is $C_u$, and a value of a corresponding digit in the third t digits is $D_u$, if $C_u$ is not equal to $D_u$, $[C_{i,1}, C_{i,2}, \ldots, C_{i,2t}]$ and $[D_{j,1}, D_{j,2}, \ldots, D_{j,2t}]$ comprise at least one pair of values that meet $C_v > D_v$.

18. The apparatus according to claim 16, wherein a sum of a value of one digit in the second t digits and a value of a corresponding digit in the first t digits of the 2t-digit base-s number $[C_{i,1}, C_{i,2}, \ldots, C_{i,2t}]$ corresponding to the $i^{th}$ input port is s−1, and a sum of a value of one digit in the fourth t digits and a value of a corresponding digit in the third t digits of the 2t-digit base-s number $[D_{j,1}, D_{j,2}, \ldots, D_{j,2t}]$ corresponding to the $j^{th}$ output port is s−1.

19. The apparatus according to claim 15, wherein s and t are determined based on a maximum value between P and Q.

20. The apparatus according to claim 15, wherein each optical switch in the M×N optical switches of the optical switch matrix meets the following:

when the value obtained after an operation is performed on a parameter value of the first drive and a parameter value of the second drive belongs to a first interval, the optical switch is in the first state; or when the value obtained after the operation is performed on a parameter value of the first drive and a parameter value of the second drive belongs to a second interval, the optical switch remains in the current state; or when the value obtained after the operation is performed on a parameter value of the first drive and a parameter value of the second drive belongs to a third interval, the optical switch is in the second state, wherein the intersection of any two of the first interval, the second interval, and the third interval is an empty set;

the value obtained after the operation is performed on the parameter value of the first drive and the parameter value of the second drive belonging to the first interval comprises an absolute value of a difference between the parameter value of the first drive and the parameter value of the second drive being greater than a first threshold, the value obtained after the operation is performed on the parameter value of the first drive and the parameter value of the second drive belonging to the second interval comprises the absolute value of the difference between the parameter value of the first drive and the parameter value of the second drive being less than the first threshold and greater than a second threshold, the value obtained after the operation is performed on the parameter value of the first drive and the parameter value of the second drive belonging to the third interval comprises the absolute value of the difference between the parameter value of the first drive and the parameter value of the second drive being less than the second threshold; and the switching row drive value set $[U_0, U_1, \ldots, U_{s-1}]$ and the switching column drive value set $[V_0, V_1, \ldots, V_{s-1}]$ are determined by the following operations:

determining 2s−1 arithmetic progression values $\Delta U_1, \Delta U_2, \Delta U_3, \ldots,$ and $\Delta U_{2s-1}$ based on the first threshold and the second threshold, wherein $\Delta U_1, \Delta U_2, \ldots,$ and $\Delta U_{s-1}$ are less than the second threshold, and $\Delta U_s, \Delta U_{s+1}, \ldots,$ and $\Delta U_{2s-1}$ are greater than the second threshold and less than the first threshold;

determining the switching column drive value set $[V_0, V_1, \ldots, V_{s-1}]$, wherein a common difference of $V_0, V_1, \ldots,$ and $V_{s-1}$ is $\Delta U_2 - \Delta U_1$; and adding $\Delta U_s$ to each switching column drive value in the switching column drive value set $[V_0, V_1, \ldots, V_{s-1}]$, to obtain a corresponding switching row drive value, wherein switching row drive values form the switching row drive value set $[U_0, U_1, \ldots, U_{s-1}]$.

* * * * *